United States Patent
Mita et al.

(10) Patent No.: US 6,477,281 B2
(45) Date of Patent: *Nov. 5, 2002

(54) IMAGE PROCESSING SYSTEM HAVING MULTIPLE PROCESSORS FOR PERFORMING PARALLEL IMAGE DATA PROCESSING

(75) Inventors: Yoshinobu Mita, Kawasaki (JP); Miyuki Enokida, Yokohama (JP); Yoshihiro Ishida, Kawasaki (JP); Naoto Kawamura, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 48 days.

(21) Appl. No.: 08/888,043

(22) Filed: Jul. 3, 1997

(65) Prior Publication Data

US 2002/0067861 A1 Jun. 6, 2002

Related U.S. Application Data

(62) Division of application No. 08/751,560, filed on Nov. 18, 1996, now Pat. No. 5,692,210, which is a continuation of application No. 08/460,554, filed on Jun. 2, 1995, now abandoned, which is a continuation of application No. 08/165,839, filed on Dec. 14, 1993, now abandoned, which is a division of application No. 08/071,351, filed on Jun. 3, 1993, now Pat. No. 5,293,481, which is a continuation of application No. 07/670,460, filed on Mar. 12, 1992, now abandoned, which is a continuation of application No. 07/155,845, filed on Feb. 12, 1988, now abandoned.

(30) Foreign Application Priority Data

| Feb. 18, 1987 | (JP) | 62-033171 |
|---|---|---|
| Feb. 18, 1987 | (JP) | 62-033172 |
| Feb. 18, 1987 | (JP) | 62-033173 |
| Feb. 18, 1987 | (JP) | 62-033174 |
| Feb. 18, 1987 | (JP) | 62-033175 |
| Feb. 18, 1987 | (JP) | 62-033176 |
| Feb. 18, 1987 | (JP) | 62-033177 |
| Feb. 18, 1987 | (JP) | 62-033178 |
| Feb. 18, 1987 | (JP) | 62-033179 |
| Feb. 18, 1987 | (JP) | 62-033180 |
| Feb. 18, 1987 | (JP) | 62-033181 |
| Feb. 18, 1987 | (JP) | 62-033182 |

(51) Int. Cl.$^7$ .................................................. G06K 9/36
(52) U.S. Cl. ................................... 382/248; 382/234
(58) Field of Search ......................... 395/800.21, 800.22, 395/800.1, 800.11, 800.13, 800.16, 800.17; 382/304, 268, 308, 234, 240, 210, 211, 262, 263; 345/505; 348/421.1

(56) References Cited

U.S. PATENT DOCUMENTS

| 3,800,071 A | * | 3/1974 | Reeber ..................... 358/527 |
|---|---|---|---|
| 4,060,713 A | * | 11/1977 | Golay ...................... 382/205 |
| 4,107,780 A | | 8/1978 | Grimsdale et al. .......... 364/521 |
| 4,135,247 A | * | 1/1979 | Gordon et al. ......... 364/413.16 |
| 4,174,514 A | * | 11/1979 | Sternberg ................. 382/303 |
| 4,380,046 A | * | 4/1983 | Fung ..................... 395/800.22 |
| 4,460,923 A | * | 7/1984 | Hirano et al. ............. 358/136 |
| 4,602,285 A | * | 7/1986 | Beaulier et al. ........... 348/580 |
| 4,620,186 A | * | 10/1986 | Krause et al. .............. 345/22 |
| 4,622,547 A | | 11/1986 | Furukawa et al. .......... 340/750 |
| 4,622,632 A | * | 11/1986 | Tanimoto et al. ....... 395/800.11 |
| 4,648,050 A | | 3/1987 | Yamagami ................. 364/526 |
| 4,665,436 A | * | 5/1987 | Osborne et al. ............ 348/400 |
| 4,679,077 A | * | 7/1987 | Yuasa et al. .............. 348/154 |
| 4,697,176 A | * | 9/1987 | Kawakami ................. 345/199 |
| 4,718,091 A | * | 1/1988 | Kobayashi et al. ......... 382/162 |
| 4,739,474 A | | 4/1988 | Holsztynski ............... 364/200 |
| 4,742,552 A | * | 5/1988 | Andrews .................. 382/303 |
| 4,752,827 A | * | 6/1988 | Cassagne et al. ........... 348/396 |
| 4,773,026 A | | 9/1988 | Takahara et al. ........... 364/518 |
| 4,773,044 A | | 9/1988 | Sfarti et al. ............... 364/900 |
| 4,786,820 A | | 11/1988 | Ogino et al. ............... 250/578 |
| 4,791,677 A | * | 12/1988 | Mori et al. ................ 382/304 |
| 4,809,347 A | | 2/1989 | Nash et al. ................. 382/49 |
| 4,851,988 A | | 7/1989 | Trottier et al. ............. 364/200 |
| 4,908,751 A | | 3/1990 | Smith ...................... 364/200 |
| 4,949,389 A | * | 8/1990 | Allebach et al. ........... 382/211 |
| 4,985,848 A | | 1/1991 | Pfeiffer et al. ............. 364/518 |
| 5,101,445 A | * | 3/1992 | Call et al. ................. 382/263 |

| | 5,487,172 A | * 1/1996 | Hyatt | 395/800.32 |

FOREIGN PATENT DOCUMENTS

| | | |
|---|---|---|
| DE | 3538639 | 4/1986 |
| JP | 52043326 | 4/1977 |
| JP | 58-181171 | 10/1983 |
| JP | 59-53964 | 3/1984 |
| JP | 59-172064 | 9/1984 |
| JP | 60185987 | 9/1985 |
| JP | 60262253 | 12/1985 |
| JP | 61-9763 | 1/1986 |
| JP | 61016369 | 1/1986 |
| JP | 61-52074 | 3/1986 |
| JP | 61052074 | 3/1986 |
| JP | 61055783 | 3/1986 |
| JP | 61107475 | 5/1986 |
| JP | 61199170 | 9/1986 |
| JP | 61-278961 | 12/1986 |
| JP | 61294970 | 12/1986 |
| JP | 62000988 | 1/1987 |
| JP | 62008664 | 1/1987 |
| JP | 62013165 | 1/1987 |
| JP | 63-65787 | 3/1988 | ............ H04N/7/13 |
| JP | 63201757 | 8/1988 |

OTHER PUBLICATIONS

Taub, Herbert. Digital Circuits and Microprocessors, 1982, p.228.*

Kidode, "Image Processing Machines in Japan", Computer, Issue No. 1, 1983, pp. 68–80.

J. L. Potter, "Image Processing on the Massively Parallel Processor", Computer, Jan. 1983, pp. 62–67.

"Parallel Image Processing Using Cellular Arrays", by A. Rosenfeld, Computer, Jan. 1983, pp. 14–20.

"Image Processing on the Massively Parallel Processor", by J. L. Potter, Computer, Jan. 1983, pp. 62–67.

"Image Processing on ZMOB" by T. Kushner, et al., IEEE Trans. On Computers, vol. C–31, No. 10, Oct. 1982, pp. 943–951.

* cited by examiner

*Primary Examiner*—Gabriel Garcia
(74) *Attorney, Agent, or Firm*—Fitzpatrick, Cella, Harper & Scinto

(57) ABSTRACT

An image processing apparatus is composed of an image memory comprising a plurality of memory elements, and a processor unit comprising a plurality of processor elements. By suitably engineering the arrangement of the image memory of memory elements, the arrangement of the processor unit of processor elements and the connections among the memory elements and processor elements, it is possible to realize, through a simple construction, high-speed image processing such as image density conversion, image color conversion, image masking, image spatial filtering, image enlargement, image reduction, image rotation, image compression, image extension and image color correction. Also provided are an image processing apparatus for a color image, composed of a plurality of image memories and a plurality of processor elements, and a generalized, multifunctional data parallel processing apparatus capable of processing a large volume of data at high speed.

10 Claims, 62 Drawing Sheets

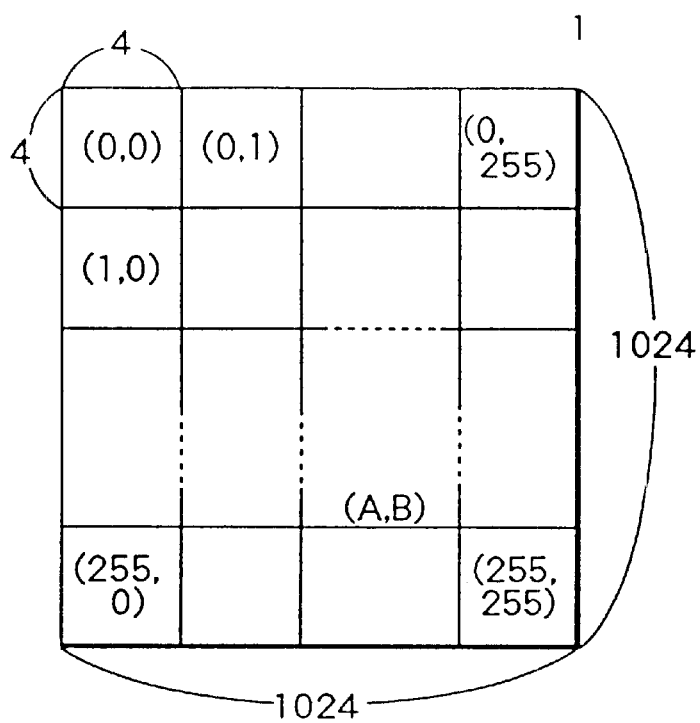
F I G. 2
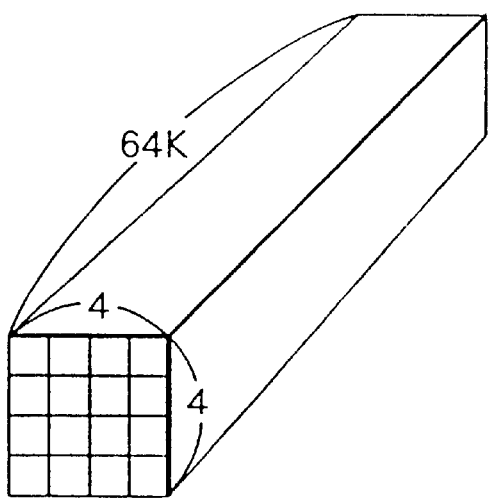
F I G. 3

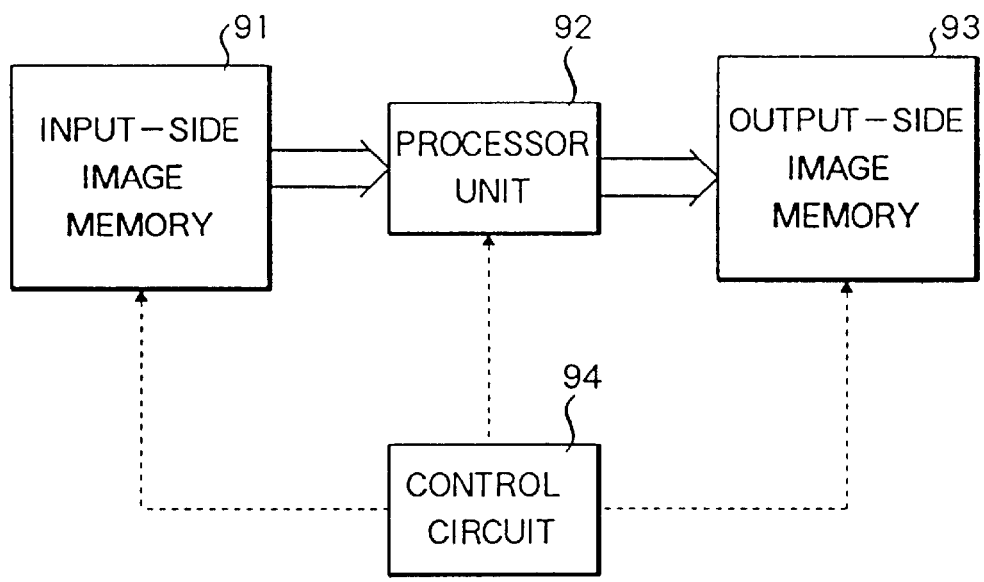
F I G. 9 (a)
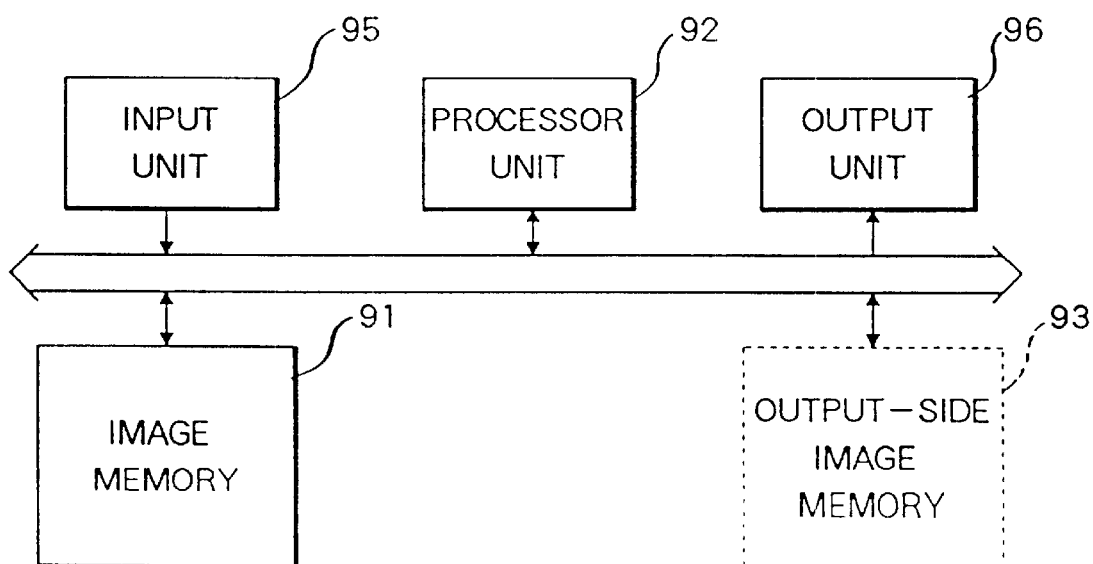
F I G. 9 (b)

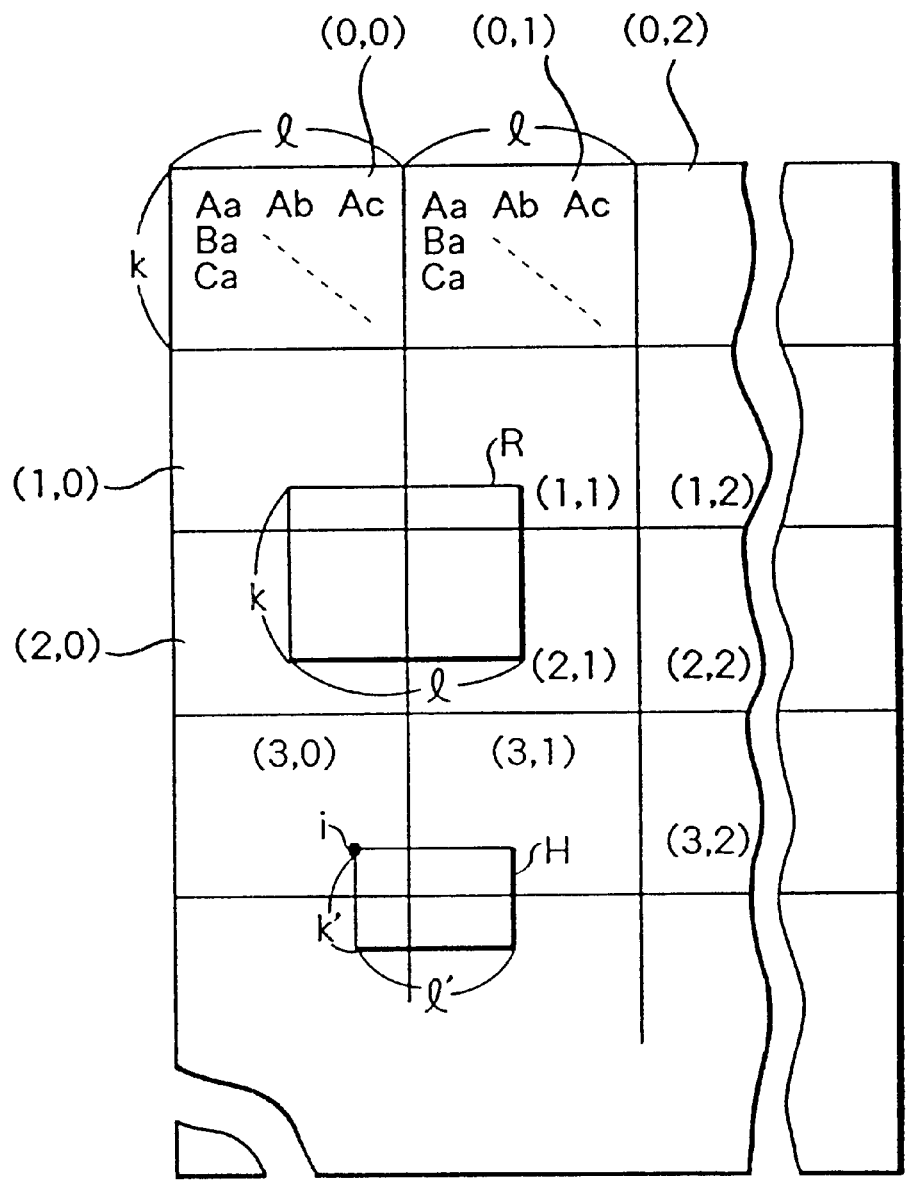
F I G. 10

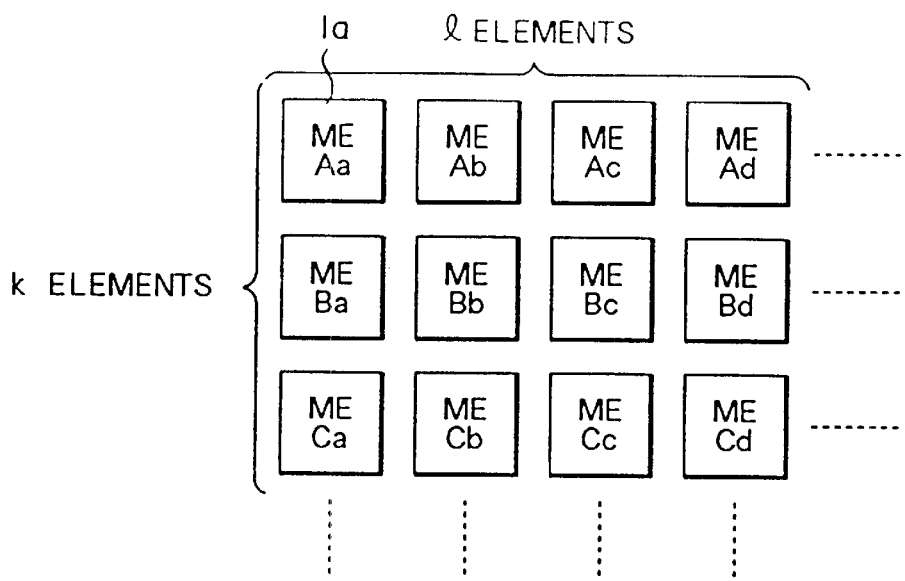
F I G. 11
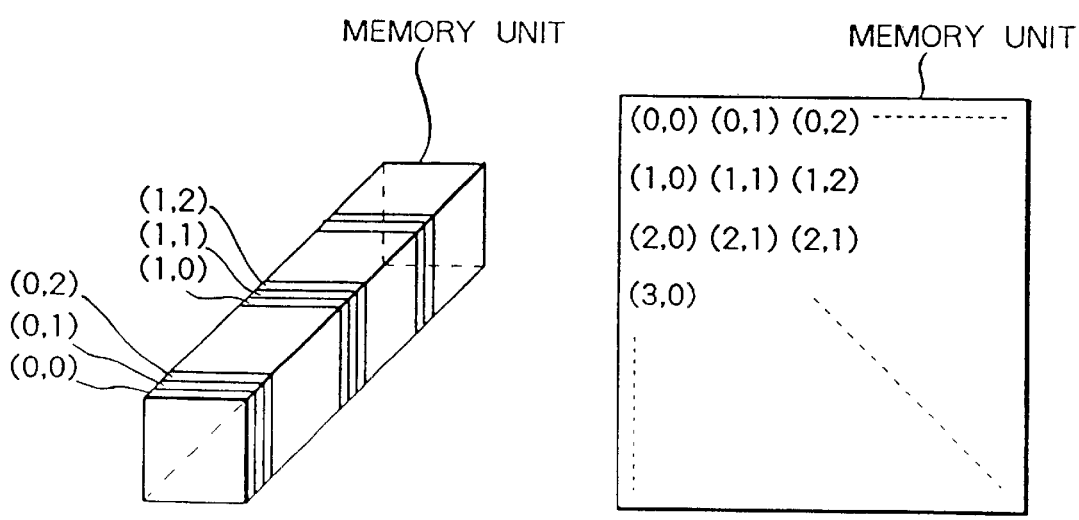
F I G. 12
F I G. 13

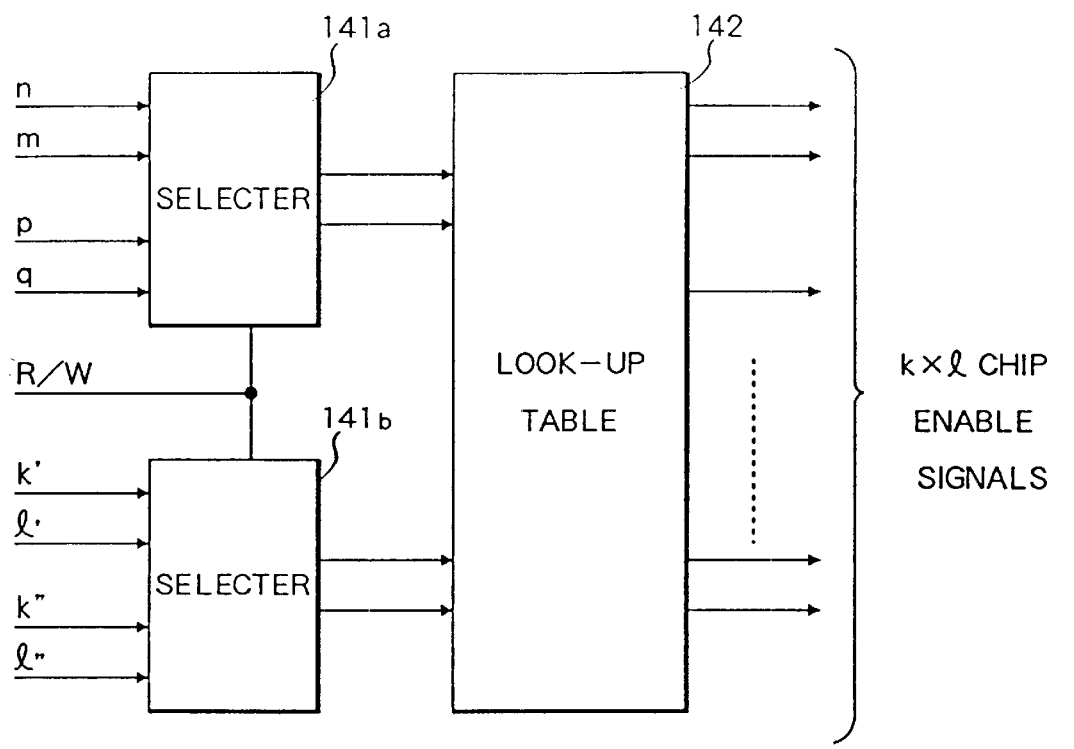
F I G. 14
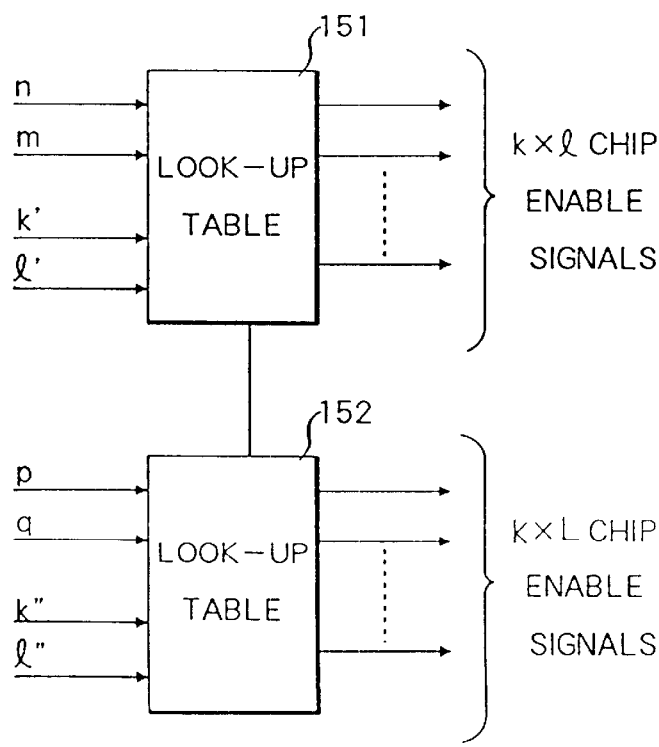
F I G. 15

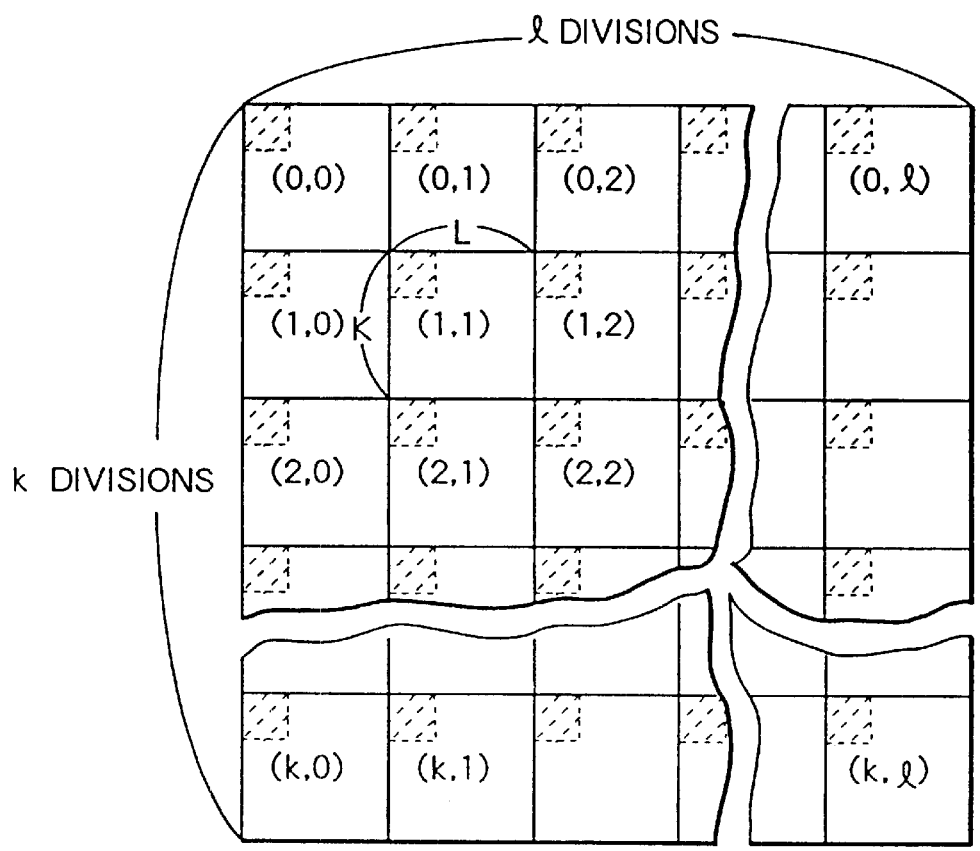
F I G. 16

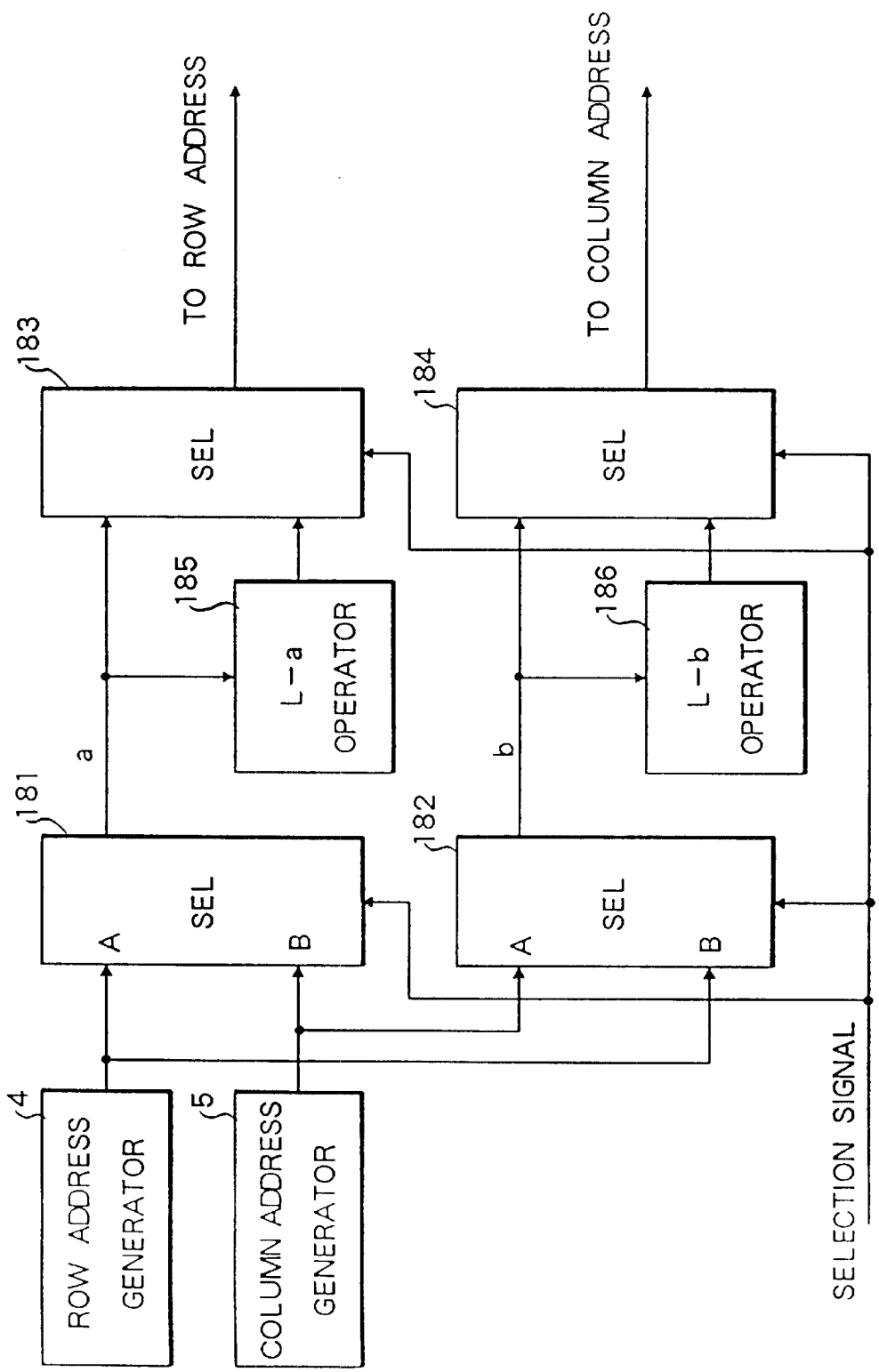
F I G. 18

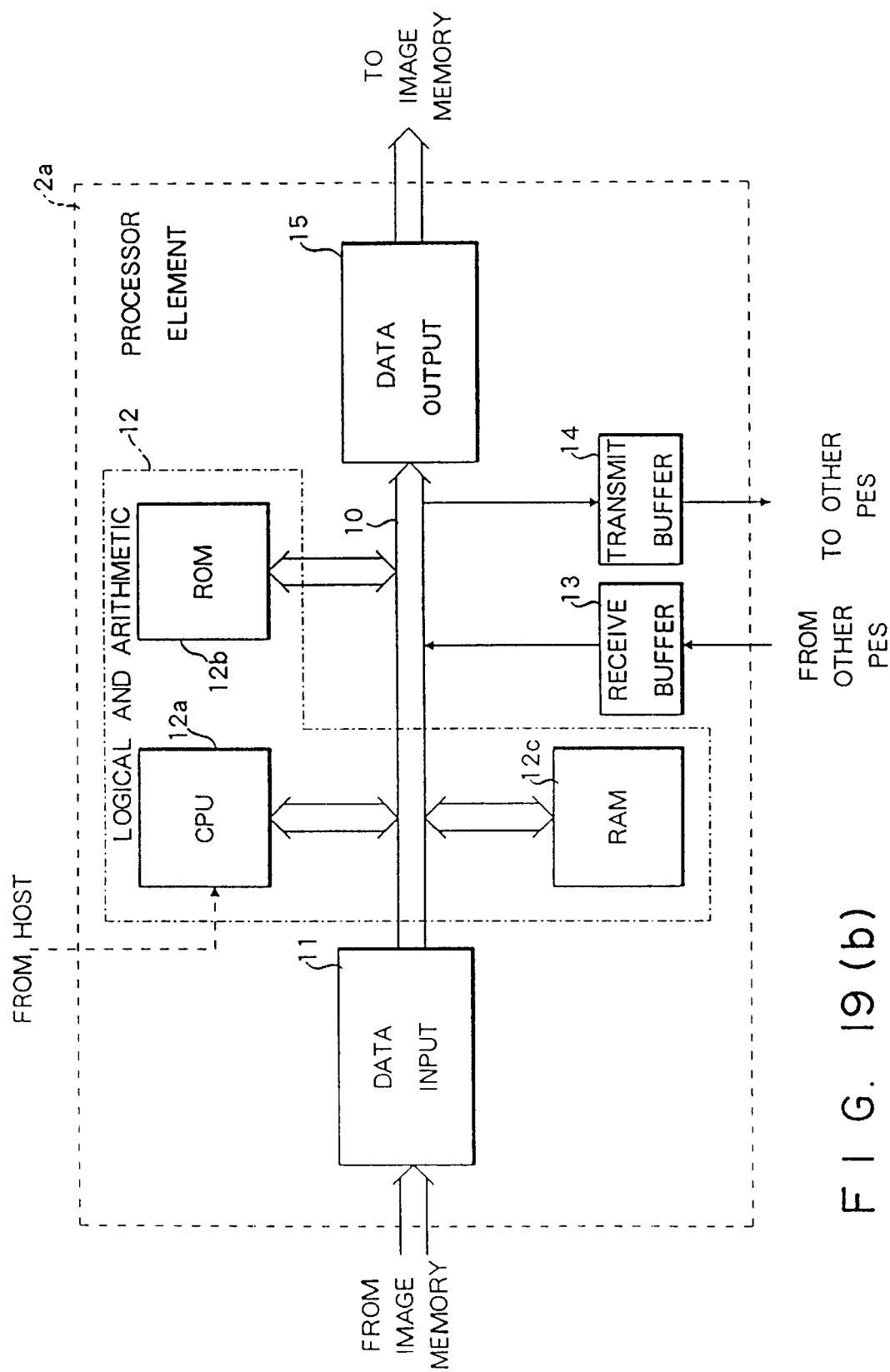
F I G. 19 (b)

F I G. 21(a) 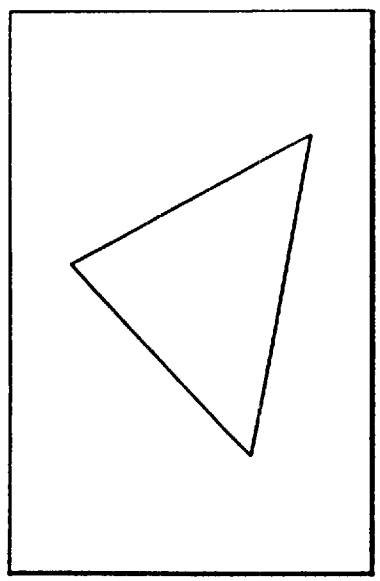 F I G. 21(b) 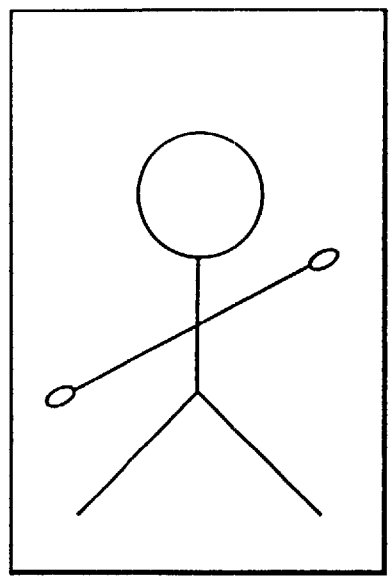
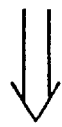
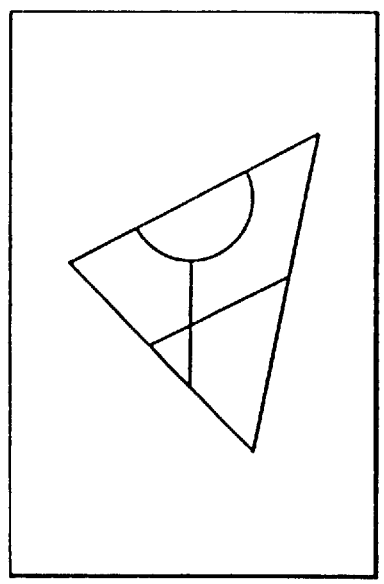
F I G. 21(c)

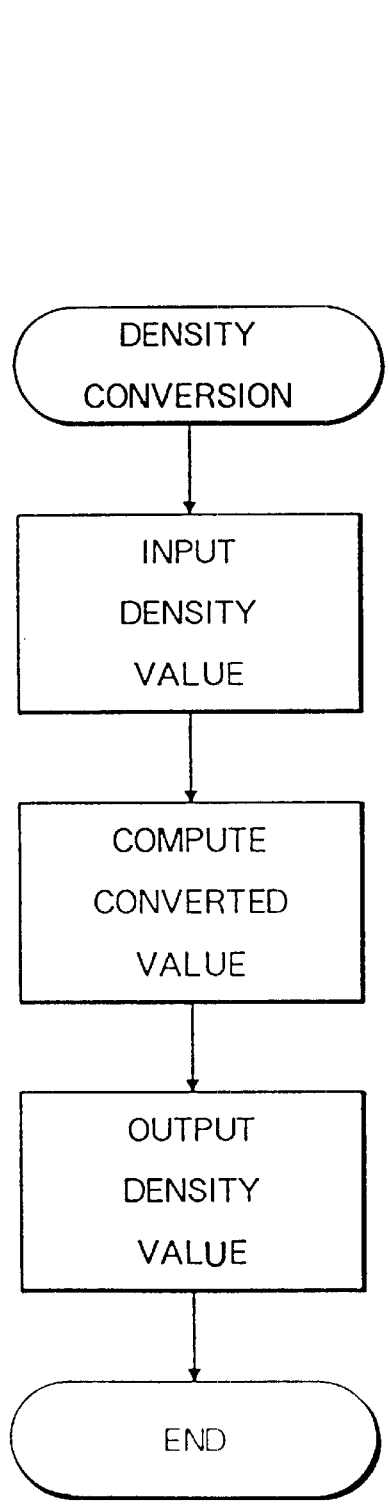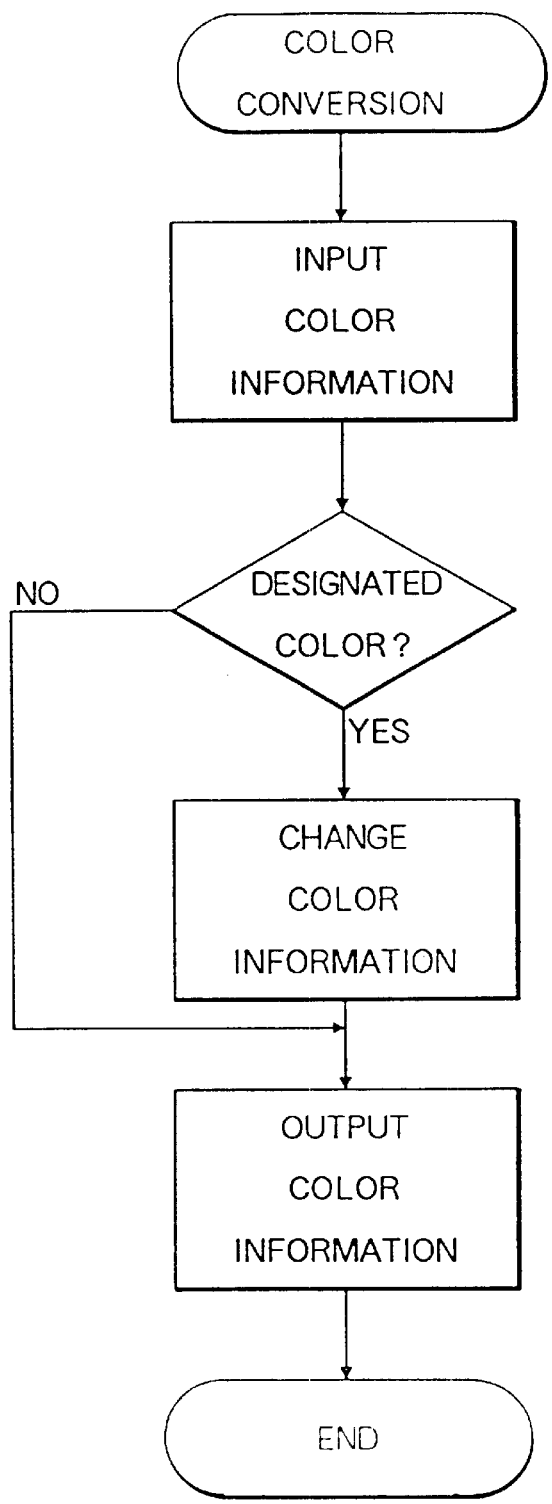
F I G. 22    F I G. 23

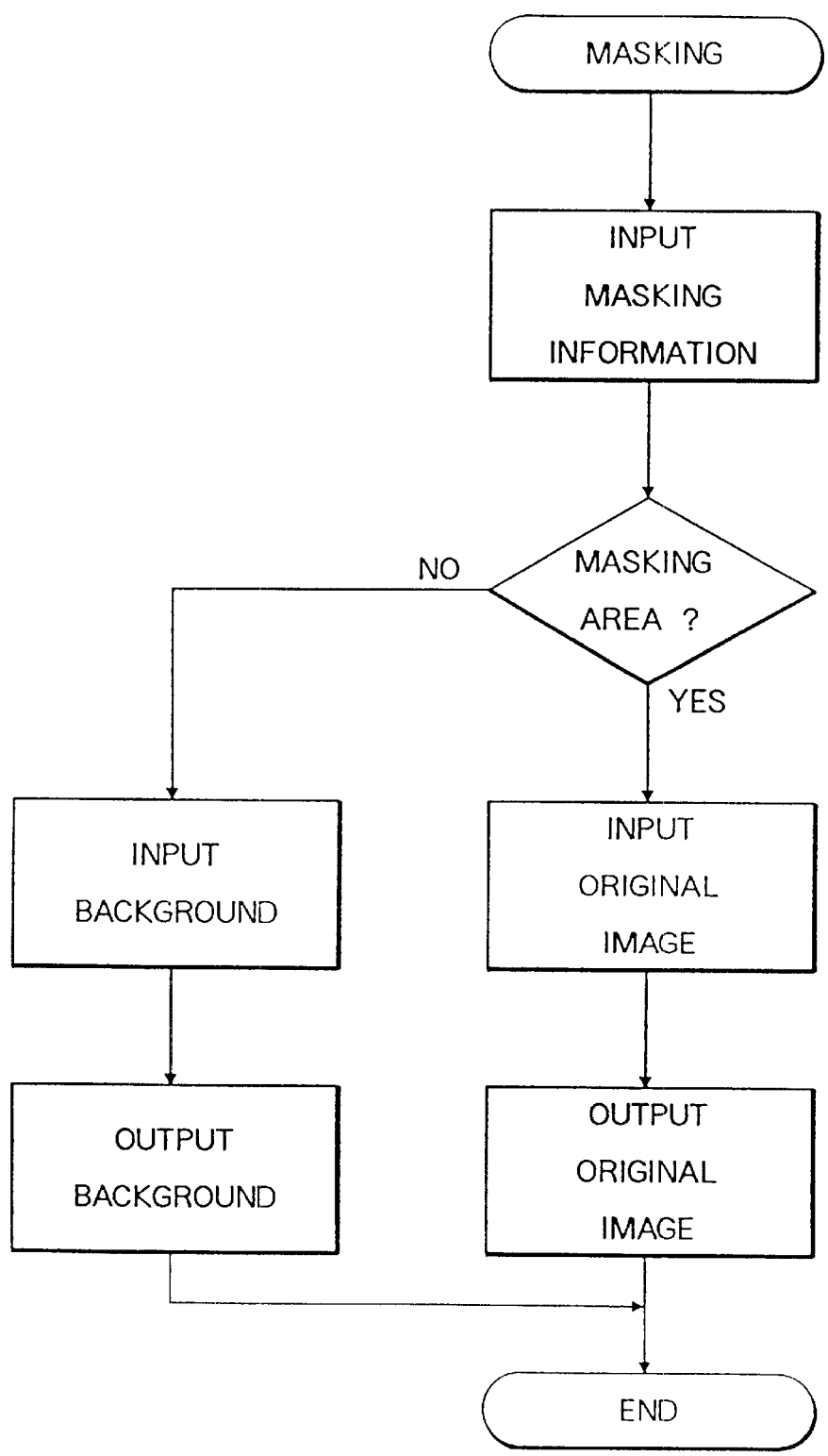
F I G. 24

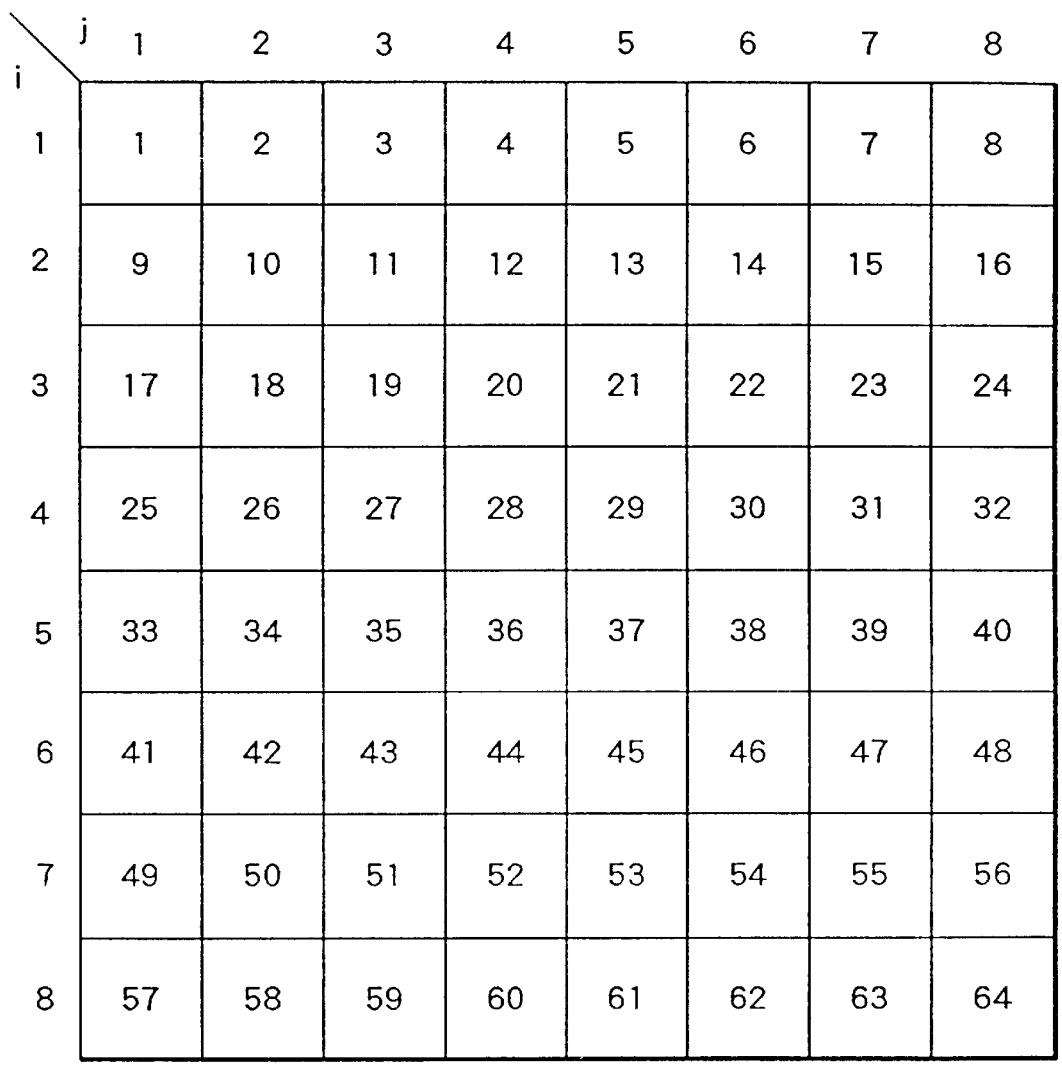
F I G. 25

| j\i | 1 | 2 | 3 | 4 | 5 | 6 | 7 | 8 |
|---|---|---|---|---|---|---|---|---|
| 1 | 8 | 16 | 24 | 32 | 40 | 48 | 56 | 64 |
| 2 | 7 | 15 | 23 | 31 | 39 | 47 | 55 | 63 |
| 3 | 6 | 14 | 22 | 30 | 38 | 46 | 54 | 62 |
| 4 | 5 | 13 | 21 | 29 | 37 | 45 | 53 | 61 |
| 5 | 4 | 12 | 20 | 28 | 36 | 44 | 52 | 60 |
| 6 | 3 | 11 | 19 | 27 | 35 | 43 | 51 | 59 |
| 7 | 2 | 10 | 18 | 26 | 34 | 42 | 50 | 58 |
| 8 | 1 | 9 | 17 | 25 | 33 | 41 | 49 | 57 |

FIG. 26

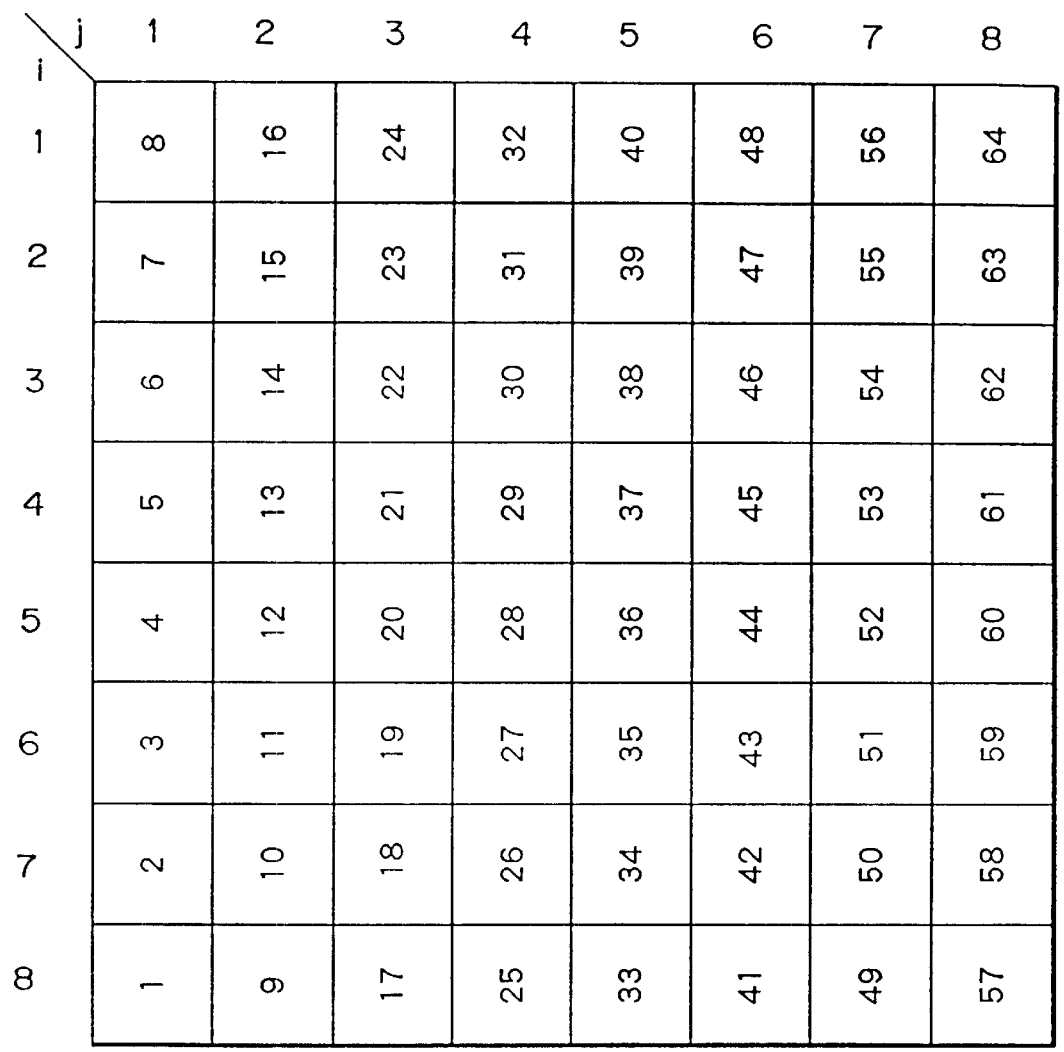
F I G. 27

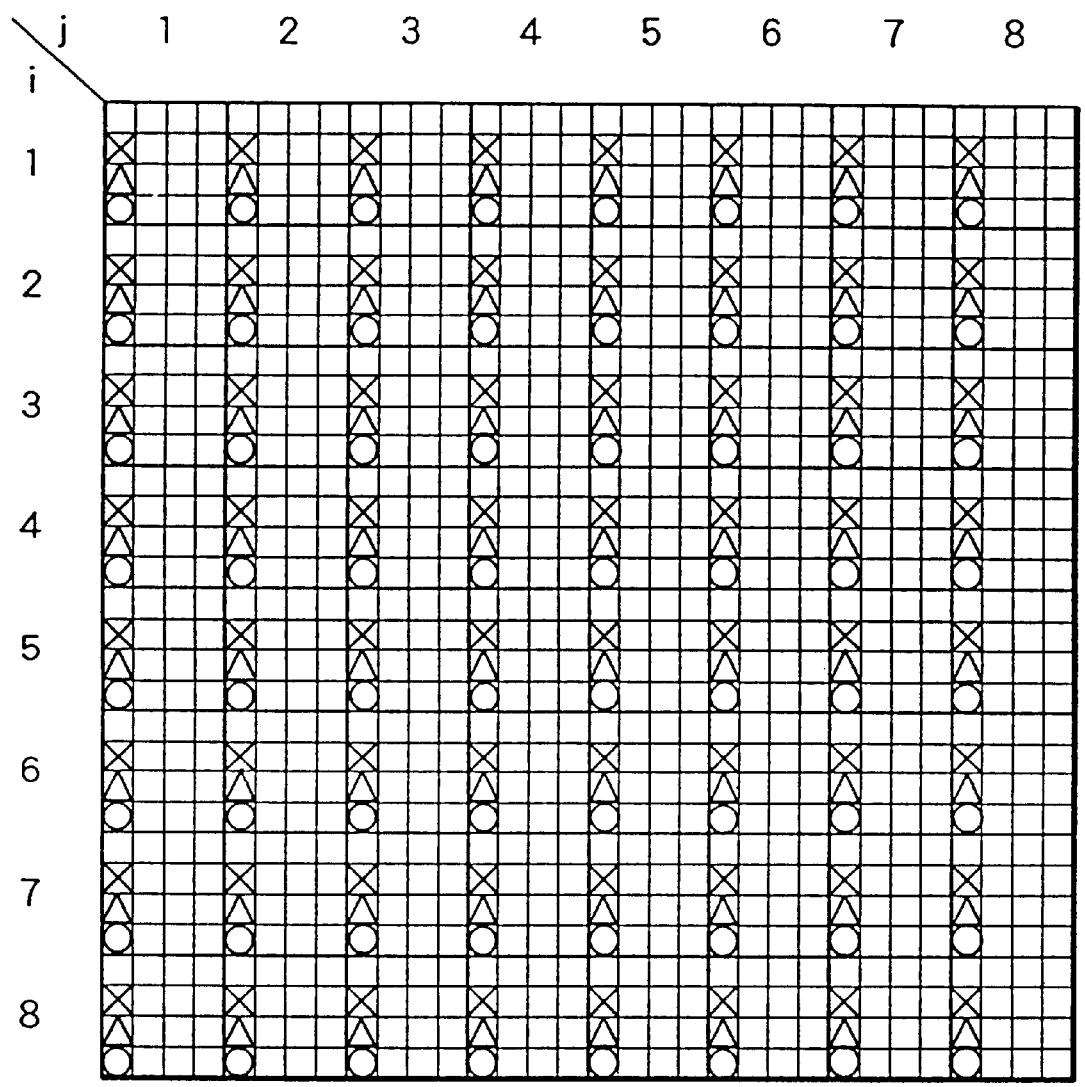
F I G. 29

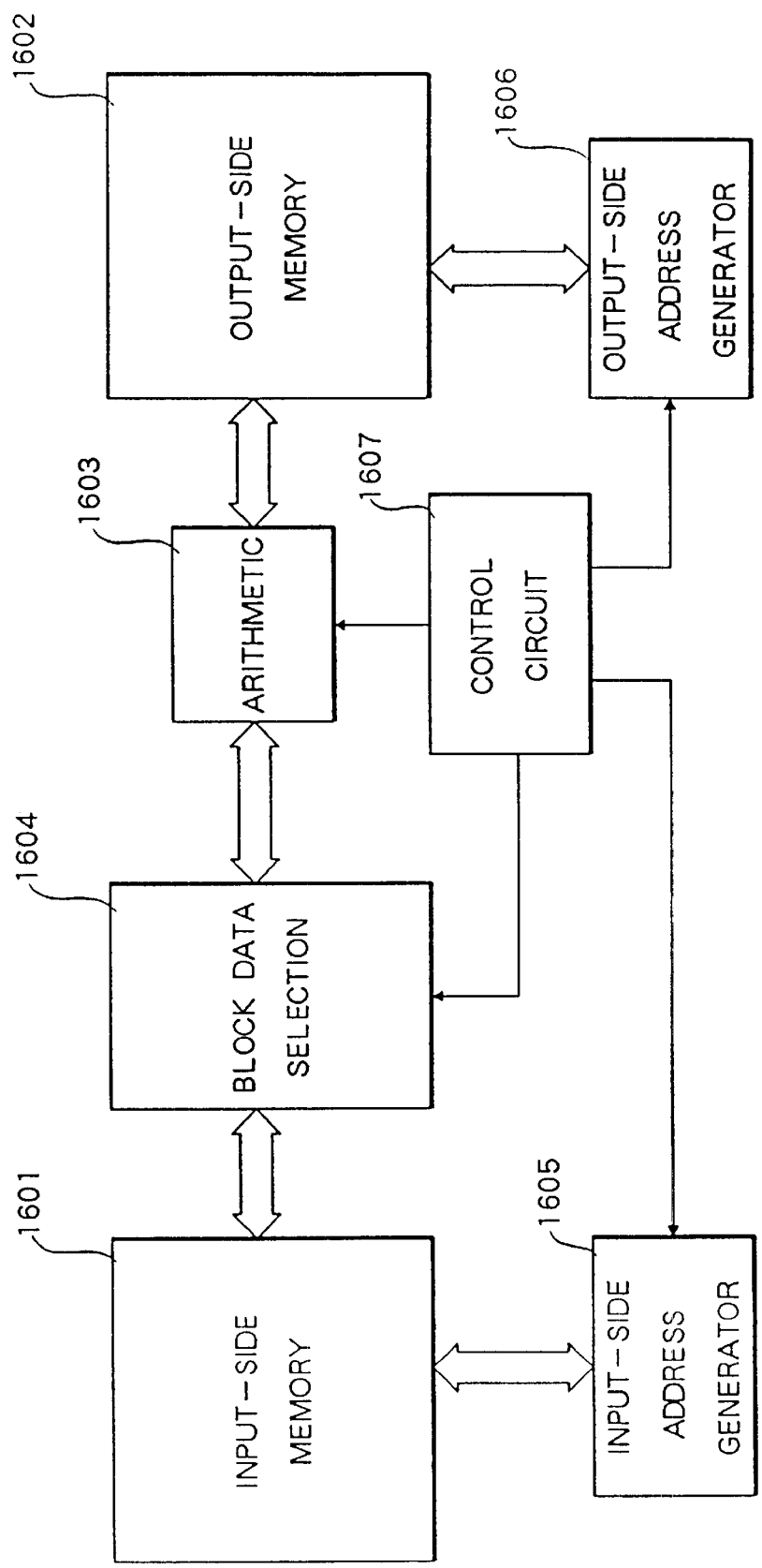
F I G. 30

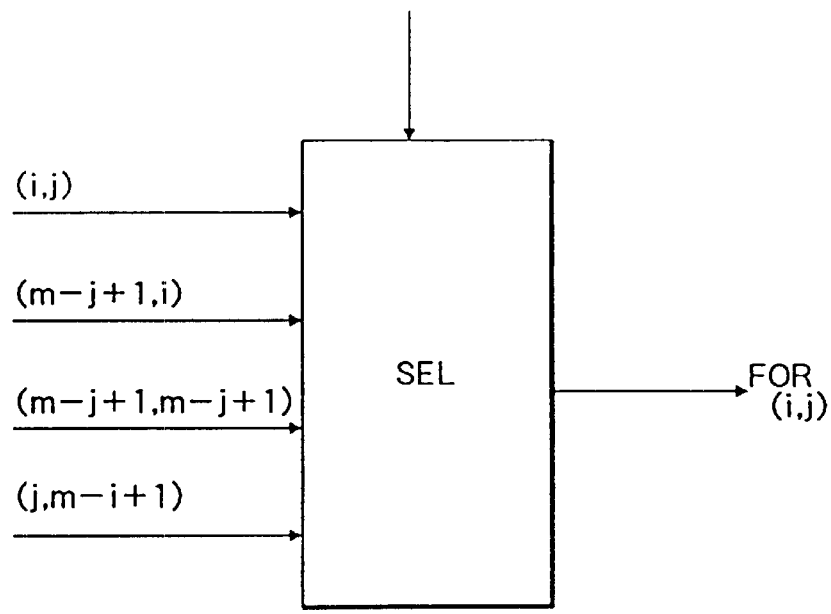
F I G. 31
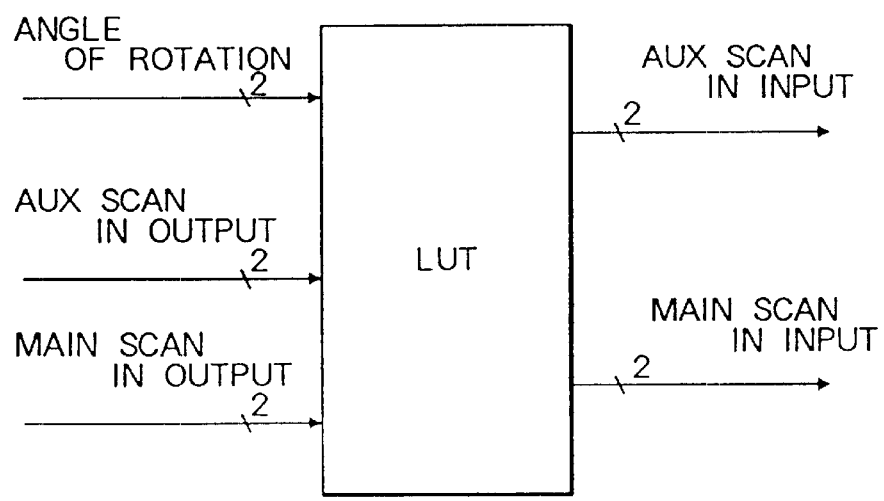
F I G. 32

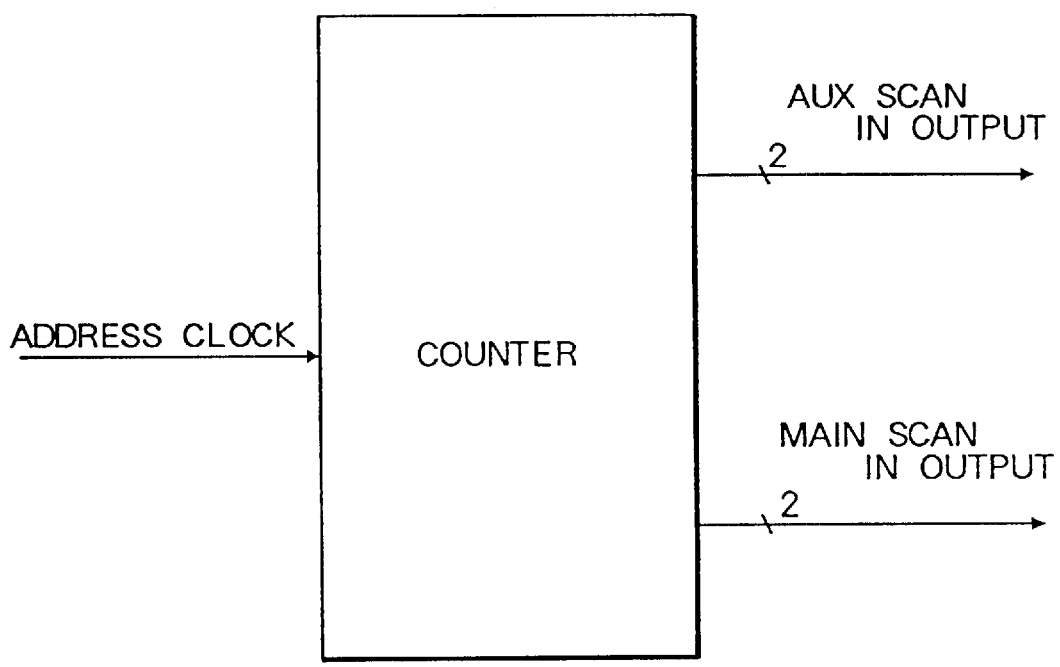
F I G. 33

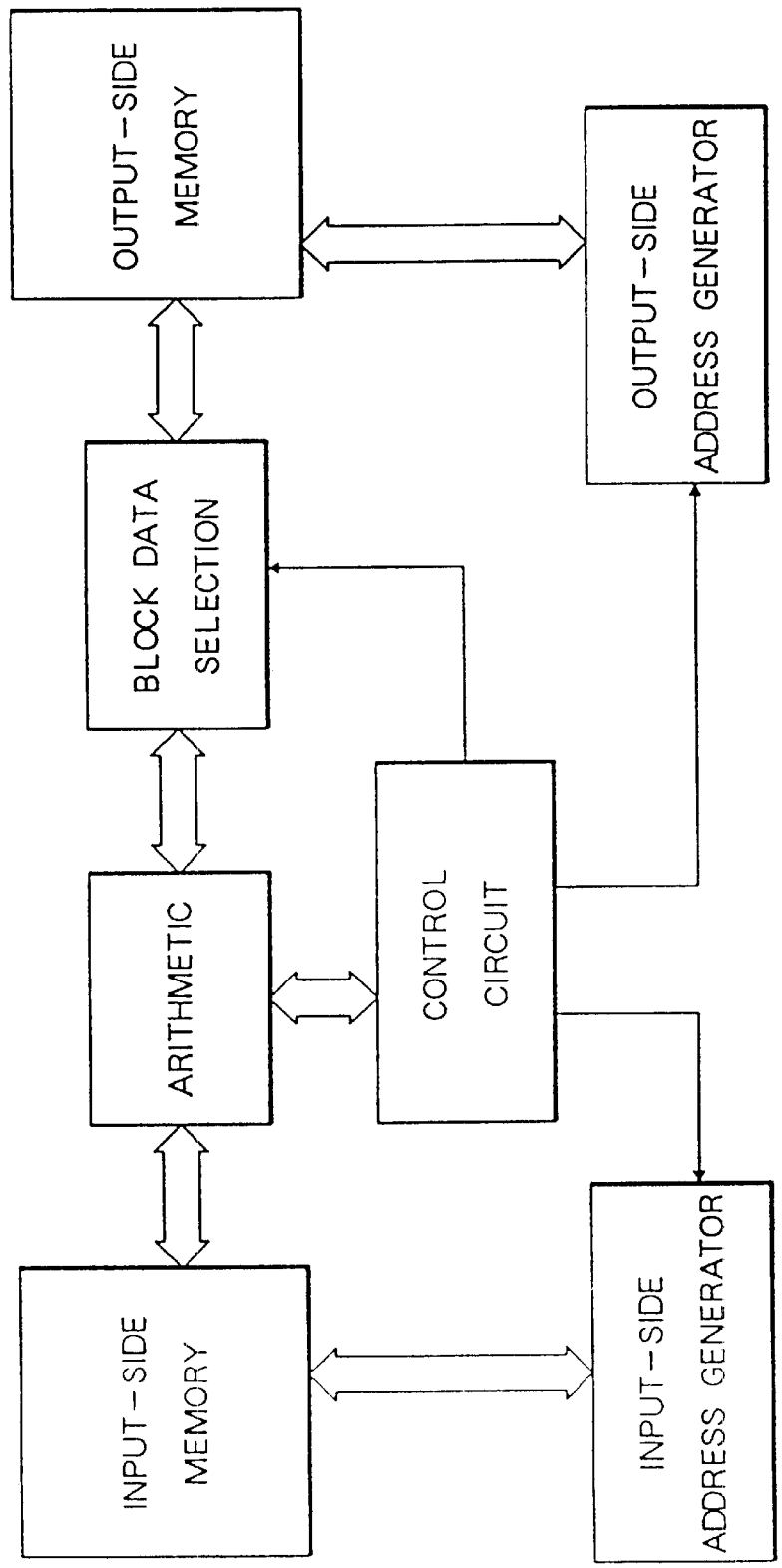
F I G. 34

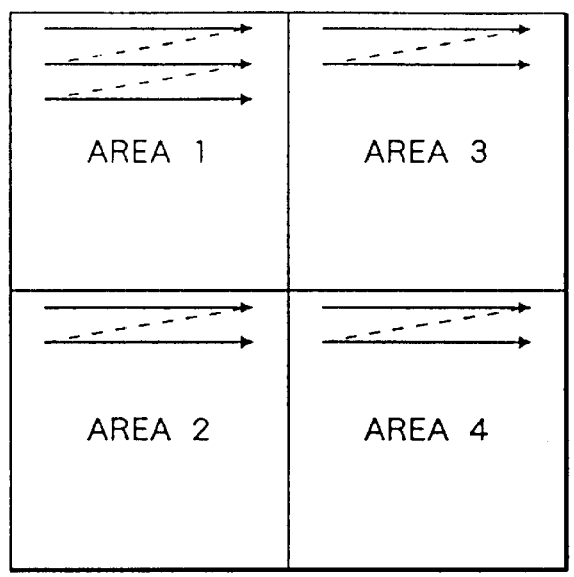
F I G. 35
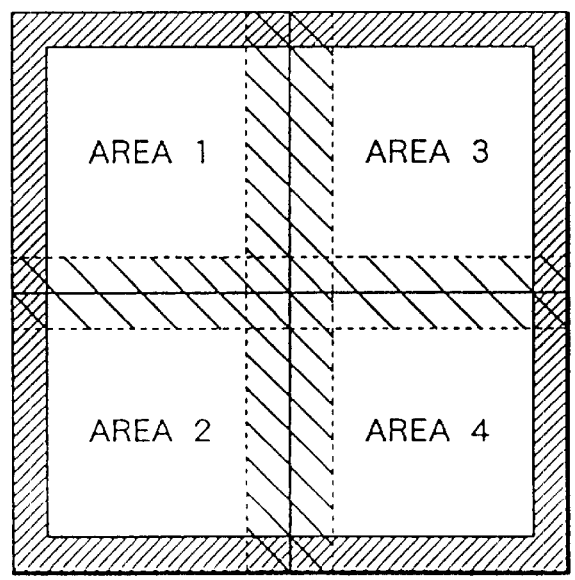
F I G. 36

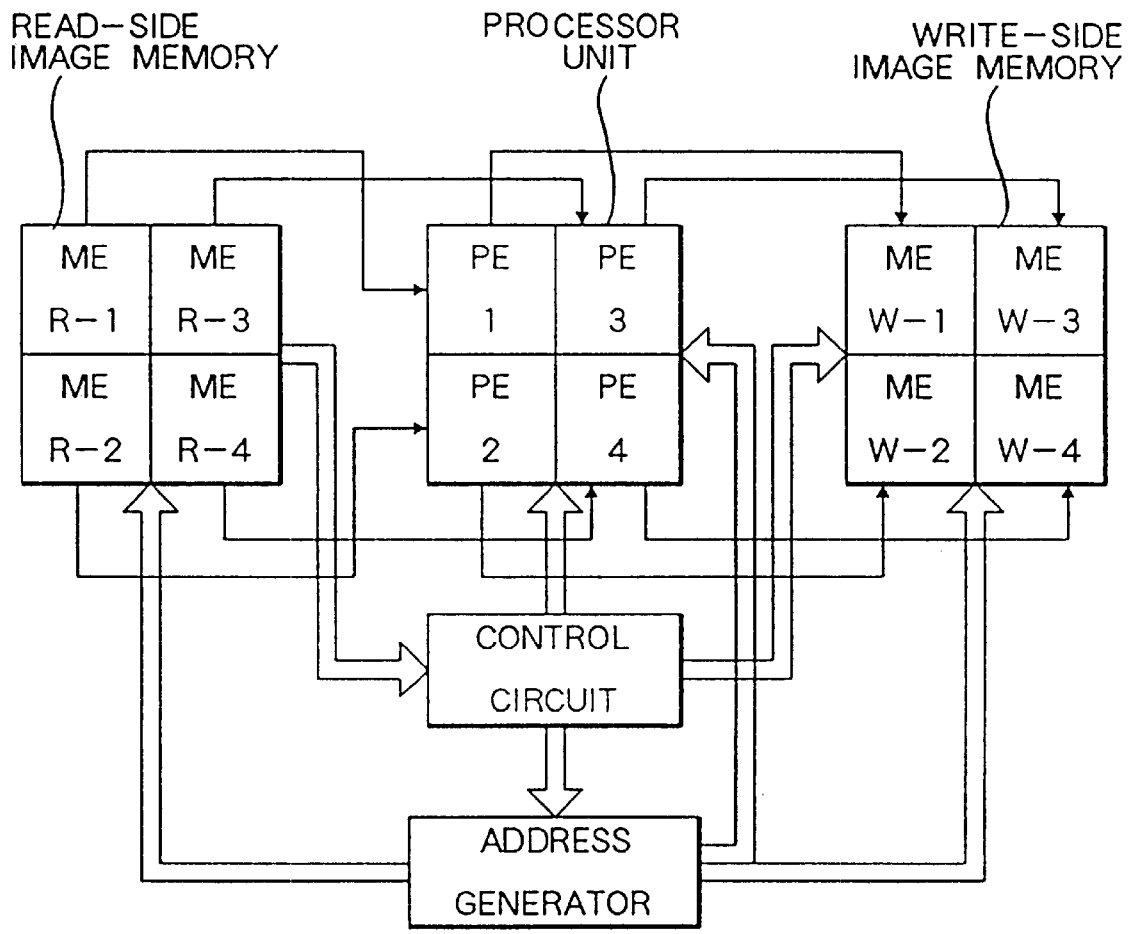
F I G. 37

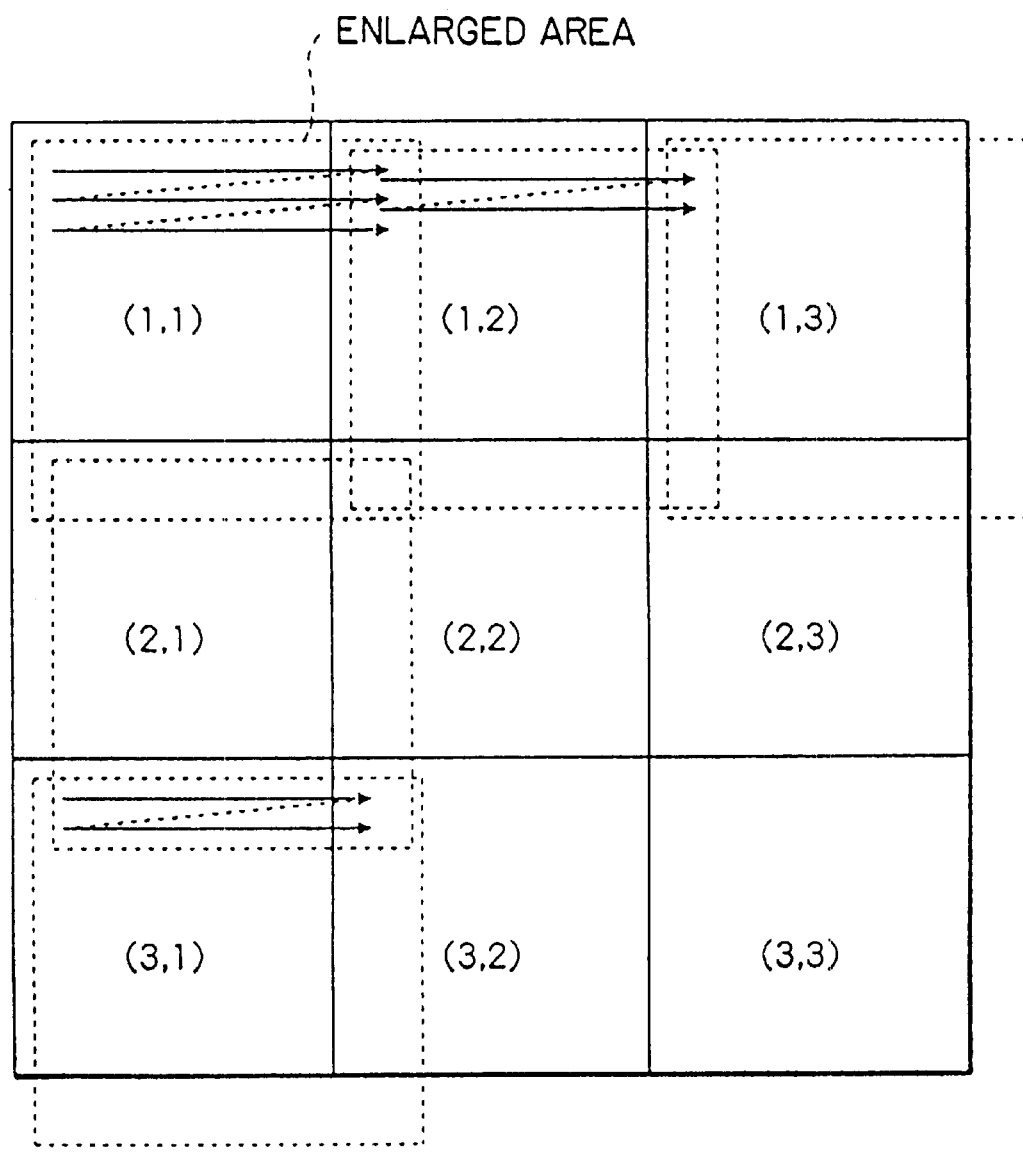
F I G. 38(a)

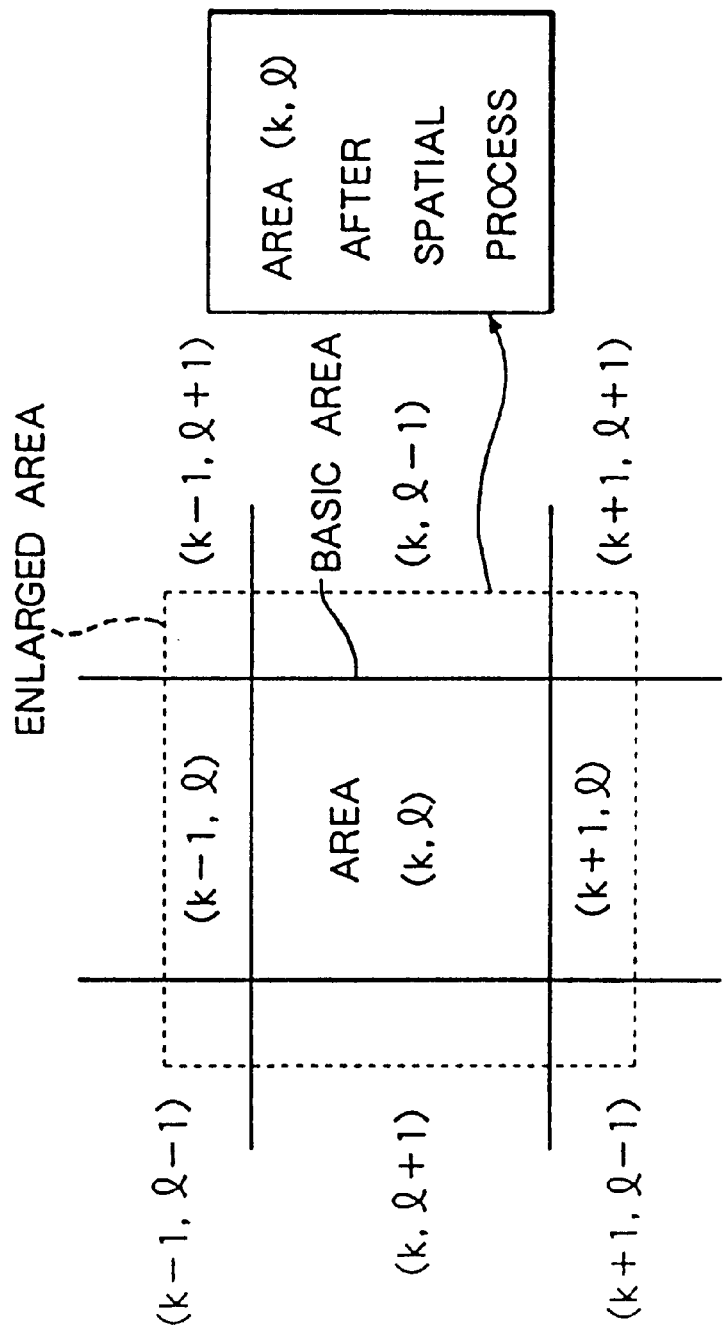
F I G. 38 (b)

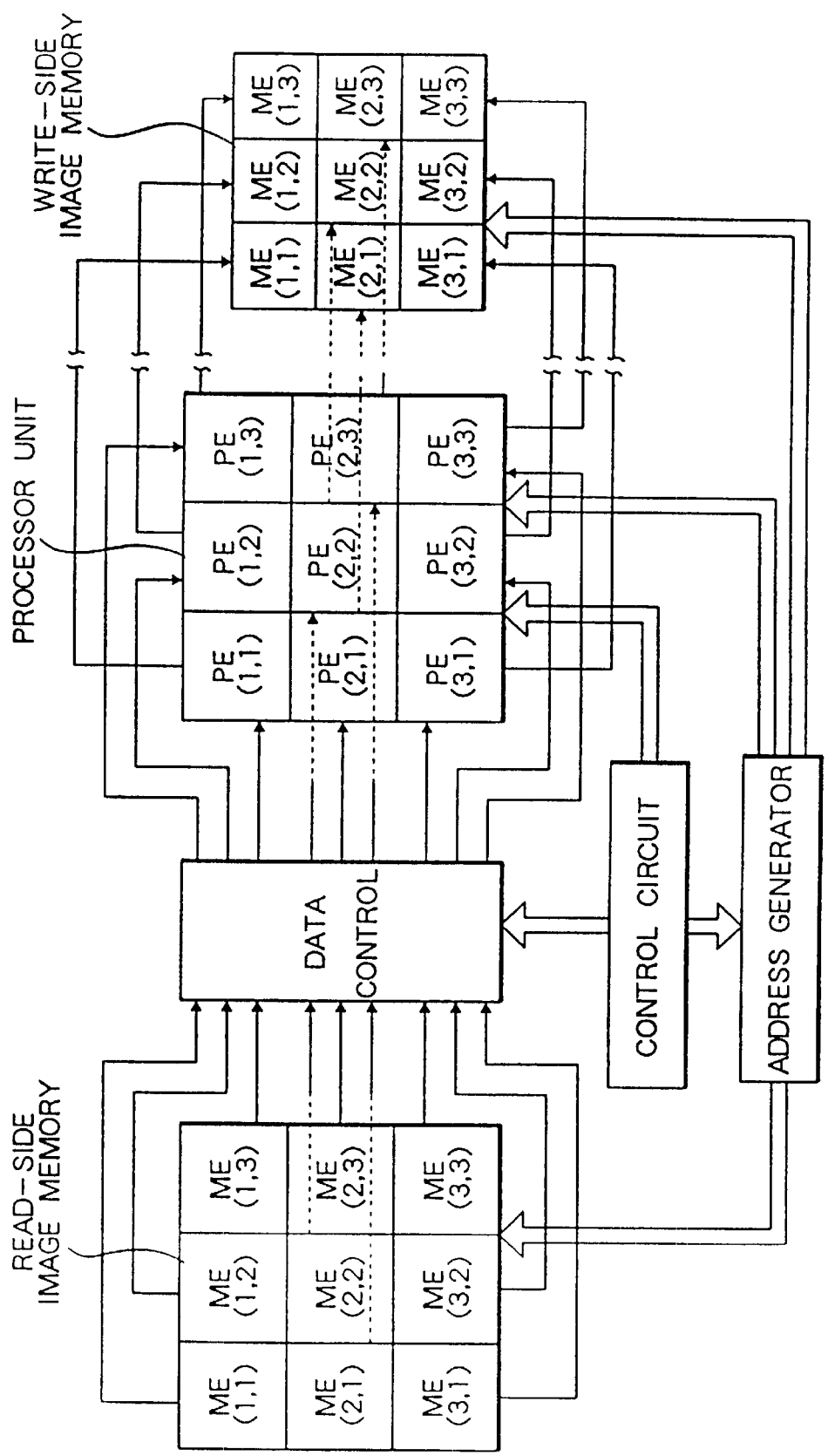
F I G. 39

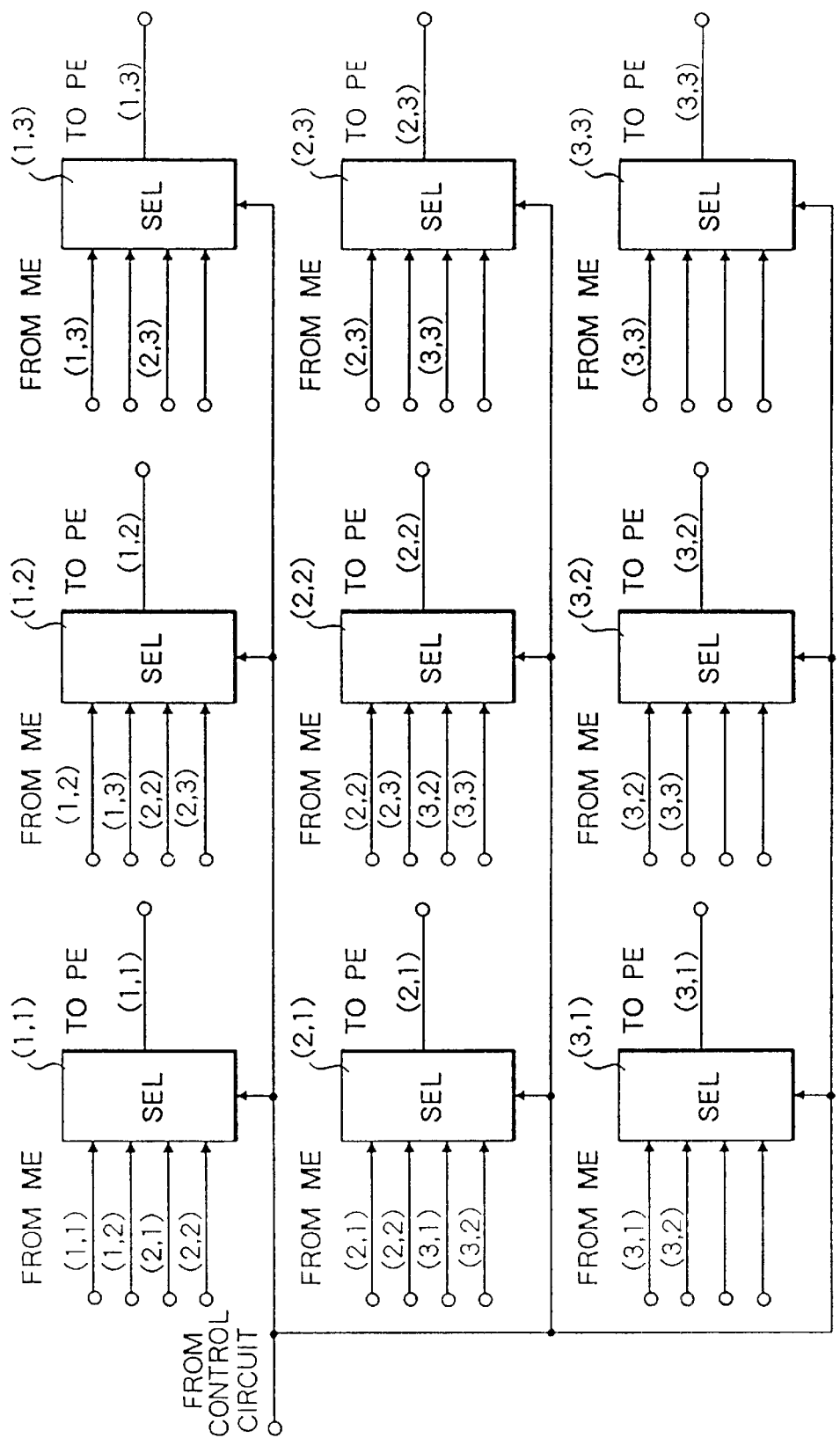
F I G. 40

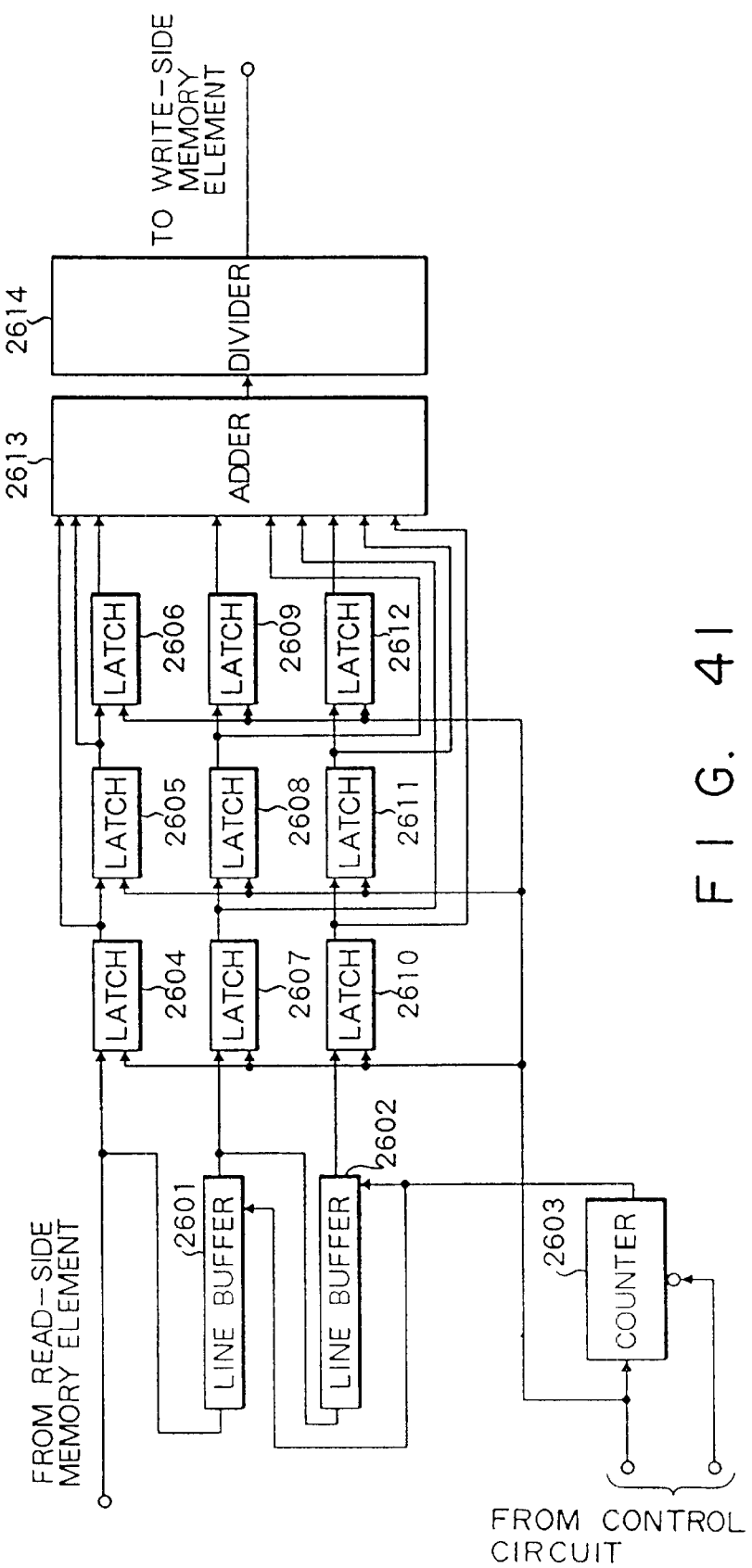
F I G. 41

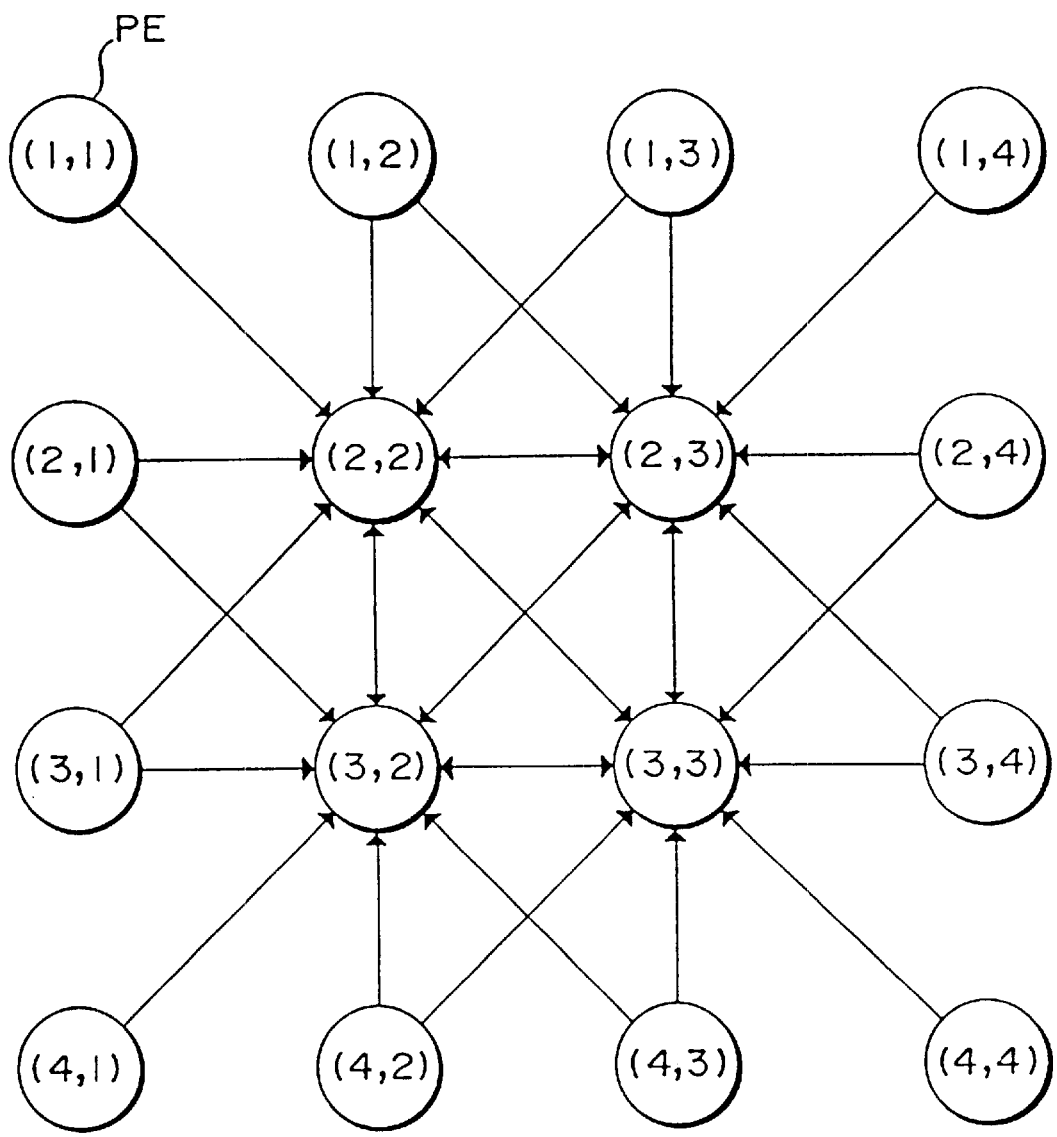
F I G. 43

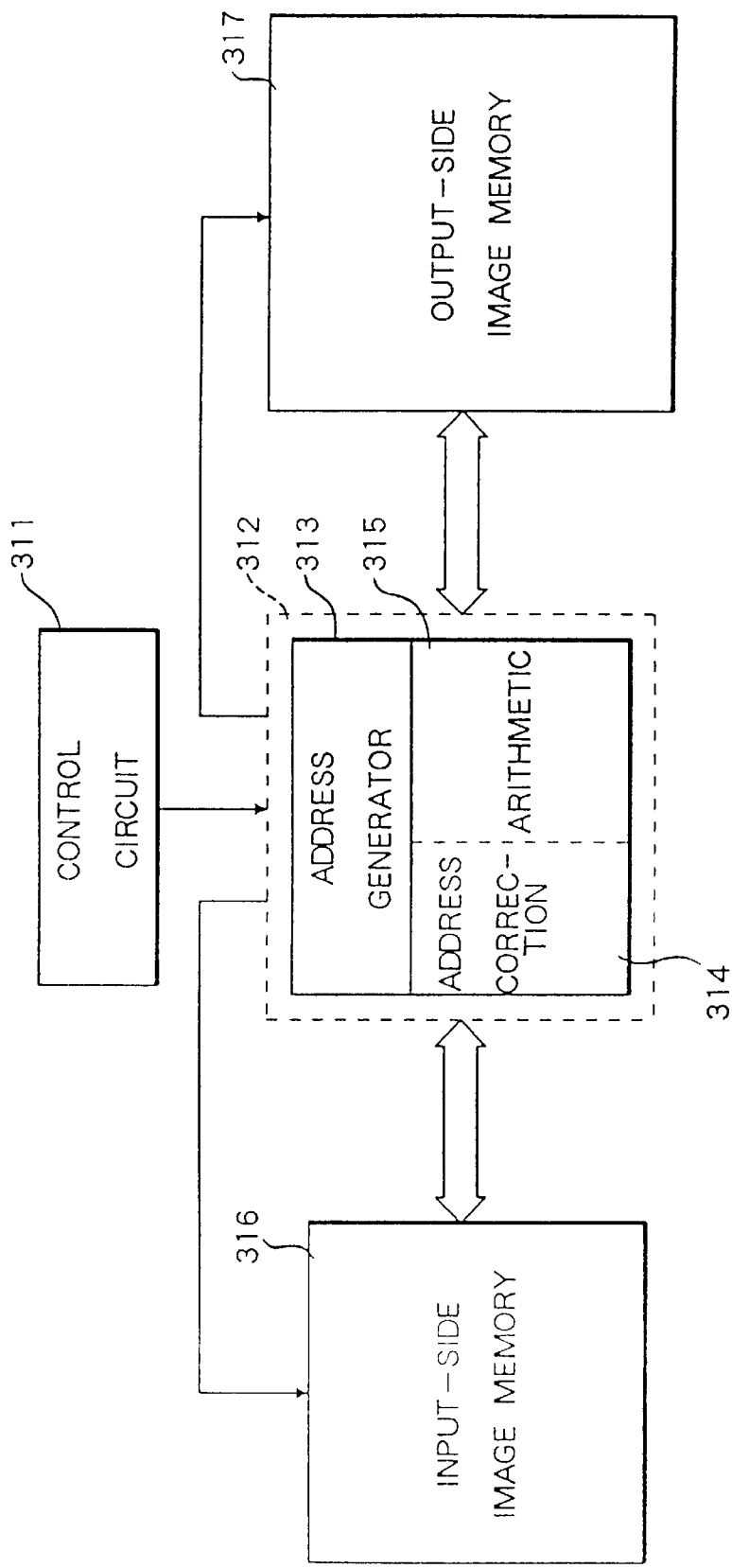
F I G. 46

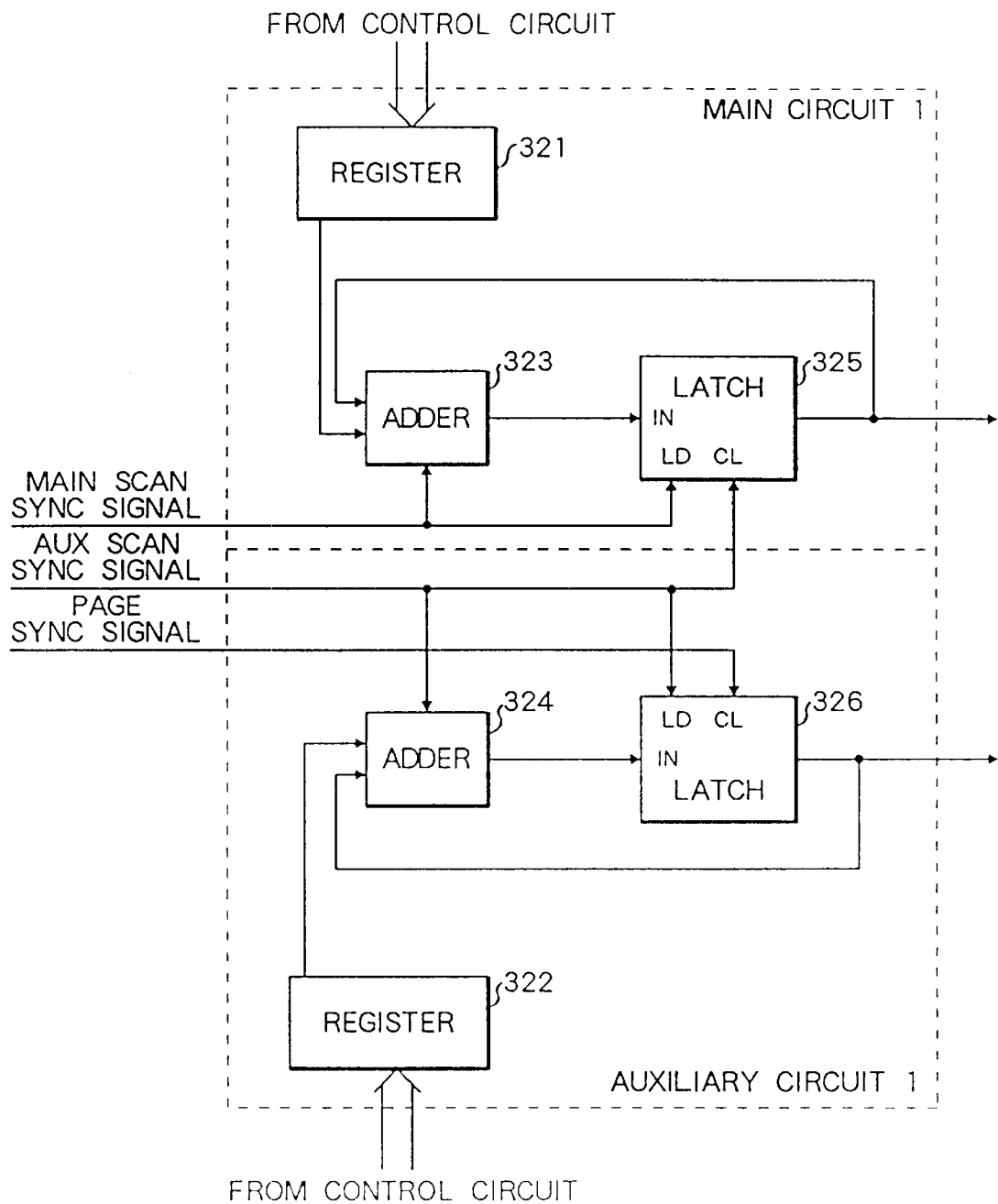
F I G. 47

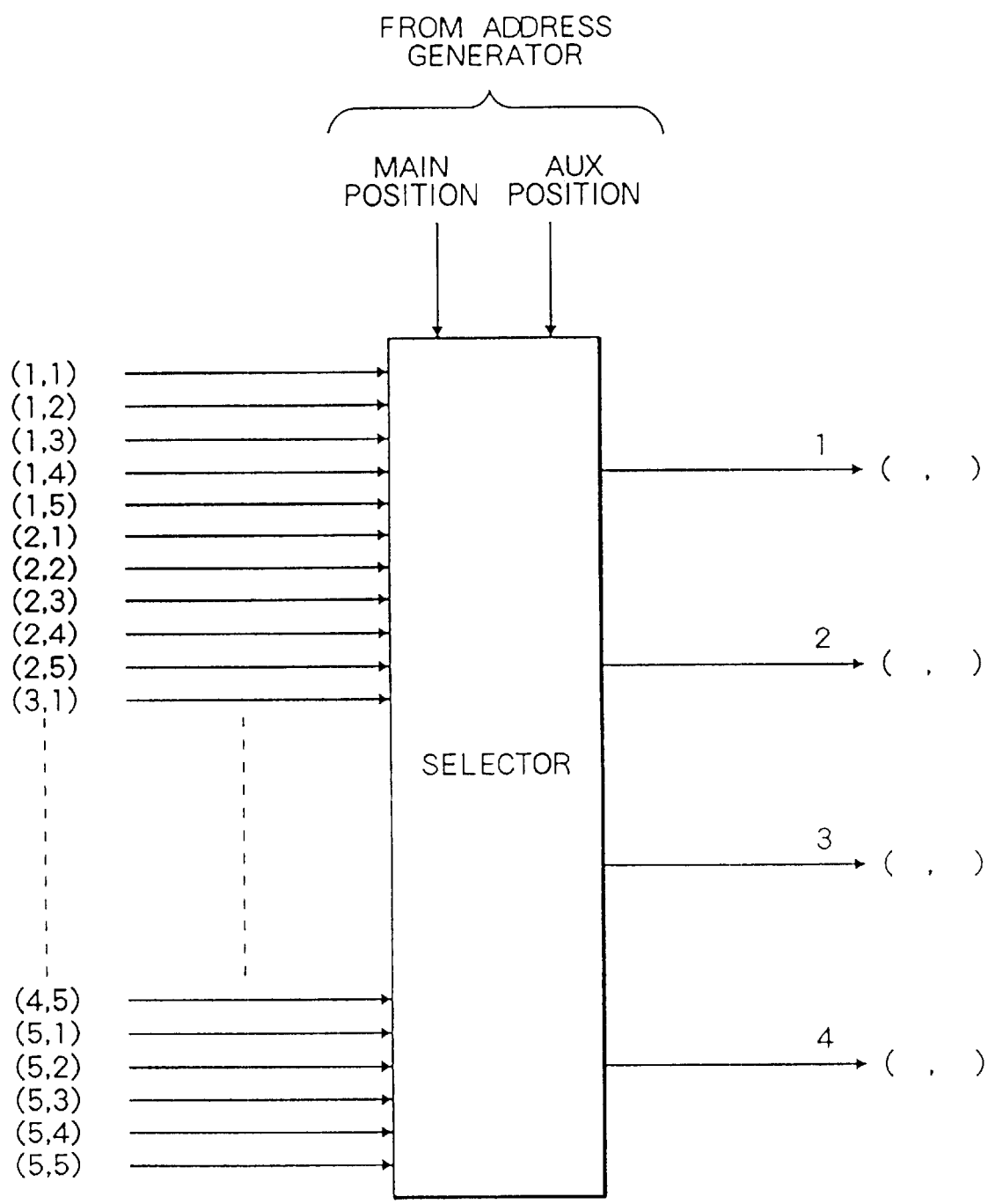
F I G. 49

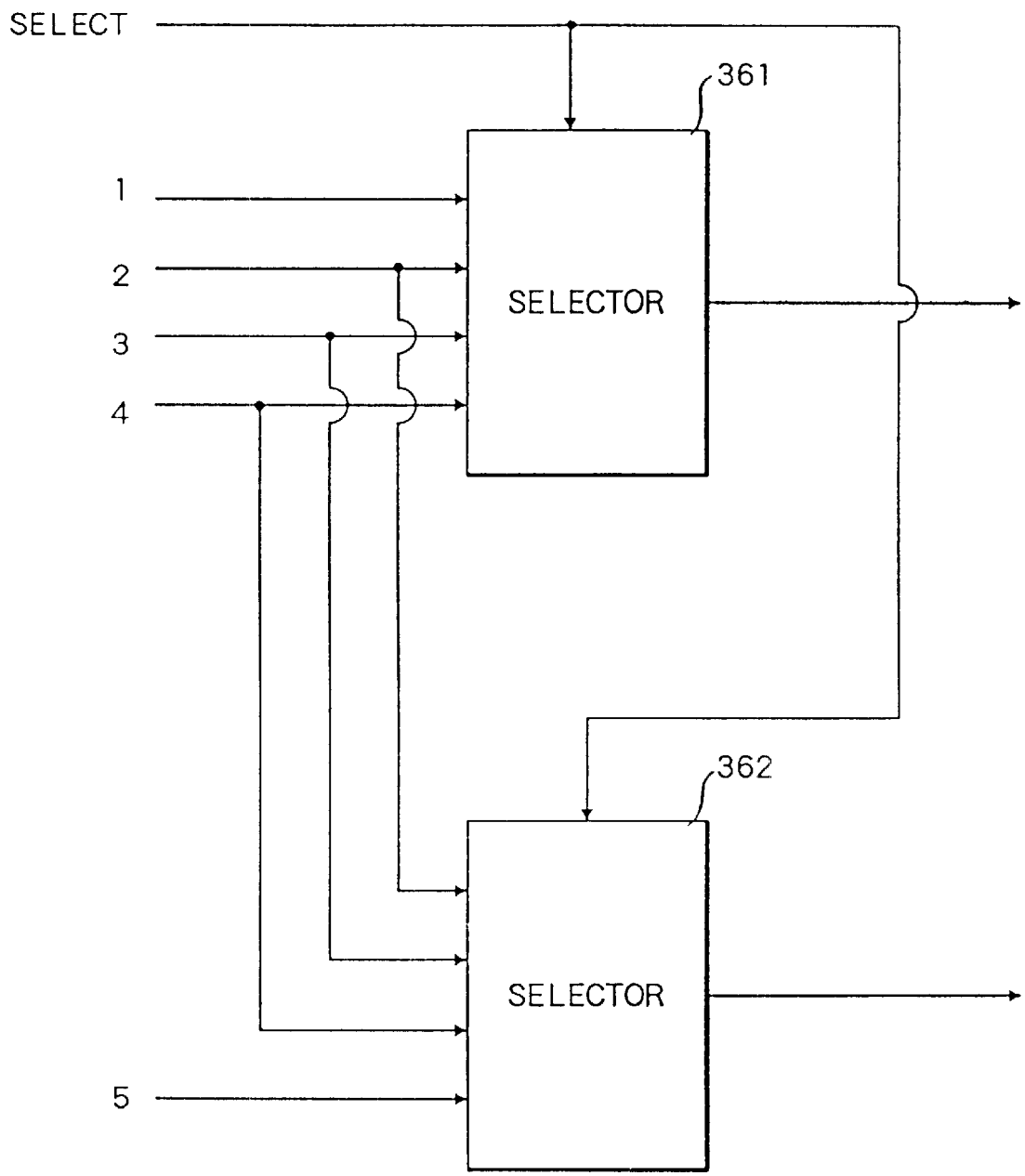
F I G. 51

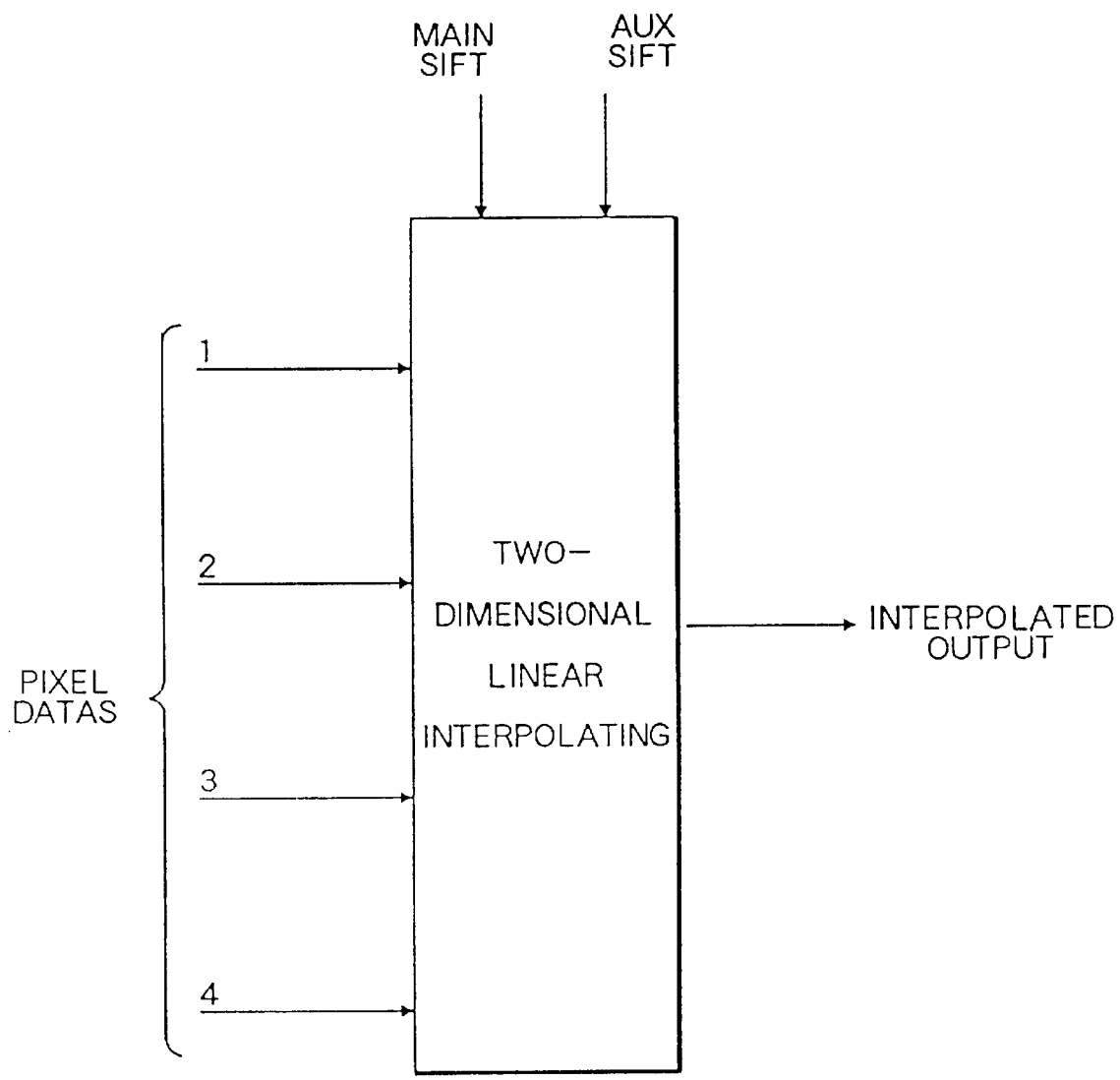
F I G. 52

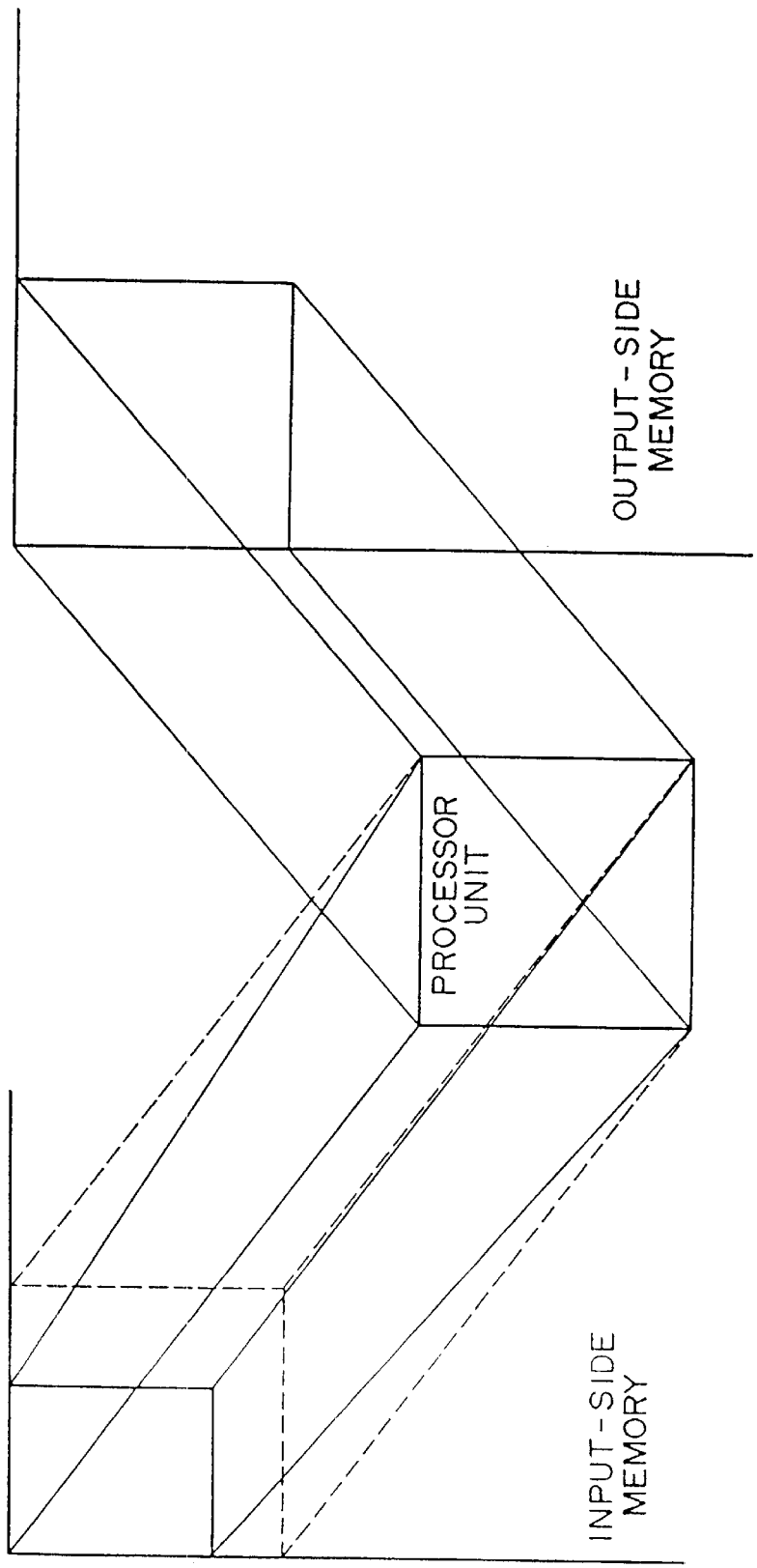
F I G. 53

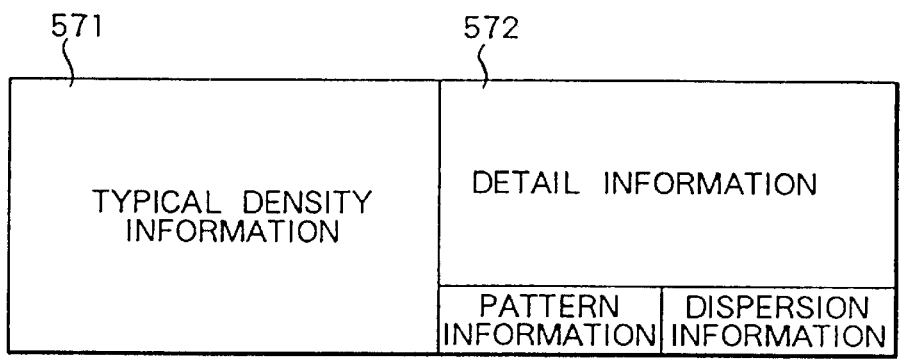
F I G. 55
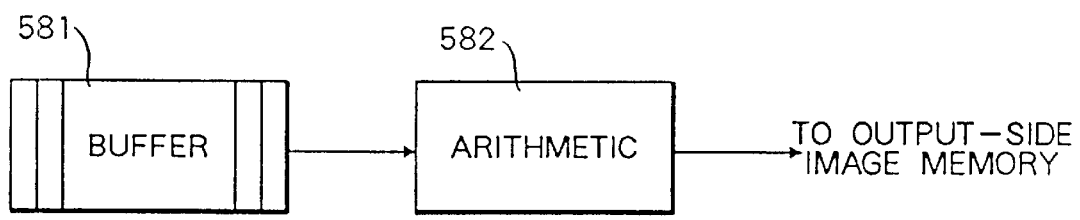
F I G. 56

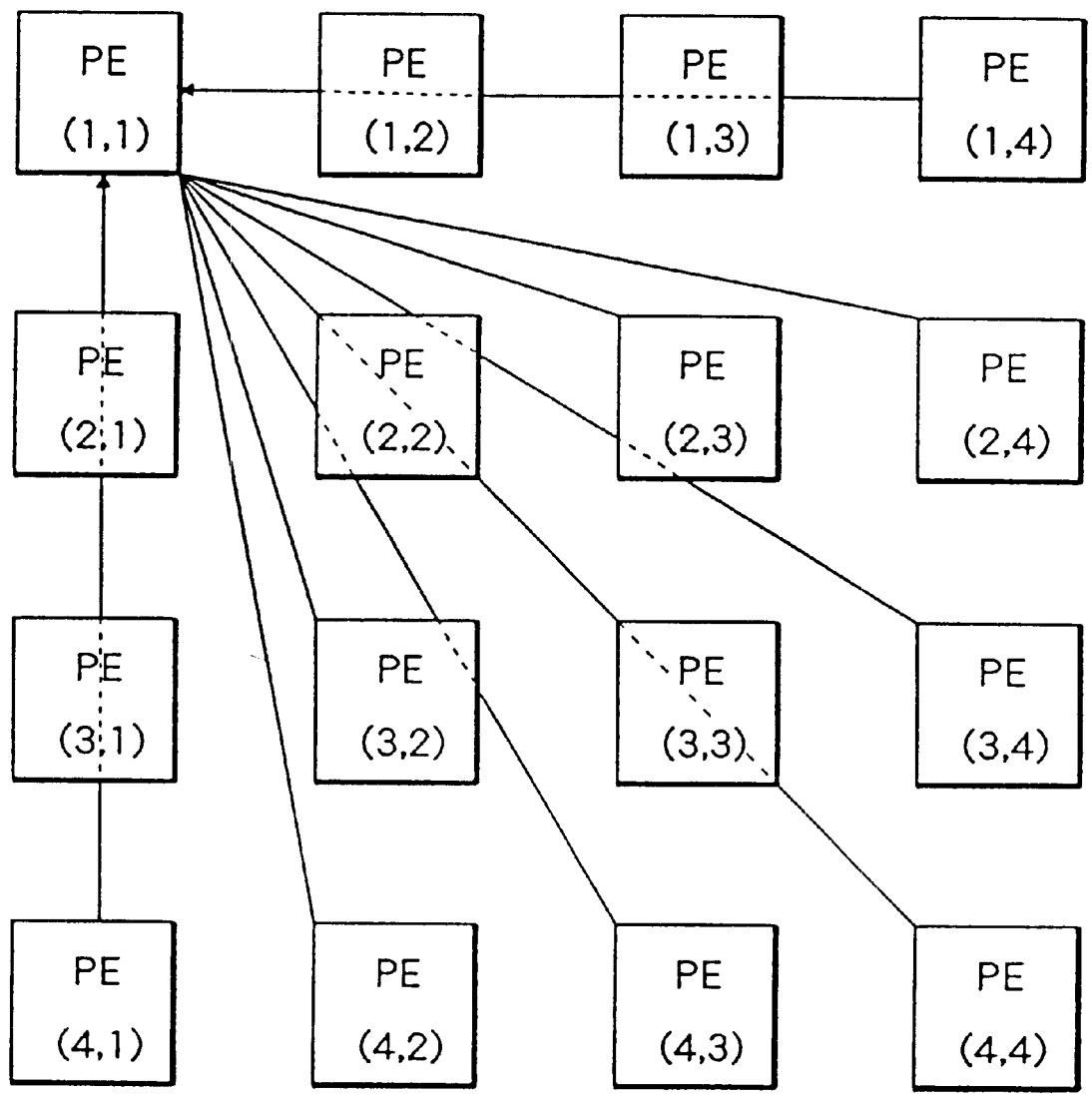
F I G. 58

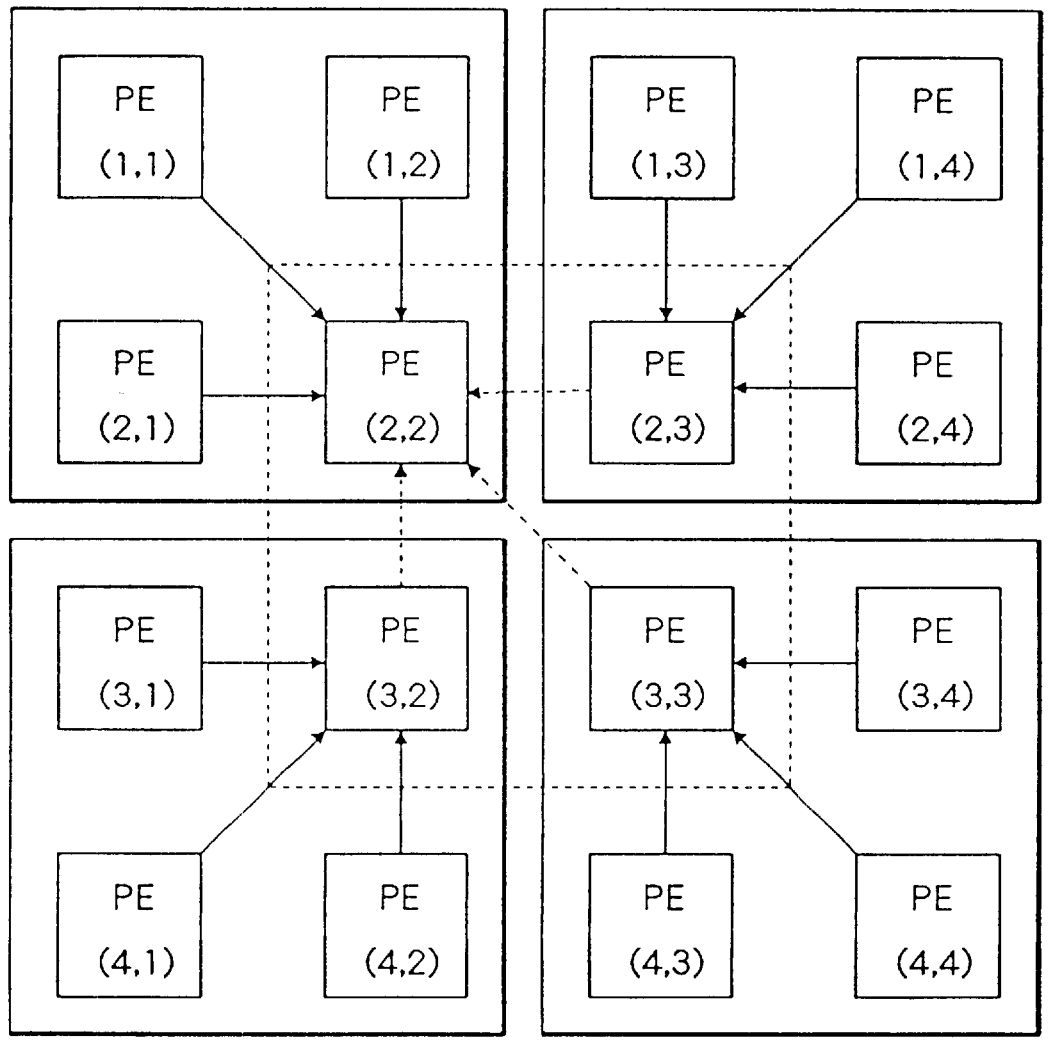
F I G. 59

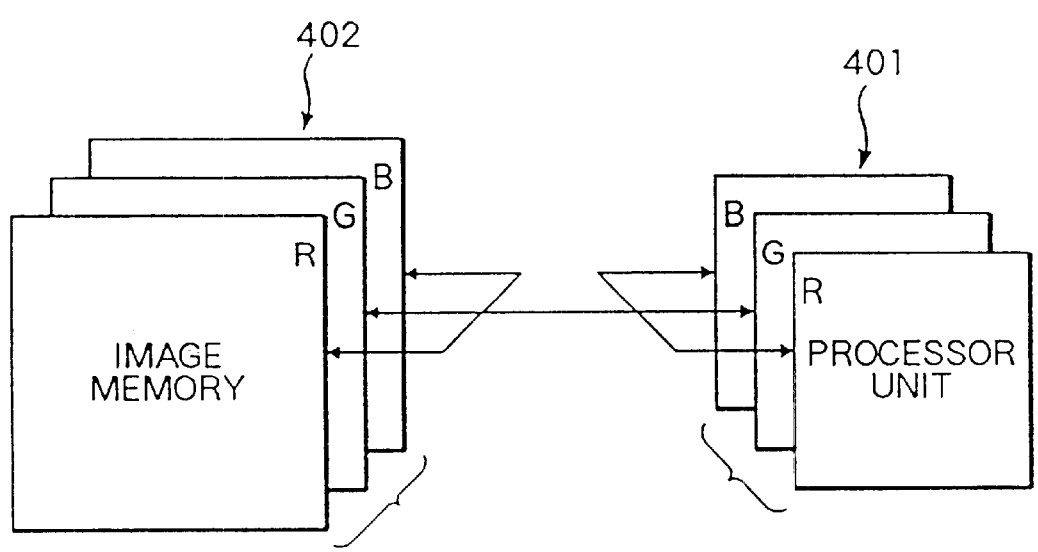
F I G. 61

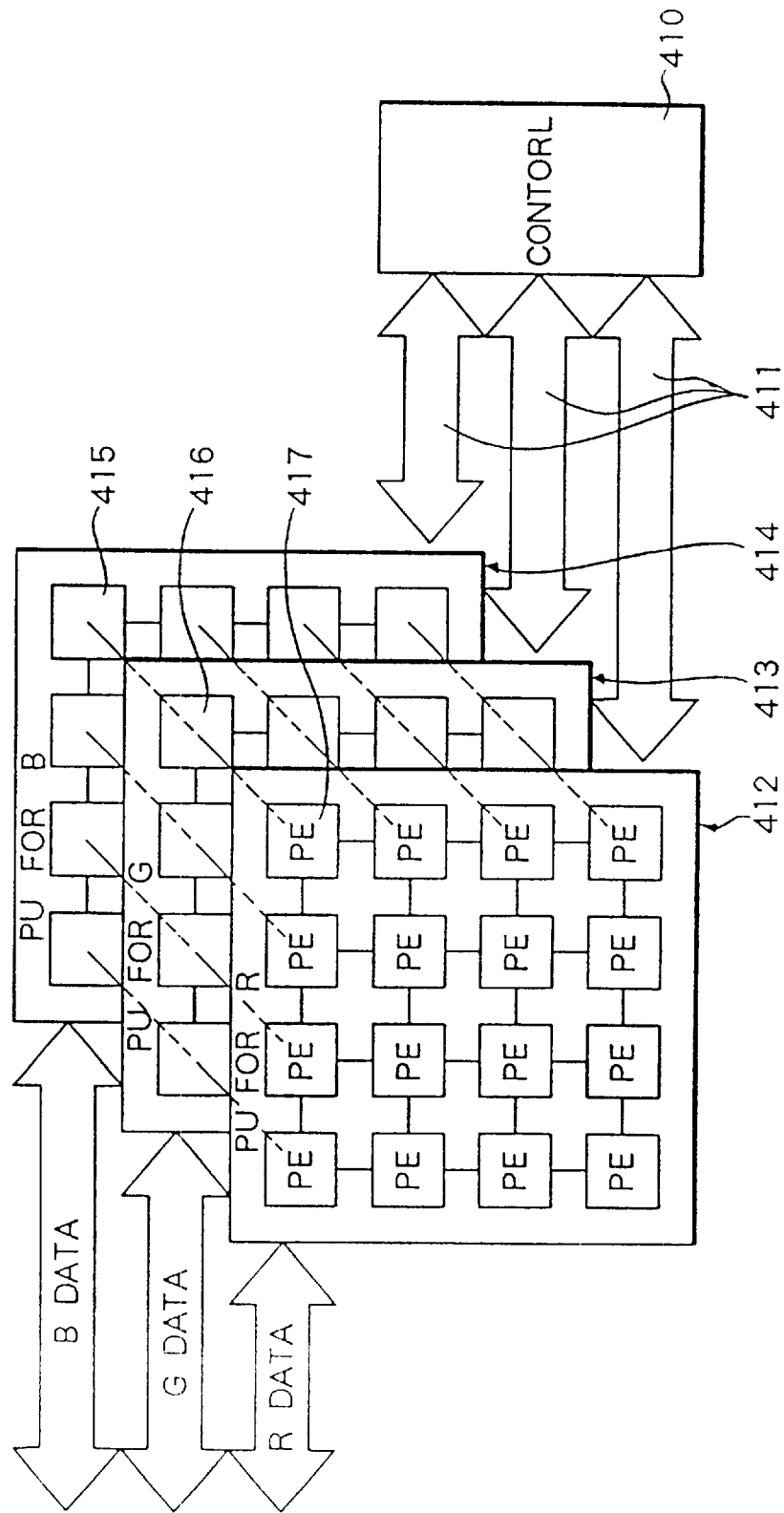
F I G. 62

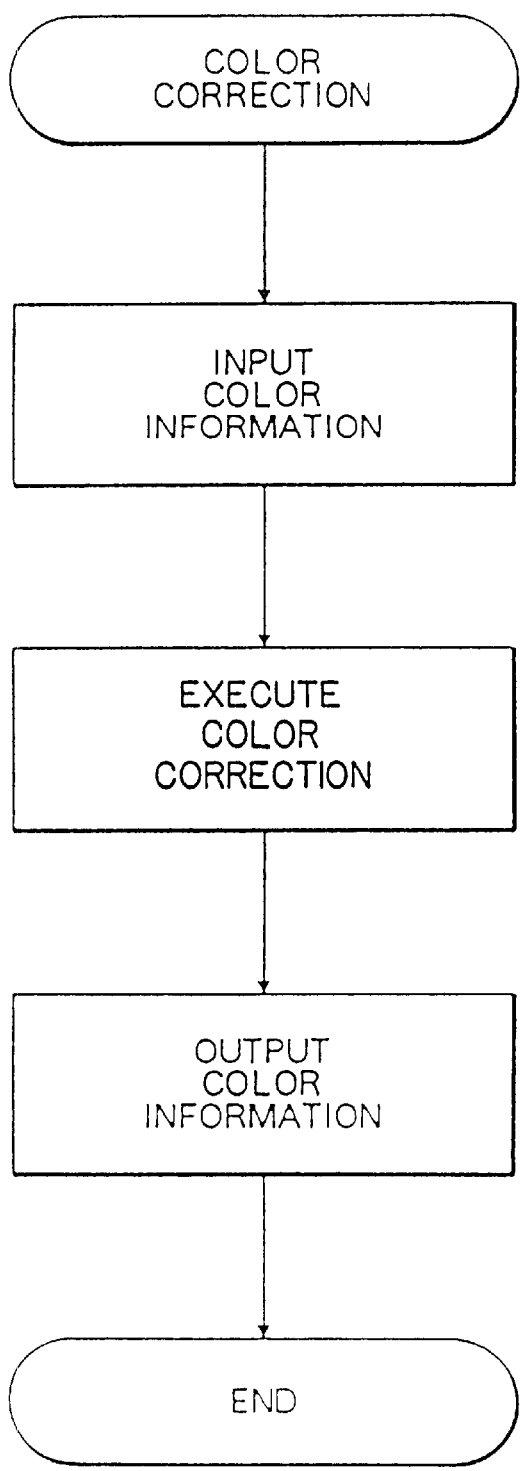
F I G. 63

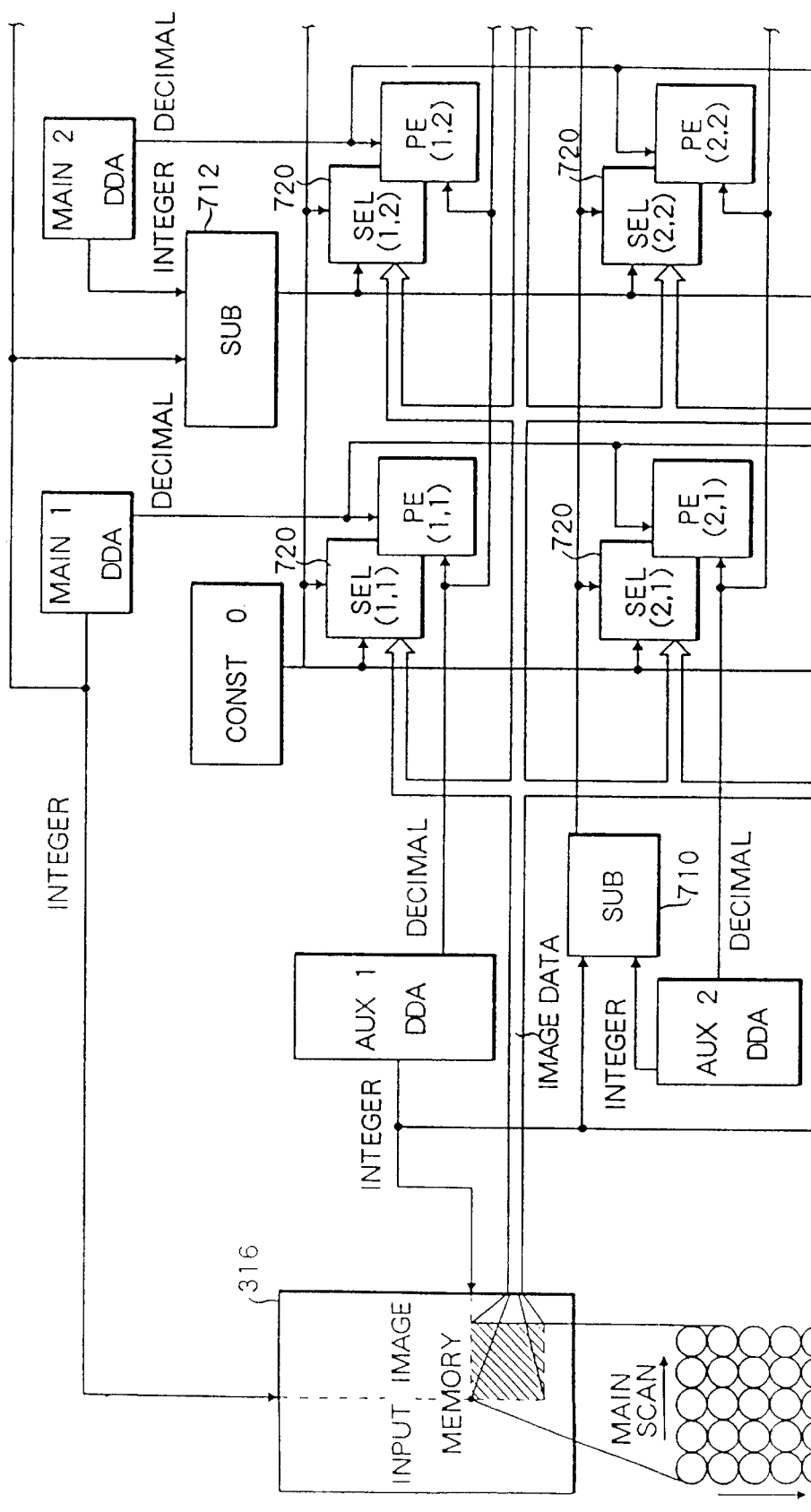
F I G. 66

IMAGE PROCESSING SYSTEM HAVING MULTIPLE PROCESSORS FOR PERFORMING PARALLEL IMAGE DATA PROCESSING

This application is a division of application Ser. No. 08/751,560 filed Nov. 18, 1996, now U.S. Pat. No. 5,692,210, which was a continuation of application Ser. No. 08/460,554 filed Jun. 2. 1995, now abandoned, which was a continuation of application Ser. No. 08/165,839 filed Dec. 14, 1993, now abandoned, which was a division of application Ser. No. 08/071,351 filed Jun. 3, 1993, now U.S. Pat. No. 5,293,481, which was a continuation of application Ser. No. 07/670,460 filed Mar. 12, 1992, now abandoned, which was a continuation of application Ser. No. 07/155,845 filed Feb. 12, 1988, now abandoned.

BACKGROUND OF THE INVENTION

1. Field of the Invention

This invention relates to an apparatus for the parallel processing of data. More particularly, the invention relates to a data parallel processing apparatus well-suited for application to an image processing system in which image data are processed at high speed and in parallel fashion by control of an image memory.

2. Related Art

When an image is processed at high speed, the general approach is to rely upon computer processing using software. However, higher processing speeds are required to deal with larger quantities of image data. There are two methods which can be adopted to raise processing speed. One is to rely upon sequential processing-type hardware or a so-called "pipeline" system. The other is to employ a parallel processing-type system in which a plurality of processors are arranged in parallel fashion. There is a limitation upon the image processing speed achievable with the former system since the clock frequency necessary for processing rises with an increase in the speed at which the picture data are processed. With the latter system, on the other hand, processing speed can be raised as much as desired by increasing the number of processors that are connected in parallel. In fact, speed can be maximized by providing a number of processors equivalent to the number of pixels. For this reason, the latter system represents a technique which is now the focus of much interest.

Here processing for communication between pixels takes on importance and it is necessary that processing proceed while such cross-communication is taking place. In the aforementioned parallel processing system, providing a number of processors equivalent to the number of pixels is impossible when dealing with high-resolution data. For example, when dealing with an image wherein a sheet of A4 size paper is read at 16 pixels/mm, the number of pixels is about 16M, and it would not be feasible to provide the system with this many processors simultaneously.

Accordingly, it is necessary to execute parallel processing using a finite, small number of processors. The specification of U.S. Ser. No. 807,662, filed on Dec. 11, 1985, proposes a technique for accomplishing such parallel processing, which involves dividing image data into a plurality of blocks each comprising plural items of image data, and processing the image data in each block by a respective one of a plurality of CPUs. The arrangement is such that each CPU receives an input of image data of the corresponding block as well as an input of image data of the adjoining blocks, and such that the CPU processes the image data of the corresponding block.

The proposed system still leaves room for improvement in terms of performance and construction.

SUMMARY OF THE INVENTION

A first object of the present invention is to provide a novel data parallel processing apparatus which represents an improvement of the prior art.

A second object of the present invention is to provide an image processing apparatus capable of executing image processing at high speed in a case where image information is processed by a plurality of processors.

A third object of the present invention is to provide an image processing apparatus capable of excellent spatial filtering processing in a case where image information is processed by a plurality of processors.

A fourth object of the present invention is to provide an image processing apparatus capable of excellent color processing in a case where image information is processed by a plurality of processors.

A fifth object of the present invention is to provide an image processing apparatus capable of excellent enlargement, reduction and rotation processing in a case where image information is processed by a plurality of processors.

According to the present invention, the foregoing objects are attained by-providing an image processing apparatus comprising an image memory and a processor unit. The image memory comprises a plurality of memory elements each capable of being addressed and accessed independently of other memory elements, wherein pixel data in each area of a plurality of areas obtained by dividing an image into the plurality of areas are assigned an identical address, and corresponding pixel data at identical positions in the areas are assigned to an identical one of the memory elements. The processor unit comprises a plurality of processor elements corresponding to the memory elements for simultaneously processing data of a plurality of pixels in the image memory. For example, the processor unit executes color conversion processing, image translating or image rotating.

Another object of the present invention is to provide a novel, efficient method of allotting image data to be processed by each processor in a case where image information is processed in a parallel by a plurality of processors.

In accordance with a preferred embodiment of the invention, this object is attained by providing a picture processing apparatus comprising an image memory and a processor unit. The image memory comprises a plurality of memory elements each capable of being addressed and accessed independently of other memory elements, wherein pixel data in each area of a plurality of areas obtained by dividing an image into the plurality of areas are assigned an identical address, and corresponding pixel data at identical positions in the areas are assigned to an identical one of the memory elements. The processor unit comprises a plurality of processor elements corresponding to the memory elements for simultaneously processing data of a plurality of pixels in the image memory. Thus, the pixel data in each area can be handled at high speed.

Still another object of the present invention is to provide an image processing apparatus adapted so as to execute complicated processing in a simple manner when image information is processed in parallel by a plurality of processors.

In accordance with a preferred embodiment of the invention, this object is attained by providing a picture processing apparatus comprising dividing means for dividing image data into a predetermined number of predetermined areas, and a plurality of processors the number whereof is equivalent to the number of divided areas, each processor having processor elements corresponding to the types of processing results.

A further object of the present invention is to provide an image processing apparatus adapted so as handle, in excellent fashion, input image information of a plurality of types.

Yet another object of the present invention is to provide a data parallel processing apparatus capable of processing a large quantity of data at high speed, in a multifunctional manner.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a view in which one frame of an image is correlated with the addresses of memory elements;

FIG. 3 is a view showing the entirety of a memory comprising 4×4 memory elements;

FIGS. 9(a) and (b) are block diagrams illustrating the construction of other embodiments of an image processing apparatus;

FIG. 10 is a view showing one frame of an image;

FIG. 11 is a view showing k×l memory elements;

FIGS. 12 and 13 are views illustrating one memory unit;

FIGS. 14 and 15 are block diagrams illustrating memory element access control circuits;

FIG. 16 is a view showing one frame of an image;

FIG. 18 is a block diagram showing an address converting circuit;

FIG. 19(b) is a block diagram for a case where a logical operation unit in FIG. 19(a) is realized by a microprocessor.

FIGS. 21(a), 21(b), and 21(c) are useful in describing a masking operation;

FIG. 22 is a flowchart illustrating the procedure for density conversion;

FIG. 23 is a flowchart illustrating the procedure for color conversion;

FIG. 24 is a flowchart illustrating the procedure for a masking operation;

FIG. 25 is a view illustrating an image data array prior to rotation processing;

FIG. 26 is a view illustrating a state which results when rotation is carried out in terms of pixel blocks;

FIG. 27 is a view illustrating a state which results when rotation is carried out in terms of pixel units within blocks;

FIG. 29 is a view illustrating an arrangement of pixels within blocks after rotation processing within pixel blocks;

FIG. 30 is a block diagram of a circuit for implementing rotation processing;

FIG. 31 is a view illustrating a block data selecting circuit;

FIG. 32 is a view exemplifying the realization of of an intra-block address converting circuit;

FIG. 33 is a view showing a circuit for generating an intra-block address prior to a conversion;

FIG. 34 is a block diagram of another circuit for implementing rotation processing;

FIG. 35 is a view showing area subdivisions and scanning with relation to an image;

FIG. 36 is a view illustrating portions not subjected to spatial filtering processing;

FIG. 37 is a block diagram of an image processing apparatus for executing spatial filtering processing;

FIG. 38(a) is a view illustrating the enlargement and scanning of areas obtained by dividing a single frame;

FIG. 38(b) is a view illustrating a portion of an area;

FIG. 39 is a block diagram illustrating another arrangement of an image processing apparatus which executes spatial filtering processing;

FIG. 40 is a view illustrating a data control circuit;

FIG. 41 is a block diagram illustrating a processor element;

FIG. 43 is a view illustrating the transfer of data among processor elements constituting a processor unit;

FIG. 46 is a conceptual block diagram illustrating magnification processing;

FIG. 47 is a block diagram showing the address generator portion of the processor unit;

FIG. 49 is a conceptual view of a data selecting circuit in each processor element;

FIG. 51 is a block diagram showing the details of a main scanning selector and an auxiliary scanning selector in FIG. 50;

FIG. 52 is a conceptual view of a two-dimensional linear interpolating circuit;

FIG. 53 is a view representing the correspondence between input/output pixel area sizes and a processor unit array size;

FIG. 55 is a view showing the format of image reduction data used in the present embodiment;

FIG. 56 is a functional view of each processor element according to the present embodiment;

FIGS. 58 and 59 are schematic views illustrating the operation of each processor element according to the present embodiment;

FIG. 61 is a view showing the relationship between image memories and processor units according to an embodiment of the invention;

FIG. 62 is a view showing the details of a processor unit according to this embodiment of the invention;

FIG. 63 is a flowchart of processing for color control according to an embodiment of the invention;

FIG. 66 is a view illustrating the construction of a processor unit 312 in FIG. 46 and an area accessed by the processor unit 312 in an image memory 316 for inputs;

DESCRIPTION OF THE PREFERRED EMBODIMENTS

[First Embodiment]

An embodiment of the present invention will now be described.

Figure 1:
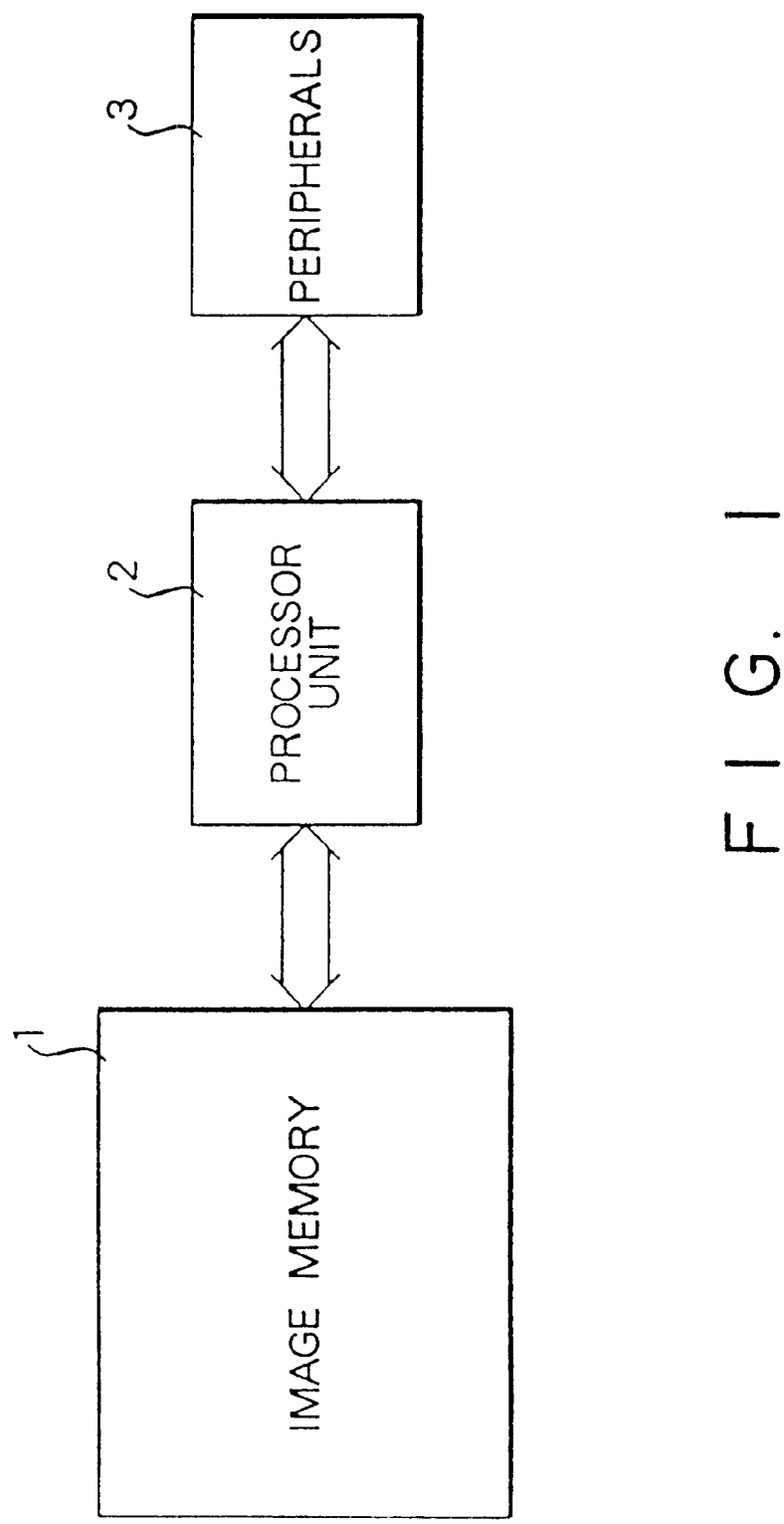
FIG. 1 is a block diagram illustrating an embodiment of an image processing apparatus according to the present invention.

An image processing apparatus according to this embodiment of the invention comprises an image memory 1 for storing one page of an image, a processor unit 2 and a peripheral section 3 such as an input/output unit. FIG. 1 illustrates the arrangement of these basic components only and shows that the processor unit 2 is connected to the image memory 1. In FIG. 1, n×m items of image data at any of the locations in the image memory 1 are transferred to the processor unit 2, which is composed of an array of n×m processor elements 2a, where the data are processed at high speed and then returned to the image memory 1. The n×m processor elements 2a in the array execute their processing simultaneously. Thus, the architecture is of the type for so-called "parallel processing". FIGS. 9(a) and (b) illustrate other possible arrangements. In FIG. 9(a), image data from an image memory 91 on the input side are applied to a processor unit 92, which comprises a plurality of processor elements, where a plurality of pixels are subjected to prescribed processing in parallel fashion, with the resulting image data being stored is an image memory 93 on the output side. This is performed under the control of a control circuit 94, which is connected to the memories 91, 93 and the processor unit 92. In FIG. 9(b), the image memory 91 or 93 is connected to the processor unit 92, an input unit 95 and an output unit 96 by a common bus.

The image memory 1 will now be described in detail.

For the sake of simplicity, it will be assumed that the size of an image is 1024×1024 pixels and that the image memory stores data in the form of eight bits per pixel. Changing the image size is accomplished merely by changing the architecture of the embodiment. It will also be assumed that the processor unit 2 is composed of 4×4 processor elements 2a, for a total of 16 processor elements.

FIG. 2 is a view showing the arrangement of the image memory 1. If it is assumed that an image is composed of 1024×1024 pixels, as shown in the drawing, and then if the image is divided into units of 4×4 pixels each, the image will be split into 256×256 blocks, for a total of 64K (=65536) blocks. This may be reconstructed as shown in FIG. 3, in which it is imagined that there are 64K of the 4×4 pixel units (where each pixel has a length of eight bits). As for the address spaces of the memory, therefore, addressing takes place in three dimensions of 4×4×64K. If one memory chip is allotted the 64K pixels of one pixel position among the 4×4 array of pixels reconstructed as shown in FIG. 3, then it will be required to have a memory chip in which each address has a depth of eight bits for the 64K address spaces. This would necessitate a memory chip having a capacity of 512K bits (=64K bytes). In the present embodiment, two dynamic RAMs (D-RAMs) of 256K bits each are used in combination. In other words, two 256K bit D-RAMs, each composed of 64K×4 bits, are used and these are employed in the form 64K×8 bits. These two memory chips will be referred to as a memory element 1a. Hereinafter, a processor unit will be indicated "PU", a processor element "PE" and a memory element "ME".

Figure 4:
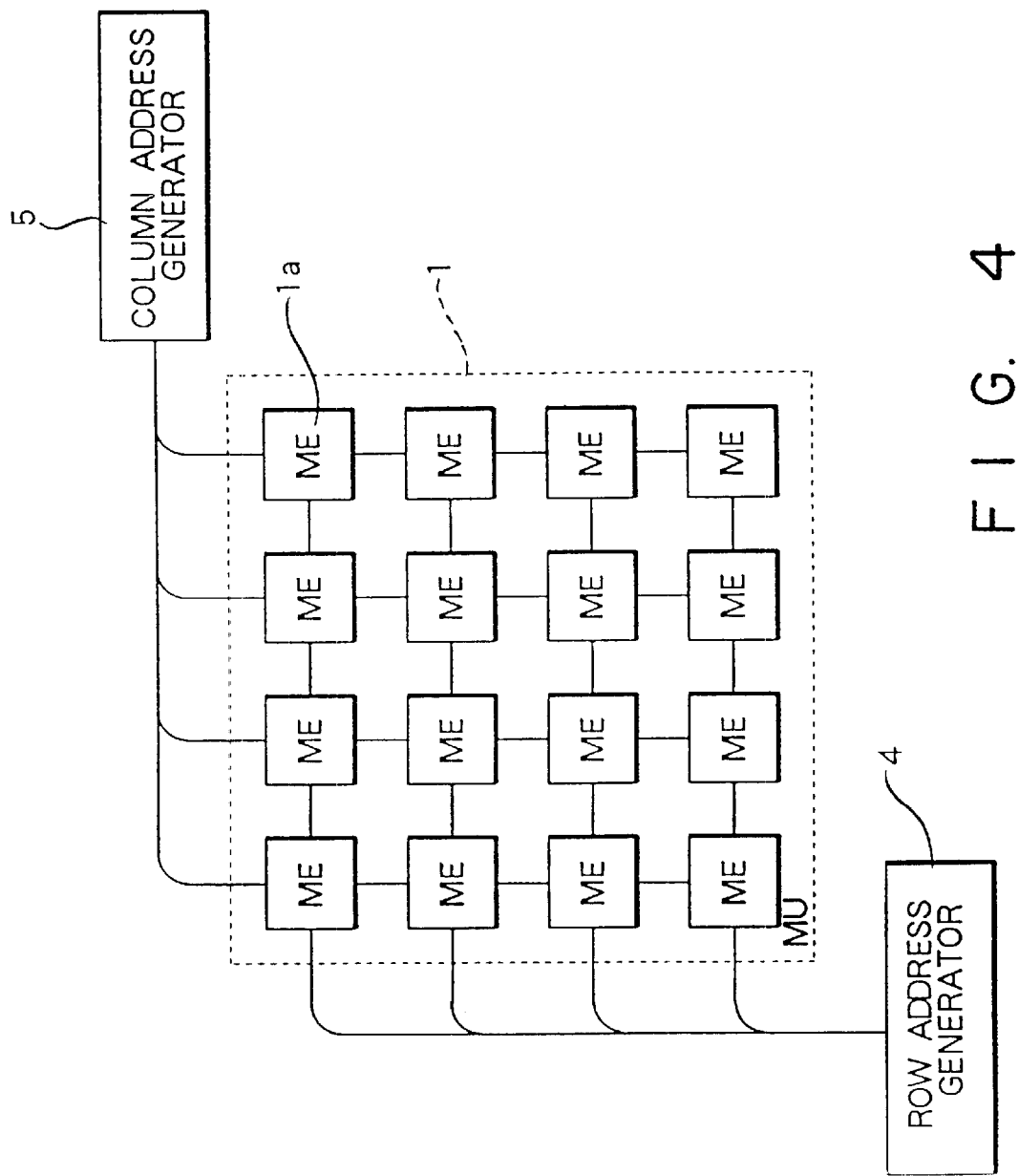
FIG. 4 is a view illustrating the memory and the associated address generators.

The image memory 1 is composed of 16 of the memory elements 1a corresponding to a matrix of 4×4 pixels. FIG. 4 illustrates the arrangement of these 4×4 memory elements 1a. Each memory element 1a has its row address and column address designated, and image data for the 64K address spaces of the one pixel among the 4×4 pixels can be inputted to or outputted from each memory element. A row address generator 4 and a column address generator 5 apply addresses to each of the 4×4 memory elements 1a. It should be noted that if memory elements 1a are D-RAMs and the row and column addresses are applied in a time-sharing fashion, only one address generator will suffice. If such is the case, changeover control for the time sharing of the row and column addresses will be required. Furthermore, the row and column addresses correspond to A, B, respectively, of each block indicated by $(A_1, B_1)$ in each frame shown in FIG. 2.

It is possible to read/write the memory elements 1a of the 4×4 pixels by applying the addresses from the respective address generators 4 and 5. That is, it is possible to drive 4×4 memory elements simultaneously by a single address designation. To this end, it is assumed that data lines for eight bits extend directly from each of the memory elements 1a.

If data for which the row address is A ($0 \leq A \leq 255$) and the column address is B ($0 \leq B \leq 255$) is called from the image memory 1, then image data composed of 4×4 pixels corresponding to the address (A,B) in FIG. 2 will be read out, with each pixel having a length of eight bits.

The accessing of a plurality of pixels simultaneously will now be described in general form.

FIG. 10 illustrates one page of an image. As shown, the image data are divided into adjoining blocks each composed of k×l pixels. As illustrated in FIG. 11, the k×l pixels in each block are correlated with k×l memory elements 1a. The blocks composed of these k×l pixels are numbered (0,0), (0,1), (0,2), (0,3), . . . starting from one end and correspond to the memory unit 1 comprising k×l of the memory elements 1a, as shown in FIG. 12. FIG. 13 shows the memory unit 1 expressed in two dimensions. Memory size when accessing the memory unit 1 is in units of block size of k×l pixels. Therefore, even if a block R of k×l pixels at arbitrary positions in memory unit 1 is accessed, all k×l of the memory elements 1a are accessed. Moreover, one address is accessed per one memory element 1a. Accordingly, k×l pixels are extracted at one time.

Thus, image data composed of k×l adjoining pixels at arbitrary positions in the image are accessed and read out at one time, after which these image data are processed by the processor unit 2. The image data processed by the processor unit 2 can be written back into a block H of k'×l' pixels the memory unit 1 by accessing arbitrary positions of the memory unit 1. The description that follows will be based on the assumption that k'=k, l'=l holds.

A supplementary explanation of accessing a memory of only the k'×l' pixels will now be given. If the processing performed by the processor 2 is spatial filtering processing based on an aritmetic operation using a pixel of interest and the pixels peripheral thereto, then the block size k'×l' accessed on the write side will be smaller than the block size k×l on the read side. In general, therefore, often processing is such that the block size k'×l' on the write side becomes 1×1. Even if the processing performed by the processor unit 2 is image reduction processing and not spatial filtering processing, the block size k'×l' accessed on the write side will be smaller than the block size k×l accessed on the read side.

In general, with regard to the block size k'×l' on the write side, the smallest integers that satisfy k'≧αk, l'≧βl, where the longitudinal and transverse reduction ratios are α, β, respectively, are k', l'. If the two examples of processing mentioned above are carried out when the read and write memories are identical or when the identical k×l memory arrangement is adopted, writing must be carried out in a size k'×l' smaller than the size k×l of memory unit 1 on the write side. In such case, all of the k×l memory elements 1a are not accessed. Instead, it must be arranged so that the memory elements 1a which are not pertinent to the write operation are masked and not accessed. Masking the memory elements which do not pertain to the write operation and simultaneously accessing only k'×l' memory elements can be accomplished with ease by sending enable signals only to the k'×l' elements among the chips of the k×l memory elements 1a and not to the remaining {(k×l)−(K'×l')} memory elements.

A case in which the memory unit has a 4×4 configuration and a case in which the memory unit has a k×l configuration will now be described in due course with regard to an embodiment wherein prescribed pixels at arbitrary positions are accessed. Chip enable control for the above mentioned masking will also be described.

Described first will be the embodiment for the case where the block size k×l is 4×4.

Figure 5:
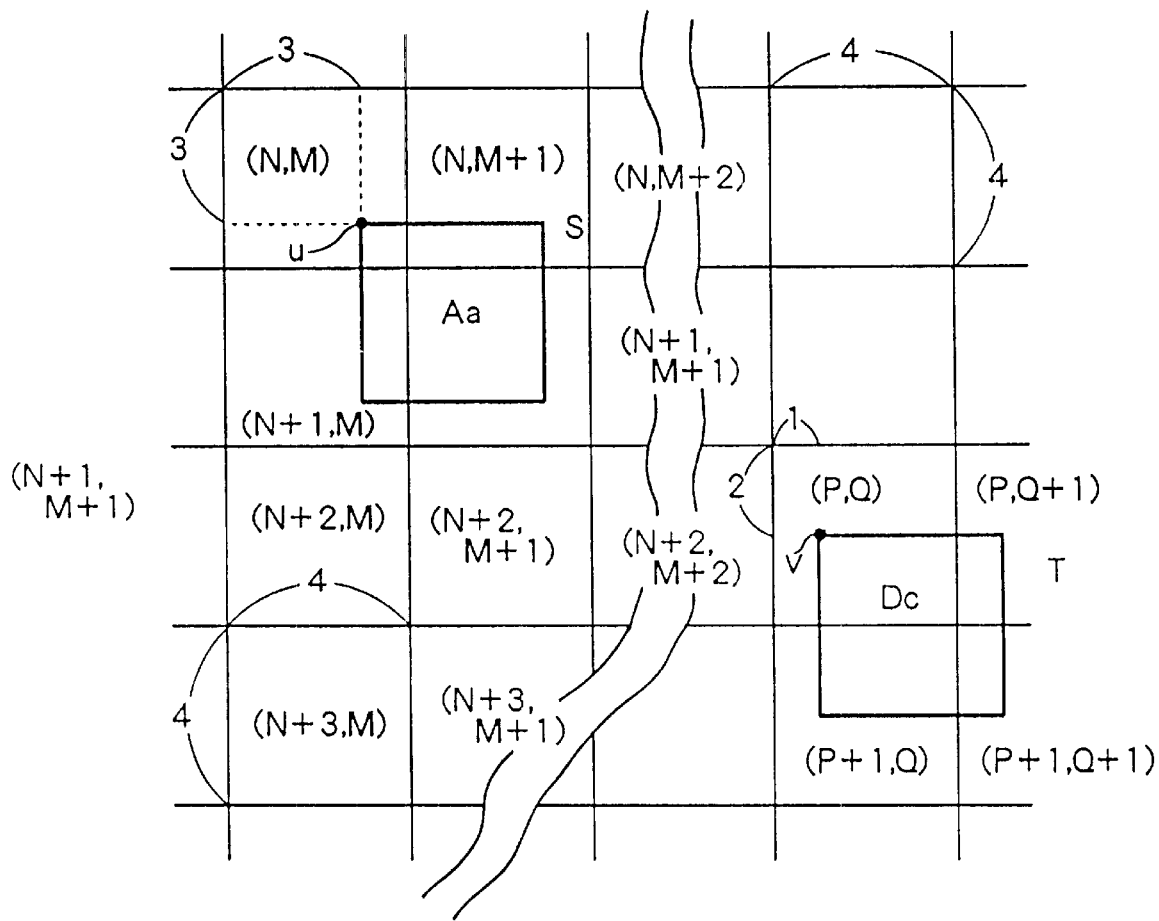
FIG. 5 is a view showing a portion of an image.

A portion of FIG. 2 is shown in enlarged form in FIG. 5. Processing will be described for a case where image data of any 4×4 block S in image memory 1 are read out, the data are processed by the processor unit 2 and the results are transferred to any 4×4 block T. (As shown in FIG. 5, the block S may overlap a plurality of the blocks shown in FIG. 2.) The 4×4 cells in FIGS. 5 and 6 mark off 4×4, or 16, of the memory elements 1a. Assume that these 16 memory elements 1a are named Aa, Ab, . . . , Ba, Bb, . . . , Ca, . . . , Dc, Dd. If the 4×4 block S is read out first, (N,M) are applied as the row and column addresses to the memory element Dd among the 16 memory elements 1a. Further, (N,M+1) are applied to the memory elements Db, Dc, Dd, (N+1,M) are applied to the memory elements Ad, Bd, Cd, and (N+1,M+1) are applied to the remaining memory elements. These addresses are generated by the row address generator 4 and column address generator 5. It will be obvious that if the position of an end point U of the 4×4 block S has been determined, the position addresses in the horizontal and vertical directions will be divided by four and the row and column addresses to be assigned up to the memory elements Aa–Dd will be uniquely decided by the remainders n, m. Let the position address of u be u(Y,X). We will then have the following:

$Y=4N+n$ ($n=0, 1, 2, 3$)

$X=4M+m$ ($m=0, 1, 2, 3$)

Figure 7:
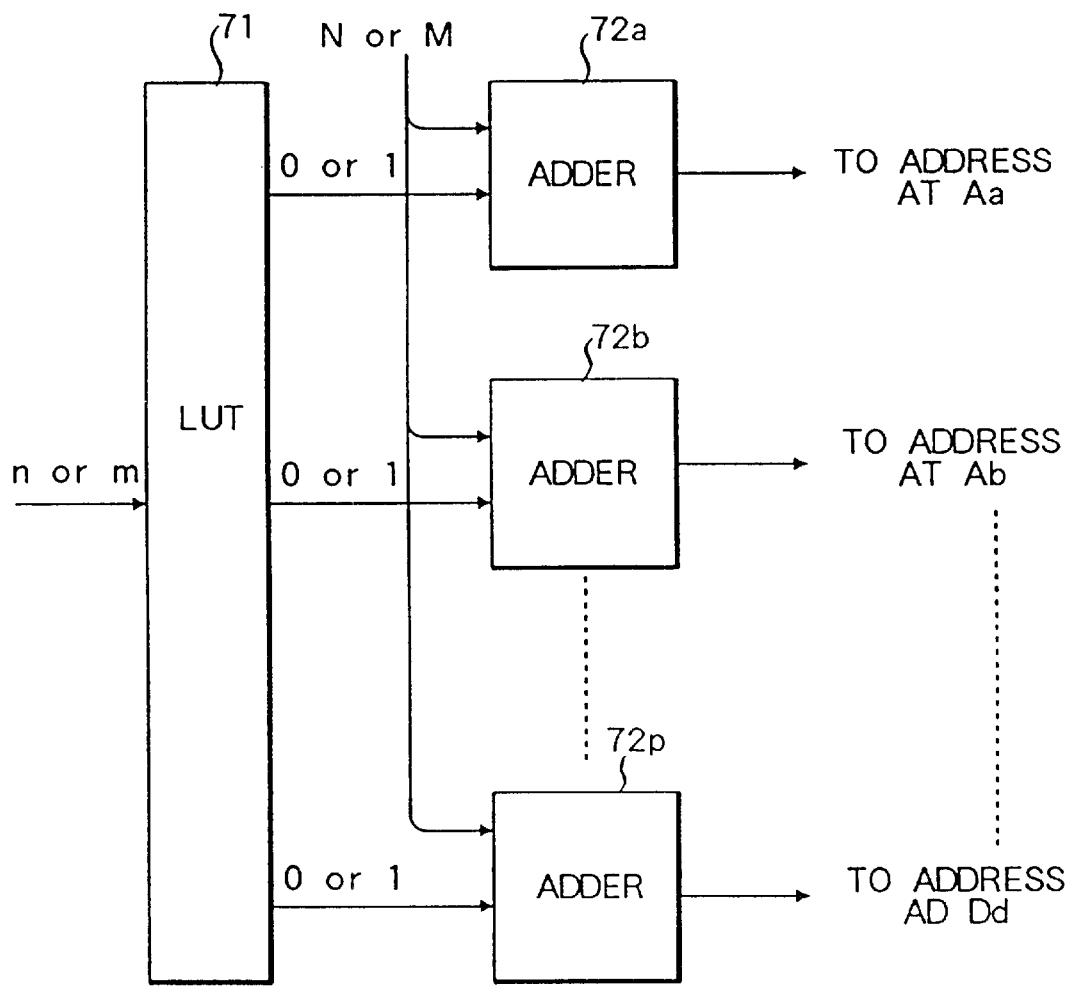
FIG. 7 is a block diagram illustrating a memory address control circuit.

For example, an arrangement can be conceived in which information M, N and information m, n is inputted to look-up tables and the addresses are outputted to the memory elements Aa–Dd by means of the address generators 4, 5. That the output at this time will be any one of M, N, M+1, N+1 is evident from the foregoing description. By utilizing this property, it will suffice to input n or m to a look-up table, output a 0 or 1 in dependence upon the value of the input, and exercise control to determine whether the address N or M applied to the memory elements Aa–Dd is to be incremented or not, as shown in FIG. 7. Here n, N are used at the row address generator 4 and m, M are used at the column address generator 5.

Thus, addresses from the address generators 4, 5 are applied to the 4×4 array of 16 memory elements 1a via a look-up table 71 and adders 72a–72p, which are shown in FIG. 7, so that 16 items of data can be obtained simultaneously.

These 16 items of data undergo some processing in the processor unit 2, or undergo no processing at all, and are then transferred to the 4×4 pixels block T shown in FIG. 5. However, the image data read out of the 16 memory elements As–Dd are not necessarily transferred to the same memory elements Aa–Dd, respectively. In a case where the 4×4 pixels memory block S of FIG. 5 is transferred to 4×4 pixels memory block T, the data read out of the memory element Aa of the 4×4 pixels memory block S must be transferred to the memory element Dc.

It will now be described into which memory elements of the memory elements Aa–Dd the 16 items of data read out of the memory elements Aa–Dd should be written when the 4×4 memory blocks S, T have arbitrary positions (Y,X), (Y',X') as their starting points u, v, respectively.

When Y, X, Y' and X' are expressed as follows:

$Y=4N+n$ ($n=0, 1, 2, 3$)

$X=4M+m$ ($m=0, 1, 2, 3$)

$Y'=4P+p$ ($p=0, 1, 2, 3$)

$X'=4Q+q$ ($q=0, 1, 2, 3$)

x, y are obtained from:

$p-n=4y'+y$ ($y'=-1, 0$ $y=0, 1, 2, 3$)   (1)

$q-m=4x'+x$ ($x'=-1, 0$ $x=0, 1, 2, 3$)   (2)

First, the row array A comprising (Aa,Ab,Ac,Ad) is rotated x times in the rightward direction. This shall be named a row array A'. Similarly, row arrays B, C and D are rotated x times in the rightward direction, and the resulting row arrays shall be names row arrays B', C' and D'.

Next, column arrays (ABCD)' comprising row arrays A', B', C' and D' are rotated y times in the downward direction.

In the case of FIG. 5, the fact that n, m, p, q are 3, 3, 2, 1 is obvious from FIG. 5. Therefore, y'=−1, y=3, x'=−1, x=2 are obtained from Eqs. (1), (2). Consequently, the following matrix is obtained from the foregoing description:

When a rotation is made twice in the rightward direction, we have

A'=(Ac, Ad, Aa, Ab)

B'=(Bc, Bd, Ba, Bb)

C'=(Cc, Cd, Ca, Cb)

D'=(Dc, Dd, Da, Db)

and when a rotation is made three times in the downward direction, we have (Bc, Bd, Ba, Bb)

(Cc, Cd, Ca, Cb)

(Dc, Dd, Da, Db)

(Ac, Ad, Aa, Ab)                     (3)

Consider the matrix (3) in comparison with the following basic array (4):

Aa, Ab, Ac, Ad

Ba, Bb, Bc, Bd

Ca, Cb, Cc, Cd

Da, Db, Dc, Dd                    basic array (4)

The basic array (4) is obtained merely by arraying the data, which have been read out of the memory elements Aa–Dd, two dimensionally by arranging the data in order from left to right and from top to bottom. The matrix (3) corresponds to one obtained by arraying the data, which are to be written in the memory elements Aa–Dd, two dimensionally in order. More specifically, and by way of example, the array (3) indicates that the data read out of the memory element Aa is written in at the fourth row, third column. Referring to the basic array (4) shows that the fourth row, third column is Dc. Accordingly, it will be understood that the data read out of memory element Aa should be written in the memory element Dc.

This will be described in greater detail. Though it is readily noticeable that the data read out of the memory element Aa in FIG. 5 should be written in the Dc position, the displacement from Aa to the position of Dc is equivalent to a transition from the position address u to the position address v. Furthermore, since the memory elements 1a have the 4×4 arrangement, the remainders obtained by dividing the positions in the horizontal and vertical directions by 4 may be considered to be the displacements x, y of the memory elements. For example, if the displacements of u, v are multiples of 4, then the displacements x, y will be 0, so that data read out of a certain memory element will be written in the same memory element after undergoing processing.

Figure 8:
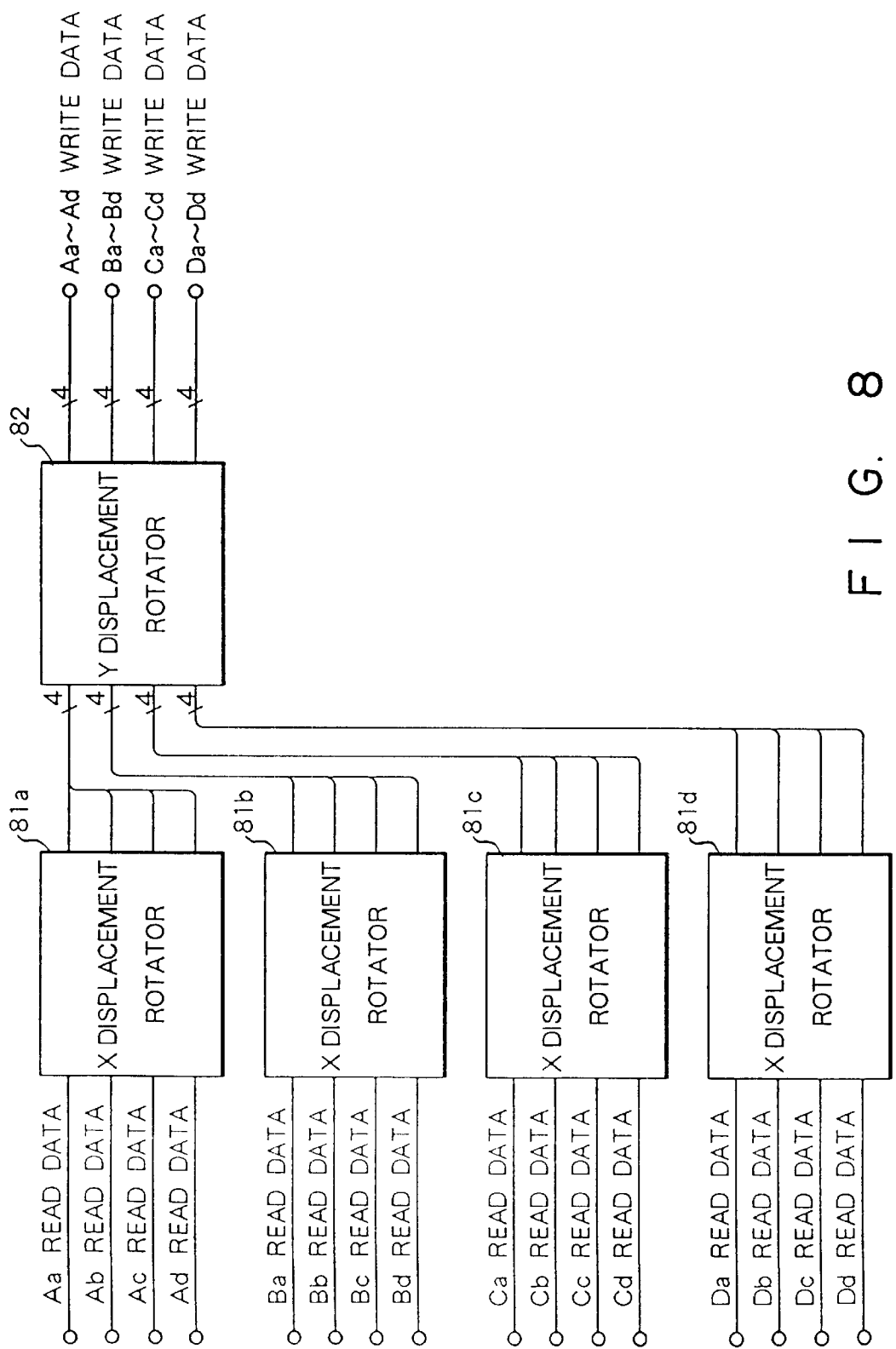
FIG. 8 is a block diagram of pixel data control.

Implementing the foregoing processing by hardware will now be described in brief. FIG. 8 is a block diagram in which data read simultaneously out of a memory unit 1 comprising a 4×4 array of 16 memory elements 1a are processed by the processor unit 2. These data are rotated four elements at a time by the number x in x displacement rotators 81a–81d. The results are then rotated by the number y by means of a y displacement rotator 82, and the outputs of the rotator 82 are written in the memory elements Aa–Ad, Ba–Bd, Ca–Cd, Da–Dd, respectively.

Each input to the y displacement rotator 82 is data of four elements, and hence it goes without saying that the y displacement rotator 82 can be constituted by four rotators exactly the same as the x displacement rotators 81a–81d. It goes without saying that the rotators may have a bit-number depth the same as that of the memory data depth, and that the number of rotators used may be the same as the depth of the memory data. It can be inferred that shift registers or bubble memories are capable of being employed as the rotators.

The foregoing will now be considered in more general terms.

If a memory block has a size of k×l, the memory unit 1 will have a k×l arrangement. In such case, if the memory block S composed of k×l pixels at arbitrary positions is processed by the processor unit 2 and the results are transferred to the memory block T composed of k×l pixels at arbitrary positions thereof, then n, m, p, q will be obtained from $Y=kN+n$ $(n=0, 1, \ldots, k-1)$ $X=lM+m$ $(m=0, 1, \ldots, l-1)$ $(N, M, P, Q$ are $1, 2, 3, \ldots)$ $Y'=kP+p$ $(p=0, 1, \ldots, k-1)$ $X'=lQ+q(q=0, 1, \ldots, q-1)$         (10)

[where the position address of the end point of S is (Y,X), and the position address of the end point of T is (Y'X')]

Using x, y in $p-n=Ky'+y(y'=1,0, y=0, 1, 2, 3, \ldots, k-1)$ $q-m=lx'+x(x'=1,0, x=0, 1, 2, 3, \ldots, l-1)$        (11)

it will suffice to execute processing by employing x displacement rotator 81a–81d and y displacement rotator 82 of the kind shown in FIG. 8. In such case, the x displacement rotator will have l inputs and be capable of a shift of from 0 to l~1. The y displacement rotator will have k inputs and be capable of a shift of from 0 to k~1. Moreover, since the k inputs of the y displacement rotator 82 have l elements, rotators having an input of k elements will be arranged so as to be l in number.

Described next will be memory element access control for simultaneously accessing the aforementioned k'×l' block, as shown in FIG. 10.

It will be assumed that the position address of the end point i of the k'×l' block is (f,g). If the memory accessed in accordance with Eq. (10) is read, f, g are substituted into Y, X. If the memory accessed in accordance with Eq. (10) is to be written, f, g are substituted into Y', X'. When the result is substituted into Eq. (11) to obtain y, x, the embodiment shown in FIGS. 7 and 8 can be applied directly to an arrangement generalized for k×l.

At such time, only the k'×l' memory elements among the k×l memory elements are chip-enabled. As for the chips enabled, if the position address of (f,g) of the end point i of k'×l' has been determined, then n,m or p,q are uniquely decided from Eq. (10), and k'×l' memory elements to be accessed are also uniquely decided.

In a memory arrangement comprising k×l memory elements as so far described, a case can be conceived in which a k'×l' block is accessed simultaneously on the read access side and a k"×l" block is accessed simultaneously on the write side (where 0≦k"≦k, 0≦l"≦l). However, the description rendered thus far will still hold even in this case. An embodiment of chip-enable control applied to the memory elements in this case is illustrated in FIG. 14.

If the position addresses of the end points of the k'×l', k"×l" blocks are (Y,X), (Y',X'), n,m and p,q are obtained from Eq. (10). Here n, m and p, q are applied to the data input terminals of a selector 141a. A memory access read/write signal R/W is applied to the selector as a selection control signal. When data are read, n, m are selectively outputted, and when data are written, p, q are selectively outputted.

Similarly, block sizes k'×l', k"×l" are inputted to a selector 141b, and so is the R/W signal serving as the selection control signal. When data are read, k', l' are selectively outputted, and when data are written, k", l" are selectively outputted. It is obvious that if n, m, k' and l' on the read side or k", l", p, q on the write side have been determined, the memory elements 1a to be accessed will be uniquely decided. Therefore, the data outputted by these selectors 141a, 141b are inputted to a look-up table 142, which outputs signals for controlling the memory elements 1a to be accessed amount the k×l memory elements.

It can readily be surmised that if the image memory before processing is performed by the processor unit 2 is separate from an image memory after processing as shown in FIGS. 9(a) and 9(b) and the memory arrangements are k×l and K×L, respectively, then two look-up tables 151,152 should be used, as shown in FIG. 15. In this case the look-up tables 151 and 152 would be tables having different contents.

No problems are encountered even if k=K, l=L hold. If the arrangement described above is adopted, the memory elements to be accessed will not be all of the k×l memory elements, and partial masking is possible. It will suffice if the arrangement of the k=l memory elements is set to the size k×l, which is the largest necessary.

How to access memory elements to process all image data corresponding to a full frame will now be described. In other words, the following description will relate to a scanning method for accessing all memory data.

Figure 6:
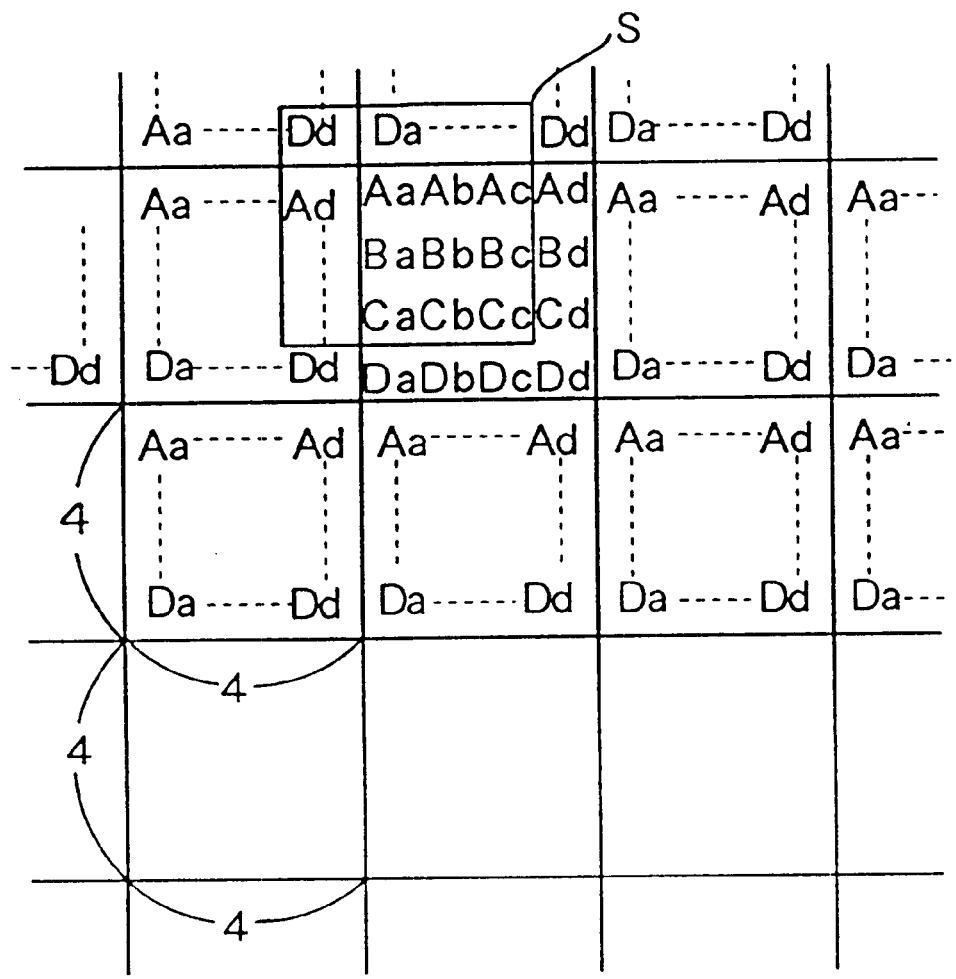
FIG. 6 is a view showing the assignment of memory for one portion of an image.

It has already been described with reference to FIGS. 5 and 6 how to access a memory in a case where the position address of the starting point u of adjoining k×l pixels block to be accessed has already been determined, namely in a case where Y, X have been determined, in which Y is the number obtained when counting in sequence from 0 in the vertical direction starting at the end point and X is the number obtained when counting in sequence from 0 in the horizontal direction starting from the end point. In what order X, Y should be scanned to process the full image will now be described by the following examples:

EXAMPLE 1
First Sequential Scanning Method

This is a method in which position addresses X, Y of image data for accessing k×l memory elements are scanned by being increased or decreased by an integral multiple of k, l. For example, Y, X are initially set to 0 and X is increased successively in increments of l. When X has been increased to the end point in the horizontal direction, X is then reset to 0, Y is increased by k and X is increased in increments of l. This is repeated sequentially to scan all or a part of a frame. This method is referred to as a first sequential scanning method.

EXAMPLE 2
First Random Scanning Method

X and Y are not increased and decreased sequentially as described above. Instead, consecutive k×l blocks here and there on the full frame of the image are accessed randomly, and the X, Y prevailing at the time of accessing are displacements which are an integral multiple of k, l. This method is referred to as a first random scanning method.

EXAMPLE 3
Second Sequential Scanning Method

This is a method in which position addresses X, Y of image data for accessing k×l memory elements are scanned by being increased or decreased by an integral number. For example, Y, X are initially set to 0 and X is increased successively in increments of 1. When X has been increased to the end point in the horizontal direction, X is then reset to 0, Y is increased by 1 and X is increased in increments of 1. This is repeated sequentially to scan all or a part of a frame. This method is referred to as a second sequential scanning method. In this case, the same memory data area accessed a number of times.

EXAMPLE 4
Second Random Scanning Method

X and Y are not increased and decreased sequentially as described above. Instead, k×l blocks here and there on the full frame of the image are accessed randomly, and this is executed for all X and Y. Alternatively, this processing is executed for X and Y for consecutive portions within the full frame of the image. When this is random, the method is referred to as a second random scanning method.

EXAMPLE 5
Blockwise Sequential Scanning Method

When a memory block to be accessed is a k'×l' memory block in a memory configuration having k×l memory elements, position addresses Y, X (1≦k'≦k, 1≦l'≦l) are increased or decreased by an integral multiple of k', l', and this is repeated sequentially to scan a full frame. This method is referred to as a blockwise sequential scanning method to distinguish it from the first sequential scanning method.

EXAMPLE 6
Blockwise Random Scanning Method

X and Y are not increased and decreased sequentially as described above in Example 5. Instead, consecutive k'×l' blocks here and there on the full frame of the image are accessed randomly, and X, Y are displacements which are an integral multiple of k', l'. This method is referred to as a blockwise random scanning method.

EXAMPLE 7
Sequential Scanning Method

Scanning is performed sequentially without relation to the memory configuration of the k×l memory elements. For example, scanning is performed by varying X, Y every other arbitrary number d', f'. This is referred to simply as sequentially scanning.

EXAMPLE 8
Random Scanning Method

If memory accessing is not performed with regard to all combinations of X and Y in the case of the random scanning of Example 7 or Example 4, the method is referred to simply as random scanning.

Though several scanning methods are conceivable as set forth above, memory accessing is possible on the read side and the write side, and the scanning method for memory accessing on the read side does not necessarily coincide with the scanning method for memory accessing on the write side.

If the scanning method has been decided for the read side, the X', Y' to be scanned on the write side are decided by the contents of processing performed by the processor unit 2. It is permissible to decide the scanning method for the write side first, in which case the scanning method for the read side is decided by the contents of processing performed by the processor unit 2.

If the block sizes k×l of the blocks to be accessed on the read side and write side also differ, then the size of the memory element configuration k×l will differ as well.

Figure 19A:
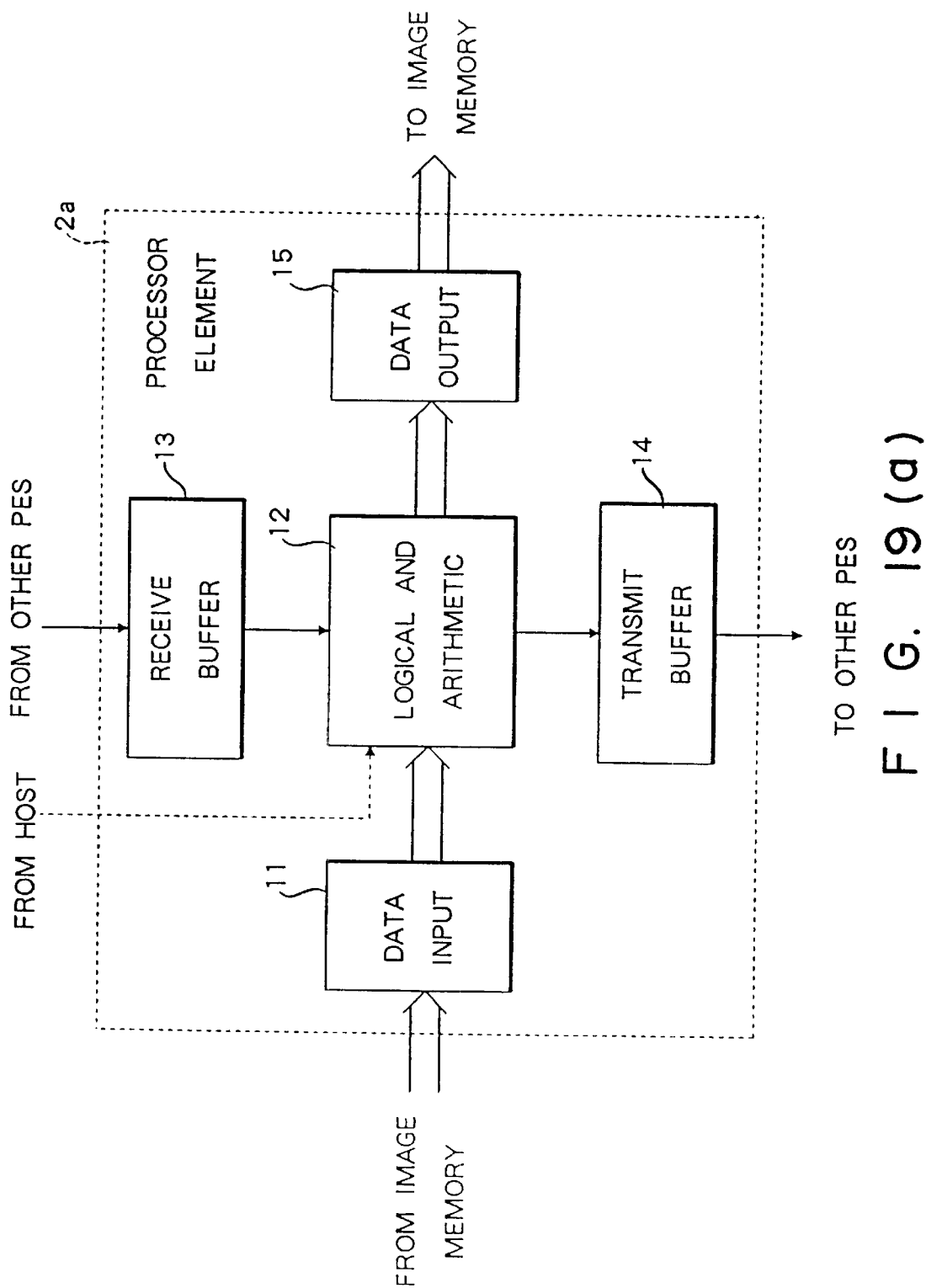
FIG. 19(a) is a block diagram illustrating the concept of PE construction.

FIG. 19(a) is a block diagram illustrating the concept of processor element (PE) construction. A logical and arithmetic operation unit 12, which receives image data from one or a plurality of memory elements via a data input unit 11 as well as data from one or a plurality of PEs via a receiving buffer 13, executes predetermined logical and arithmetic operations based on these data and outputs the results to one or a plurality of memory elements through a data output unit 15. The logical and arithmetic operation unit 12 also sends the data from the data input unit 11 or the results of the logical and arithmetic operations to one or a plurality of PEs through a transmitting latch 14.

FIG. 19(b) is a block diagram for a case where the logical and arithmetic operation unit 12 is realized by a microprocessor.

Connected to an internal bus 10 are a CPU 12a, a ROM 12b storing a control program and a RAM 12c for auxiliary memory, these components constituting the logical and arithmetic operation unit 12. Also connected to the bus 10 are the data input unit 11, data output unit 15, receiving buffer 13 and transmitting latch 14 shown in FIG. 19(a).

The individual PEs execute the same processing or processing of their own and exchange data with the other PEs. Under the control of a control program stored beforehand in each of the PEs, or under the control of an external control circuit or host computer, the overall processor unit composed of this PE group executes predetermined processing in parallel.

<Density Conversion, Color Conversion and Masking Operation of Image Data>

In case of processing for density conversion, color conversion and the like, these may be performed by a system which employs the first sequential scanning method on both the read and write sides. This will now be described in detail.

Color conversion refers to processing in which, when image data contain specific color information, the color information is converted into other predetermined specific color information.

In a masking operation, only a specific portion of the image data is outputted intact, with the rest of the image data being outputted as background (e.g. a white background), as shown in FIGS. 21(a)–21(c). Gray, colorless, or other data can be outputted as the background. FIG. 21(a) depicts data indicating a region to masked, FIG. 21(b) shows a masked image, and FIG. 21(c) shows the outputted results.

For a density conversion, it will suffice if each processor element 2a in the processor unit 2 operates in accordance with the flowchart shown in FIG. 22, which serves as one example. Here an output value Vout corresponding to an input value Vin is defined by the following equation, by way of example:

$$Vout = \frac{1}{64} \cdot Vin^2 \qquad (12)$$

The processor unit comprises 16 processor elements, each one of which is made to correspond to each of 4×4 pixels having a length of eight bits. Inputted to this processor unit 2 are 4×4 items of data of eight-bit length corresponding to the address (A,B) in FIG. 2. The processor elements 2a operate in parallel and each delivers output data. Consequently, 4×4 items of data of eight-bit length accessed at one time are processed at one time by the processor unit 2, and the results are outputted at one time. Thus, high-speed image processing is possible.

The processor elements 2a execute processing such as a density conversion, color conversion and a masking operation.

Figure 20:
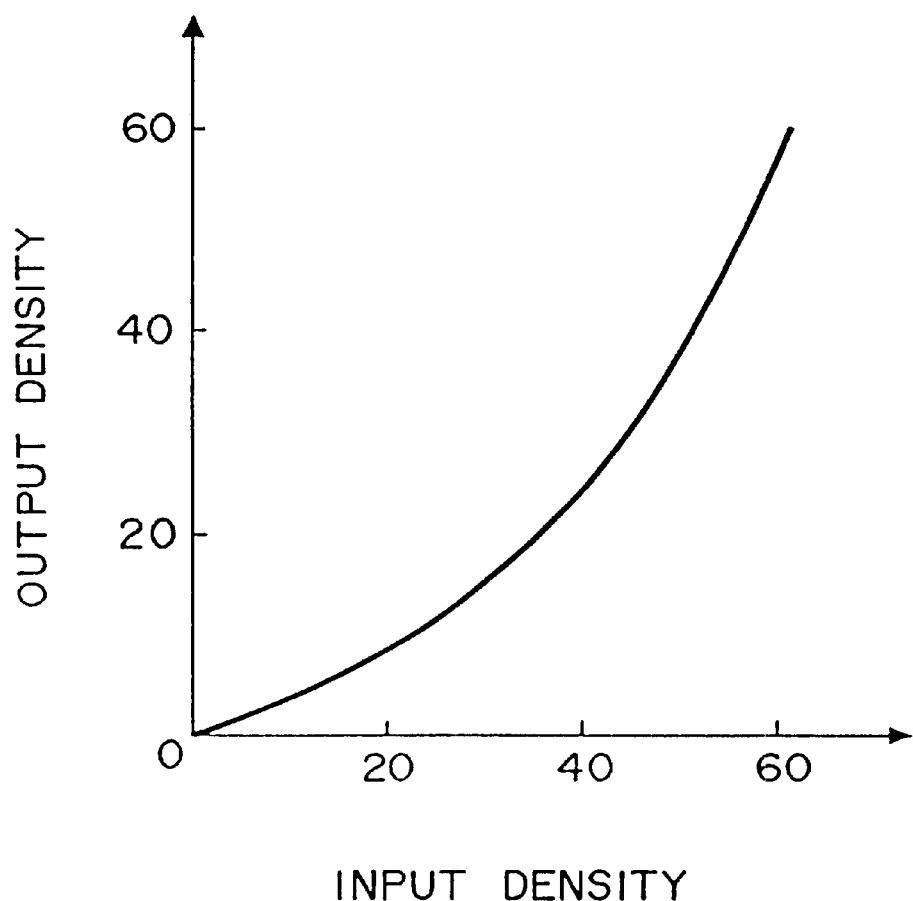
FIG. 20 is a graph useful in describing density conversion.

As described above, a density conversion involves changing an input value into a corresponding output value in accordance with a preset input density—output density correlation, and delivering the output value. This makes it possible to increase the contrast of an image and change the brightness thereof. FIG. 20 illustrates a density conversion for a case where the operation is executed in accordance with Eq. (12).

For a color conversion, it will suffice if each processor element 2a in the processor 2 unit operates in accordance with the flowchart shown in FIG. 23, which serves as one example. Here color information is expressed as a combination of, for example R, G and B, the aforementioned image memory is provided for R, for G and for B, and each memory is capable of holding data having a length of eight bits. Single identical processor elements correspond to corresponding image memory cells for R, G and B. A combination of specific R, G and B values is preregistered as a specific color, and color information after a change is similarly preregistered as a combination of certain R, G and B values. The specific colors may be plural in number, as a matter of course.

For a masking operation, it will suffice if each processor element in the processor unit operates in accordance with the flowchart shown in FIG. 24, which serves as one example. Here masking information refers to bit data held in a memory constituted by a bit map memory whose bits correspond to the respective cells of the aforementioned image memory. These data indicate whether or not they are within a mask. In this case also, single processor element correspond to the corresponding cells of the masking memory and image memory.

If it is arranged so that communication is possible among the processor elements 2a of the aforementioned processor unit 2, it will be possible to execute spatial filtering processing as well as recognition, compression and decoding processing within the processor unit 2.

[Second Embodiment]

Figure 17:
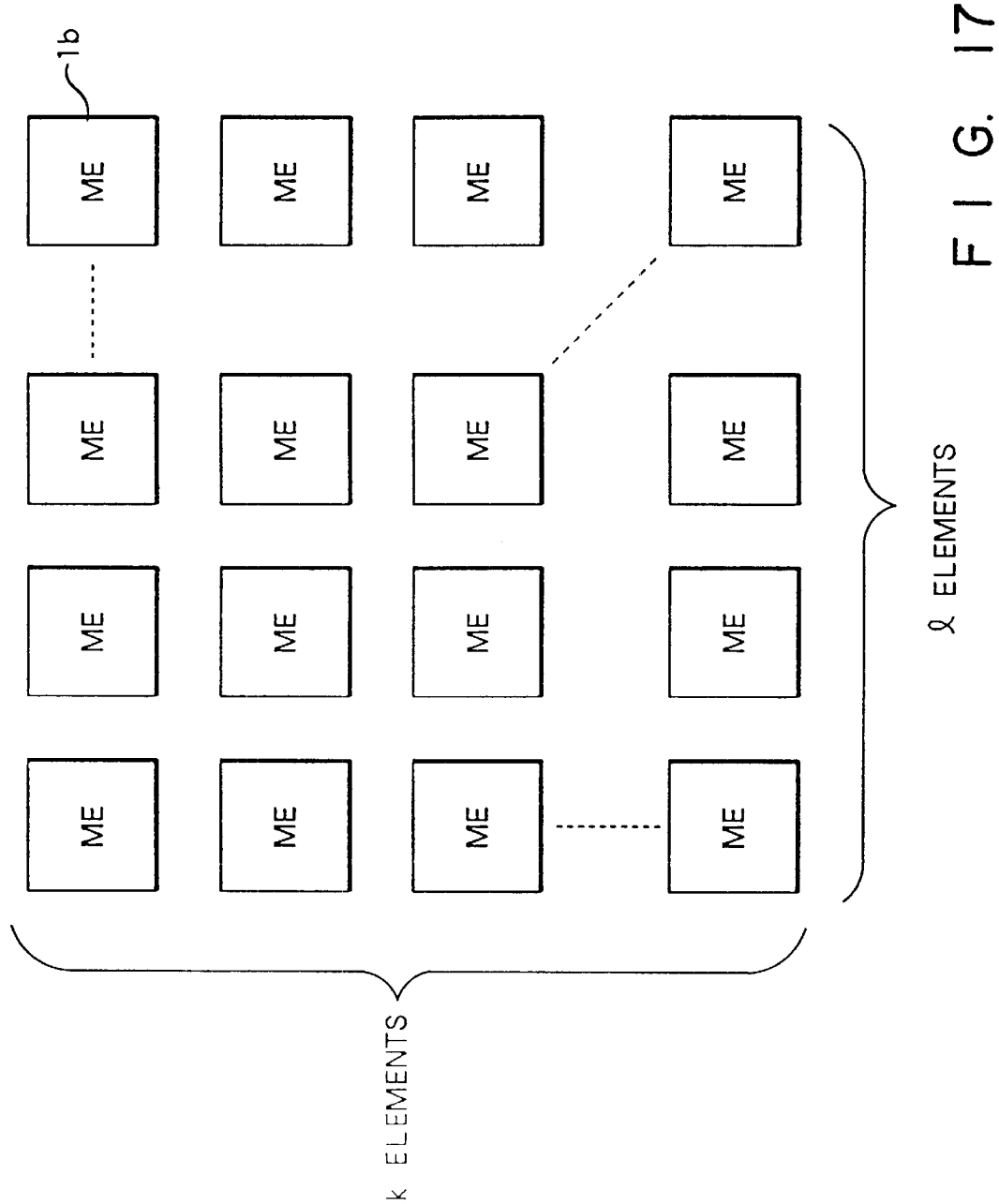
FIG. 17 is a view showing k×l memory elements.

A second embodiment will now be described in which image data are assigned to k×l memory elements for accessing k×l items of data simultaneously. FIG. 16 is a view illustrating a state that results when the information of one frame of an image is replaced by data. The information is divided into l equal portions horizontally and into k equal portions vertically. In order to describe the k×l areas resulting from this division, the areas are denoted by (0,0), (0,1), ... (0,l), ... , (k,l), and each individual area is assigned to a single individual memory element 1b, as depicted in FIG. 17. In other words, the number of memory elements 1b is equivalent to the number of subdivisions shown in FIG. 16. As for the assigning of the areas, each shaded portion shown in FIG. 16 is assigned to the 0 address of the respective memory element 1b, the neighboring image data is assigned to the 1 address of the respective memory element, and so on until all the assignments for one line in each area are completed. Assignments are then made is similar fashion for the second line from left to right. This is repeated until all the image data are assigned. When all of the addresses which the row address generator 4 and column address generator 5 of FIG. 4 apply to all of the k×l memory elements 1b are identical, random image data can be accessed at one time, as indicated by the shaded portions shown in FIG. 16.

By adopting an arrangement of this kind, it becomes possible to designate a certain address, read data out of the image memory 1 this this address, process the data in the processor unit 2 and then write in the resulting data without changing the address when the data are written into the k×l memory elements 1b. For example, if each of the areas is composed of K×L image data, as shown in FIG. 16, it will not matter if the read address and write address are identical in a case where processing is executed to move or transfer one portion of one frame of the image for a displacement which is an integral multiple of L in the horizonal direction and an integral multiple of K in the vertical direction. This greatly reduces the load on the components related to address control, such as the row address generator 4 and column address generator 5.

The processing for movement or transfer is executed by the processor unit 2. The processor unit 2 receives an input of k×l items of image data, as shown by the shaded portions illustrated in FIG. 16, and an input of image data over the entire frame. Since individual items of these data have a displacement which is an integral multiple of L and K in the horizontal and vertical directions, respectively, k×l items of data are exchanged or moved and transferred within the processor unit 2, and processing may be executed sequentially an in order from 0 with regard to all addresses of the memory elements. As a result, the entire frame can be processed.

In the present embodiment, it can be surmised that by adopting a 1×l or k×l arrangement for the k×l memory configuration and assigning one horizontal line or one vertical line in one frame of the image to each of the memory elements, the processing performed in the processor unit 2 can be applied to various image processing such as a histogram operation for one line of an image or a one-dimensional Fourier transformation. Furthermore, when a plurality of pixels are accessed simultaneously, to which addresses of what memory elements the data in one frame of an image are assigned is in no way limited.

<Image Data Rotation>

An example of application of a case using such a memory arrangement will now be described. Since a case in which data are translated has been described above, rotation of data will now be set forth. For the sake of simplicity, it will be assumed that k=1 in a k×l memory element arrangement based on k×l subdivisions, so that the arrangement becomes 1×l. Also, in an area having K×L pixel data, it will be assumed that K=L holds. In such case, if one frame of an image is rotated by +90° and −90° with the center of the image serving as an axis, the processor unit exchanges four items of data among the 1×l items of image data, i.e., rotates four items of data displaced from one another by 90° with respect to the center. If this is repeated with regard to the full frame, it will be possible to rotate the frame by 90°. Accordingly, in order to rotate the entirety of one frame, the aforementioned rotation is carried out $l^2/4$ times. In case of a 180° rotation, it will suffice to rotate two items of data displaced from each other by 180° with respect to the center. If the entire frame is to be rotated 180°, the rotation is carried out $l^2/2$ times. Thus, one frame of an image is subjected to rough rotation by this operation. This is a rotation from the 1×l areas of FIG. 25 to the 1×l areas of FIG. 26. In actuality, rotations of +90°, −90°, +180° and the like must be carried out similarly even within the same areas.

Rotation within one frame of an image will not be complete unless the rotation operation is applied within the areas. The rotation operation within an area will now be described. The operation involves processing in which an address prevailing when a memory element is read is converted and made into an address prevailing when a memory element is written. The address conversion made is of the kind shown in Table 1.

TABLE 1

| Angle of Rotation | Write Address | Processing |
|---|---|---|
| +90° | Horizontal Address | Subtract vertical address at readout from vertical length L of area |
|  | Vertical Address | Adopt horizonal address at readout |
| −90° | Horizontal Address | Adopt vertical address at readout |
|  | Vertical Address | Subtract horizontal address at readout from vertical length L of area |
| +180° | Horizonal Address | Subtract horizontal address at readout from horizontal length L of area |
|  | Vertical Address | Subtract vertical address at readout from vertical length L of area |

A block diagram for implementing this in detail is shown in FIG. 18, in which a selection signal is varied in dependence upon the angle of rotation and inputted to selectors 181, 182, 183, 184 as a selection control signal.

Ordinarily, when the angle of rotation is 0°, the outputs of the row address generator 4 and column address generator 5 are supplied directly to the row and column addresses of the memory elements through the selectors 181, 183 and the selectors 182, 184. When the angle of rotation is +90° or −90°, the outputs a, b of the selectors 181, 182 deliver column and row addresses, respectively.

When the angle of rotation is 0° or 180°, the outputs a, b of the selectors 181, 182 deliver row and column addresses, respectively. When the angles of rotation are 90° and 180°, the selector 184 operates to select the output of an arithmetic unit 186. When the angles of rotation are −90° and 180°, the selector 183 operates to select the output of an arithmetic unit 185. The arithmetic units 185, 186 subtract the input data from the length L of one side of an area and output signals indicative of the result. By adopting such an arrangement, the processing shown in Table 1 is executed to effect a rotation over an entire single frame of an image.

How to access memory elements to process all image data over the entirety of a full frame will now be described. In other words, the following description will relate to a scanning method for accessing all memory data.

It has already been described how to access a memory in a case where the position address of the starting point u of adjoining k×1 blocks to be accessed has been determined, namely in a case where Y, X have been determined, in which Y is the number obtained when counting in sequence from 0 in the vertical direction starting at the end point and X is the number obtained when counting in sequence from 0 in the horizontal direction starting from the end point. In what order X, Y should be scanned to process the full image will now be described with reference to an example.

An example of scanning addresses applied to memory elements will be explained. The areas obtained when one frame is divided into l×l portions correspond to the respective memory elements. Therefore, in order to scan one frame of an image, the same addresses are applied to all of the memory elements and the addresses are incremented in order starting from 0. Since the addresses of memory elements are the column and row addresses, the column and row are first both made 0 and then the column is incremented from 0 to the last address. Thereafter, the row address is incremented, after which the column is incremented from 0 to the last address. This is repeated to access all of the memory elements.

A more concrete example regarding processing for rotating an image will now be described.

A method will now be described through which, when a plurality of blocks of an original image are accessed simultaneously, data from these blocks are inputted in parallel and the data are processed and outputted in parallel, the output is delivered following rotation processing through angles of 0°, 90°, 180° and 270°.

FIG. 25 illustrates the original image divided into blocks and shows the state obtained when a region of 256×256 pixels is divided into blocks each comprising 4×4 pixels.

FIG. 26 illustrates the state obtained when the original image is rotated counter-clockwise by 90° in block units. FIG. 26 illustrates the state obtained when the original image is rotated counter-clockwise by 90° in pixel units within each block.

Figure 28:
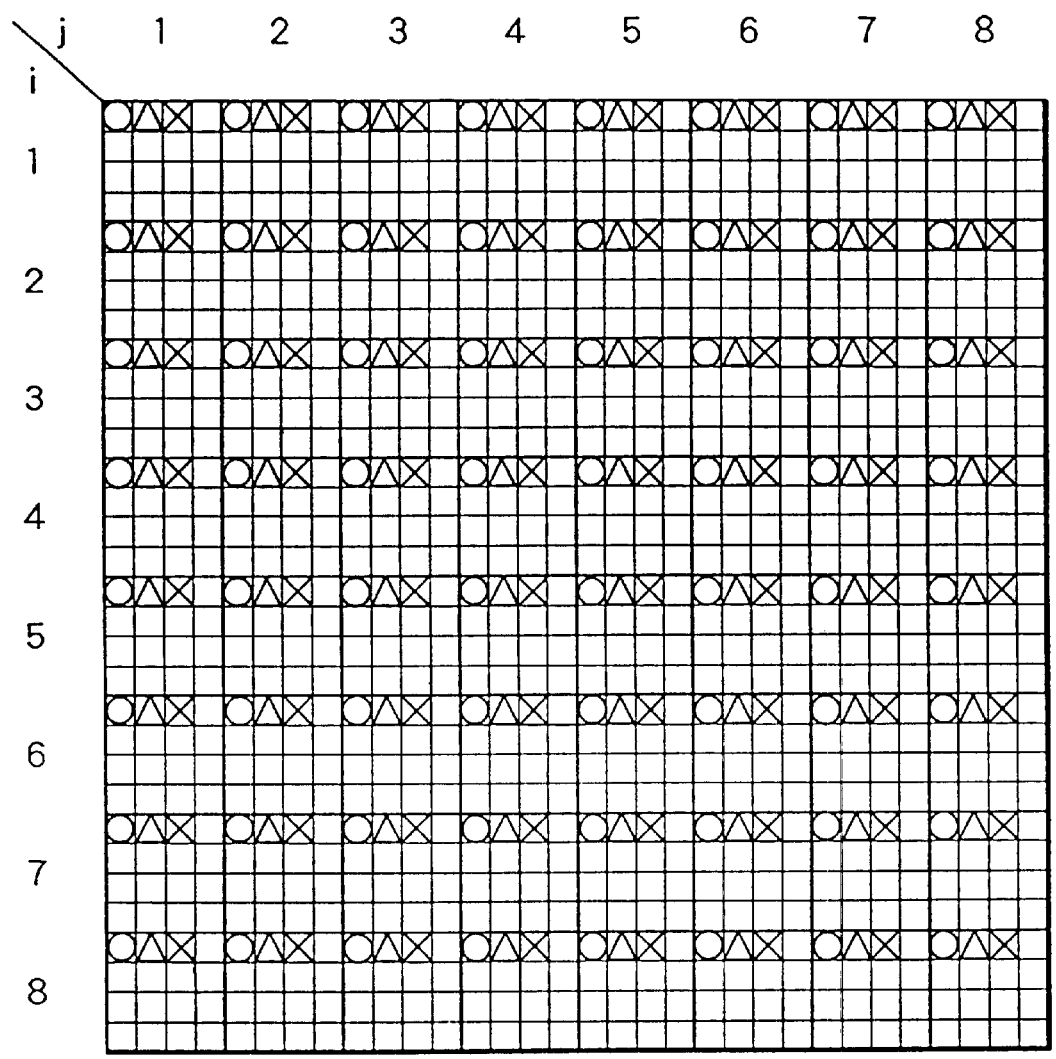
FIG. 28 is a view illustrating an arrangement of pixels within blocks before rotation processing and after rotation processing in pixel block units.

FIGS. 28 and 29 illustrate the positional relationship of the pixels in each block between the original image shown in FIG. 25 and the rotated image shown in FIG. 27. In FIGS. 25 and 26, the positional relationship of the pixels in each block is the same. If it is assumed that this is expressed in the form of FIG. 28, the state obtained by rotating each pixel in each block by 90° in the counter-clockwise direction will be expressed as shown in FIG. 29.

In order to obtain an image acquired by rotating the original image 90° in the counter-clockwise direction, the original image expressed in FIG. 26 is treated as a relationship among blocks to give the arrangement shown in FIG. 27, and then the pixels in each block are changed from FIG. 28 into a relationship of the kind shown in FIG. 29.

FIG. 30 is a block diagram showing an example of a circuit arrangement for implementing a series of the above-described processing. Numerals 1601, 1602 denote image memories storing each of the pixels in the original images shown in FIGS. 25 through 29, in which image memory 1601 is for the input side and image memory 1602 is for the output side. Numeral 1603 denotes an arithmetic circuit comprising a processing circuit provided to deal with each of the items of pixel data read out in parallel fashion. One processing circuit is provided for each block, the data from the blocks are inputted to respective ones of the processing circuits, and the processed data are outputted to each of the corresponding blocks on the output side. Numeral 1604 denotes a block data selection circuit, the details of which are illustrated in FIG. 31. Numeral 1605 denotes a circuit for outputting addresses indicating which positions (intra-block addresses) in the blocks of the input-side memory are to be accessed. Numeral 1606 denotes a circuit for outputting addresses indicating which positions (intra-block addresses) in the blocks of the output-side memory are to be accessed. Numeral 1607 designates a control circuit for controlling the circuits 1604, 1605, 1606 in dependence upon the angle of rotation.

The block data selection circuit 1604 is constituted by selectors, shown in FIG. 31, the number of which is the same as the number of blocks (64 in this embodiment). Each selector corresponds to a respective one of the blocks of the output-side memory. A selector corresponding to a block at the i-th row, j-th column [hereafter referred to as (i,j)] of the output-side memory receives an input of data from four blocks (i,j), (m−j+1,i), (m−l+1,m−j+1), (j,m−j+1) of the input-side memory. Here m means that the input- and output-side memories both consist of m×m blocks. In this embodiment, the description will be based on the assumption that m=8. Further, $1 \leq i \leq m$, $1 \leq j \leq m$.

If the original image is to be rotated by 0° in the counter-clockwise direction, the control circuit 1607 controls the block data selector 1604 in such a manner that each selector outputs (i,j). Similarly, the control circuit 1607 controls the block data selector 1604 in such a manner that (j,m−j+1) is selected for 90° of counter-clockwise rotation, (m−j+1,m−j+1) for 180° of counter-clockwise rotation and (m−j+1,i) for 270° of counter-clockwise rotation. Thus, a conversion corresponding to that from FIG. 25 to FIG. 27 can be realized.

The control circuit 1607 controls the intra-block addresses of the address output circuits 1605, 1606. If n×n pixels are present in a block and an output is delivered to a pixel at a (k,l) position in this block, the intra-block address of the block on the input side is controlled to be (k,l) in order to deliver an output upon rotating the original image 0° in the counter-clockwise direction. Similarly, the address is controlled to be (l,n−k+1) for 90°, (n−k+1,n−l+1) for 180°, and (n−l+1,k) for 270°. (In the present embodiment, n=4.) By way of example, this can be realized by adopting a look-up table as the circuit 1605, as shown in FIG. 32, and adopting a count-up counter as the circuit 1606, as shown in FIG. 33. Conversely, it is of course possible to adopt the counter of FIG. 33 as the circuit 1605 and adopt the look-up counter of FIG. 32 as the circuit 1606. Thus, a conversion corresponding to that from FIG. 25 to FIG. 27 (or from FIG. 28 to FIG. 29) can be realized.

It will be understood from FIG. 30 that the block region selection circuit can naturally be arranged on the output side of the arithmetic circuit, as shown in FIG. 34. In this case, the output from each processing circuit of the arithmetic circuit is inputted to each of the four selectors of the block region selection circuit. In other aspects, the arrangement is entirely the same as that shown in FIG. 30.

In accordance with the present embodiment described above, plural items of image data at positions corresponding to rotation are accepted simultaneously, whereby high-speed processing becomes possible and the rotation operation can be realized by a small-scale circuit.

A supplementary description will now be given regarding an embodiment set forth below.

When addresses applied to k×l memory elements are scanned in order from a 0 address to a final address as mentioned above, image data in each of the areas corresponding to an area of 1/(k×l) of the full frame are outputted from each of the k×l memory elements. Focusing on only one memory element, the image of a portion corresponding to one area is scanned and read out sequentially in the horizontal and vertical directions. If this is applied to conventional processing of an image scanned sequentially in the horizontal and vertical directions over one frame of an image, it will be possible to obtain a processing speed k×l times greater than conventionally. Moreover, since the image area handled becomes smaller, line buffers and the like also become smaller. As a result, the processor unit 2 can be readily constructed as an array processor. A detailed description will be given hereinbelow.

<(Spatial filtering Operation)>

As set forth above, image data from k×l memory elements 1b are sequentially inputted to the processor unit 2, which performs spatial filtering processing, while the memory readout is scanned sequentially. Though a description will be given later, the processor unit 2 incorporates buffers for a plurality of horizontal lines having a capacity constituting a rectangular area in which individual processor elements, which are the components of the processor unit, correspond to individual ones of the k×l regions obtained by the subdivision. After two-dimensional spatial filtering processing is carried out, the data resulting data are written on the write side sequentially through scanning idential with that on the read side. Such an embodiment will now be described in detail.

In FIGS. 35 through 38, one frame is divided into 2×2 regions, and the memory elements 1b are arranged in a 2×2 array, for a total of four memory elements. In this case, the image memory on the read side is read in such a manner that each of the regions is scanned simultaneously in the horizontal direction and vertical direction, as shown in FIG. 35. However, since the image is assigned to the memory as mentioned earlier, the memory address accessed at this time is such that the vertical address is incremented one at a time from 0 to the final address whenever the horizontal address from 0 to the final address is repeated with respect to all of the memory addresses.

In FIG. 37, memory elements R-1, R-2, R-3, R-4 constituting the image memory on the read side store the images of the regions 1, 2, 3, 4 of FIG. 35, respectively, in the present embodiment.

As for the addresses applied to the image memory on the read side, the same addresses are applied to the memory elements R-1 through R-4 by the address generator controlled by the control circuit. These addresses are scanned as described above. Image data read out of the memory elements R-1 through R-4 are inputted to the processor elements 1 through 4, respectively. The processor elements 1 through 4 receive as inputs the necessary control signals from the control circuit and designate the contents of processing. Spatial filtering processing is executed by the processor elements 1 through 4. However, since the processor elements 1 through 4 possess respective line buffers, horizontal addresses are supplied by the address generator. Alternatively, the horizontal addresses are generated within the processor elements 1 through 4.

The output data subjected to spatial filtering processing by the processor elements 1 through 4 are written in respective memory elements W-1 through W-4 constituting the image memory on the write side. At this time, the same addresses are applied to the memory elements W-1 through W-4 constituting the image memory on the write side. However, the addresses applied are obtained by delaying the addresses applied to the memory on the read side. The amount of delay corresponds to the amount of delay of the pixels of interest in the line buffers provided in order for the the processor unit to perform spatial filtering processing.

In the arrangement described above, spatial filtering processing can be carried out with regard to almost all the space in the full frame. However, since the portions indicated by the slanted lines as well as the gray portions in FIG. 36 are at the peripheral portions of the areas, these portions remain unprocessed because the two-dimensional mask of the spatial filter protrudes. In order to fill up the unprocessed areas, the control circuit causes the address generator to generate addresses for the portions indicated by the slanted lines, the gray portions and the memory corresponding to the periphery thereof. The image data are sequentially accepted from the image memory on the read side, and a spatial filtering operation is executed by a CPU in the control circuit. The results of the filtering operation are written in the image memory on the write side. As for the addresses, the control circuit controls the address generator to address the image memory on the write side just as the image memory on the read side. In accordance with the above-described embodiment, some processing time is required due to the fact that the spatial filtering processing using the portions indicated by the slanted lines in FIG. 36 is executed by the CPU in the control circuit. However, since the ratio of the slanted-line portions and gray portions in FIG. 36 to the entirety of the full frame is very low, the effect on processing time is almost negligible.

An embodiment for a case where this CPU-executed processing is not performed will now be described.

FIG. 39 is a simple block diagram of the present embodiment. With the exception of the fact that the entirety of a frame is divided into 3×3 regions and a data control circuit is provided, this embodiment is identical with the previous embodiment. Therefore, this embodiment will be described in detail focusing solely on those aspects that are different.

Though the present embodiment is one in which one frame is divided into 3×3 areas, a case in which one frame is divided into m×n areas (hereinafter referred to as the "general case") will also be described. (Note that m and n are integers.)

FIGS. 38(a), (b) are views showing the manner in which the entirety of a frame divided into 3×3 areas is scanned.

An enlarged area indicated by the dashed lines is imaged for each area obtained by dividing one frame, and the output of the enlarged area is inputted to a respective processor element (1-1)–(3-3). An enlarged area is given a size capable of covering portions left unprocessed after the spatial filtering processing of the kind indicated in FIG. 35, particularly unprocessed portions at the borders of areas (1,1), (1,2) and (2,1), (2,2), with regard to area (1,1), by way,of example. Further, with regard also to an arbitrary area (k,l) (where 1≦k≦m, 1≦l≦n), an area is enlarged so that unprocessed portions at the borders of area (k,l) and areas (k,l+1), (k+1,l), (k+1,l+1) can be covered when spatial filtering processing is executed.

In a case where 3×3 smoothing processing is executed by the processor unit, for example, one pixel is left unprocessed at the right end in each area (k,l). In an adjoining area (k,l+1), one pixel is left unprocessed at the left end. Therefore, the area (k,l) is enlarged rightward by a total of two pixels. Similarly, an enlargement of two pixels in the downward direction is required.

The enlarged areas (1,1) through (3,3) are inputted to processor elements (1,1) through (3,3) while scanning is performed with regard to these enlarged areas, as shown in FIGS. 38(a), (b). The addressing of memory elements will now be described in brief. The control circuit causes the address generator to increment the horizontal address from 0 to the maximum address in order. Thereafter, the address is incremented from 0 to the address of the area enlarged in the rightward direction. If the expansion is two pixels in the rightward direction, the address 0 and 1 are outputted, after which the horizonal address outputs the 0 address. Next, the vertical address is incremented from 0 and the scanning of the horizontal address is repeated. The vertical address is incremented again, and the scanning of the horizontal address is repeated. After above actions are repeated, the vertical address becomes the maximum address and the scanning of the horizontal address is finished, whereupon the vertical address is then made 0 and the foregoing is repeated up to the address of the area enlarged in the downward direction. At this time the data control circuit relays the data in order that the outputs up to the enlarged areas (1,1) through (3,3) will correspond to the processor elements (1,1) through (3,3).

The data control circuit, which is shown in FIG. 40, will be described next. In the general case, kthe circuit is composed of m×n 4-to-1 selectors.

The output of a selector (1,1) delivered to a processor element (1,1) is one of the inputs thereto from the memory elements (1,1), (1,2), (2,1), (2,2). In response to a selection control signal from the control circuit, each selector outputs one of the four inputs applied thereto. The inputs to the selectors when these deliver outputs to the processor elements (k,l) come from the memory elements (k,l), (k,l+1), (k+1,l) and (k+1,l+1). However, with respect to the area divisions m,n, if k+1, l+1 surpass the respective m,n for a arbitrary k,l, nothing is inputted or dummy data is inputted on the input side.

The selection control signal for the selectors outputted by the control circuit will now be described. During the time that the control circuit controls the address generator to increment the horizontal address from 0 to the final address and thereafter perform scanning from 0 to the address of the enlarged area, as described above, namely when the (k,l+1) region is overlapped, the output (k,l+1) is selected and outputted. Further, during the time that the vertical address is incremented from 0 to the final address followed by scanning from 0 to the address of the enlarged area (which address is 1, for example, in accordance with 3×3 spatial filtering processing), namely when the (k,l) area expansion overlaps the (k+1,l) area, the output (k+1,l) is selected and outputted. In these two cases, namely in the cases where the enlarged area overlaps (k+1,l+1), the control circuit is so adapted that the output of memory element (k+1,l+1) is selected. This will be described supplementarily with regard to a data control circuit between the processor unit and the image memory on the right side. The circuit arrangement is similar to that of FIG. 40. However, the inputs in a case where the output of a selector is delivered to a memory element (k,l) are (k,l), (k,l−1), (k−1,l), (k−1,l−1). In a case where the enlarged areas of the kind shown in FIG. 38(*a*) are not covered up to the unprocessed portions of the three areas leftward, downward and downwardly to the left with respect to the area (k,l) but where areas are enlarged in such a manner that only the upper, lower, right and left unprocessed portions within the area (k,l) are covered, a data control circuit between the processor unit and image memory on the write side is unnecessary. In this case, the inputs to the data control circuit between the image memory on the read side and the processor unit should be (k,l), (k−1,l−1), (k−1,l), (k−1,l+1), (k,l−1), (k,l+1), (k+1,l−1), (k+1,l) and (k+1,l+1) with respect to the selector output (k,1). This can be readily surmised from FIG. 38(*b*). To supplement this description further, it is required for the selectors to select the data of nine areas contained in the enlarged areas, namely in nine memory elements, and input the data to the processor element (k,l) in the processor unit. A data control circuit will be required which control k×l selectors.

Next, data outputted by the data control circuit are inputted to respective processor elements constituting the processor unit. The processor elements (1,1) through (3,3) possess line buffers for plural lines of the expanded regions. After spatial filtering processing is executed, the data are outputted to the memory elements (1,1) through (3,3), which constitute the image memory on the write side, through the data control circuit which is not shown in FIG. 39. The data control circuit also corrects the results of spatial filtering processing when there is a region of an enlarged portion. At this time the addresses applied to each of the memory elements of the image memory on the write side from the address generator are identical. However, with respect to the addresses applied to the image memory on the read side, the addresses applied to each of the memory elements on the write side are delayed an amount of time ascribable to a delay by the processor elements. Even if spatial filtering processing is applied to the enlarged regions at this time, the peripheral portions of the enlarged regions substantially do not undergo spatial filtering processing. For example, in case of processing for 3×3 smoothing or the like, output areas are made smaller, by a width of one pixel at a time leftward, rightward, upward and downward, than the enlarged areas. The image memory on the write side is enabled only when data of a region which has undergone spatial filtering processing are outputted.

When spatial filtering processing is performed by a processor element, the width of the outputted area up, down, left and right is reduced, the area is returned to a size the same as that of the (k,l) area, and this corresponds to the memory element (k,l) of the image memory on the write side. Therefore, a data control circuit between the processor unit and the image memory on the write side is unnecessary.

The processor elements constituting the processor unit in this embodiment will now be described in detail.

FIG. 41 is a block diagram illustrating the construction of one example of a 3×3 smoothing space filter. Image data from a memory element on the read side applied to a processor element via the data control circuit are inputted to a latch 2604 and line buffer 2601. The output of the line buffer 2601 is inputted to a latch 2607 and line buffer 2602. The output of the line buffer 2602 is inputted to a latch 2610. The line buffers 2601, 2602 are supplied with an address provided by a counter 2603, and with an address provided by an address counter (not shown), as illustrated in FIG. 39. The counter 2603 is provided by the control circuit with an image transfer clock every other horizontal pixel of the enlarged area, thereby counting up the address, and receives a clear signal as an input from the control circuit every horizonal line, whereby the addres is cleared. The line buffers are capable or reading and writing input/output signals simultaneously.

As a result of this operation, image data at certain positions of three continuous horizontal lines are inputted to the latches 2604, 2607, 2610. Latches 2604 through 2612 are constituted by D-type flip-flops. In response to the image transfer clock from the control circuit, the outputs of latches 2604, 2607, 2610 are sequentially delivered to latches 2606, 2609, 2612 via latches 2605, 2608, 2611.

The outputs of the latches 2604–2612 at this time are 3×3 continuous pixels in one frame of the image. These outputs are applied to an adder 2613, which calculates the total number of pixels. The result is inputted to a divider 2614, which multiplies the input by ⅑, executes 3×3 smoothing processing. The resulting output of the divider 2614 is delivered to the memory element on the write side or the data control circuit connected to the memory element on the write side.

Though the spatial filtering operation has been described, it goes without saying that the processor elements constituting the processor unit can be composed of processors such as CPUs.

It also goes without saying that the peripheral portion of one frame, namely the gray portion shown in FIG. 26, cannot be subjected to spatial filtering processing in both of the two spatial filtering operations.

As set forth above, since one frame of an image is divided into m×n areas, an image area to which one memory element is assigned is reduced in size. The spatial filtering processor corresponding to this need only possess a line buffer of a small area. This makes it possible to utilize a processor in LSI form internally incorporating a plurality of buffers. A CPU can be used as the processor, or use can be made of a CPU having an internal RAM. Since m×n plural areas can be subjected to spatial filtering processing simultaneously, processing execution time can be greatly reduced.

In accordance with the foregoing embodiments, the arrangement adopted is one having m×n memory elements, thus enabling m×n pixels to be accessed and processed simultaneously so that high-speed image processing can be achieved.

Further, by adopting an arrangement of a system in which m×n continuous pixels in one frame are assigned to m×n memory elements in such a manner that the pixels can be accessed simultaneously, or a system in which m×n random pixels in one frame are assigned to m×n memory elements in such a manner that these pixels can be accessed simultaneously, two-dimensional filtering processing of small continuous spaces in the former case and processing for movement or the like in the latter case are facilitated. Thus, memory accessing for carrying out processing suited to image processing is possible.

Furthermore, in accordance with the foregoing embodiments, instead of accessing all of the memory elements, masking is possible by virtue of the k×l memory element configuration. In other words, when processing such as spatial filtering processing is executed, often processing is such that the results of processing become blocks of small size, such as 1×1. However, processing becomes possible in which the size of the memory element configuration and the size of the image accessed differ, as in the foregoing embodiments.

Thus, in accordance with the embodiments of the invention, there can be provided an image processing apparatus which executes high-speed image processing by the parallel processing of a finite, small number of processors.

The spatial filtering processing will now be described further with reference to the drawings. In the following, a process will be described in which image data in an image memory corresponding to rectangular regions of m×n pixels of an original image are accessed simultaneously, the image data are accepted by an array processor unit (hereinafter referred to as an "APU") comprising m×n processor elements (hereinafter referred to as "PE"), each of which is made to correspond to a respective one of the pixels, spatial filtering processing is executed by the APU, and the results are outputted.

Figure 42:
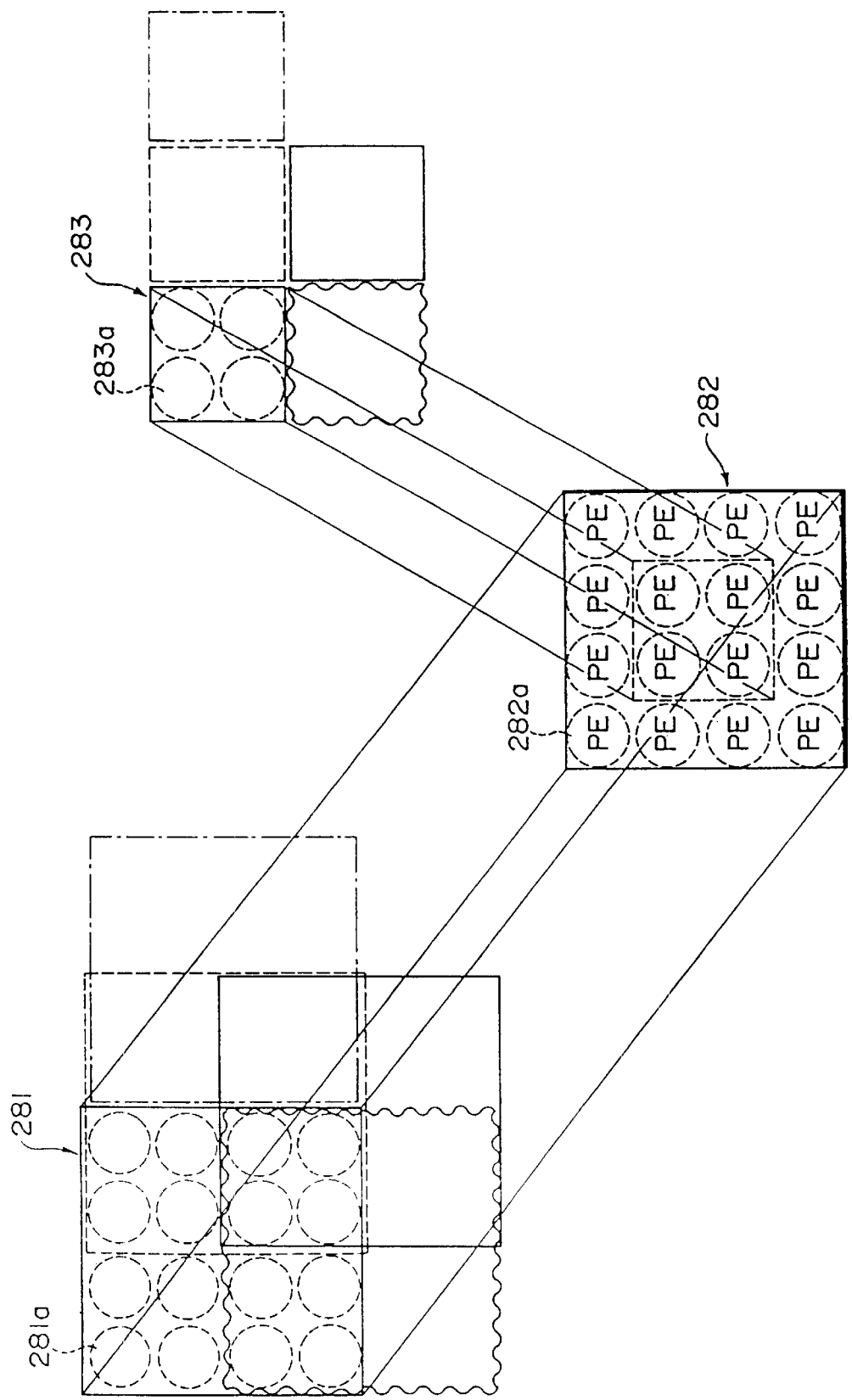
FIG. 42 is a view showing the correspondence among input pixel area size of a memory on an input side, output pixel area size of a memory on an output side, and the array size of a processor unit.

FIG. 42 is a view showing the correspondence among an input block 281 corresponding to an original, pixels 281 in the input block, an APU 282, PEs 282a in the APU, an output image block 283, and pixels 283a in the output block. Here m=n=4. Accordingly, 16 pixels of data of the memory on the input side are accessed and accepted by the APU simultaneously. The APU is composed of 16 PEs. The APU executes spatial filtering processing in a region of 3 pixels×3 pixels and outputs the results to a block of the memory on the output side comprising 2 pixels×2 pixels, for a total of four pixels.

The PEs in the APU are arranged in a 4×4 square, grid-like array corresponding to the 4×4 pixels. The PEs are numbered in order in the row direction and column direction. As shown in FIG. 43, the PEs can be distinguished from one another by expressing them by their row and column numbers.

Figure 44:
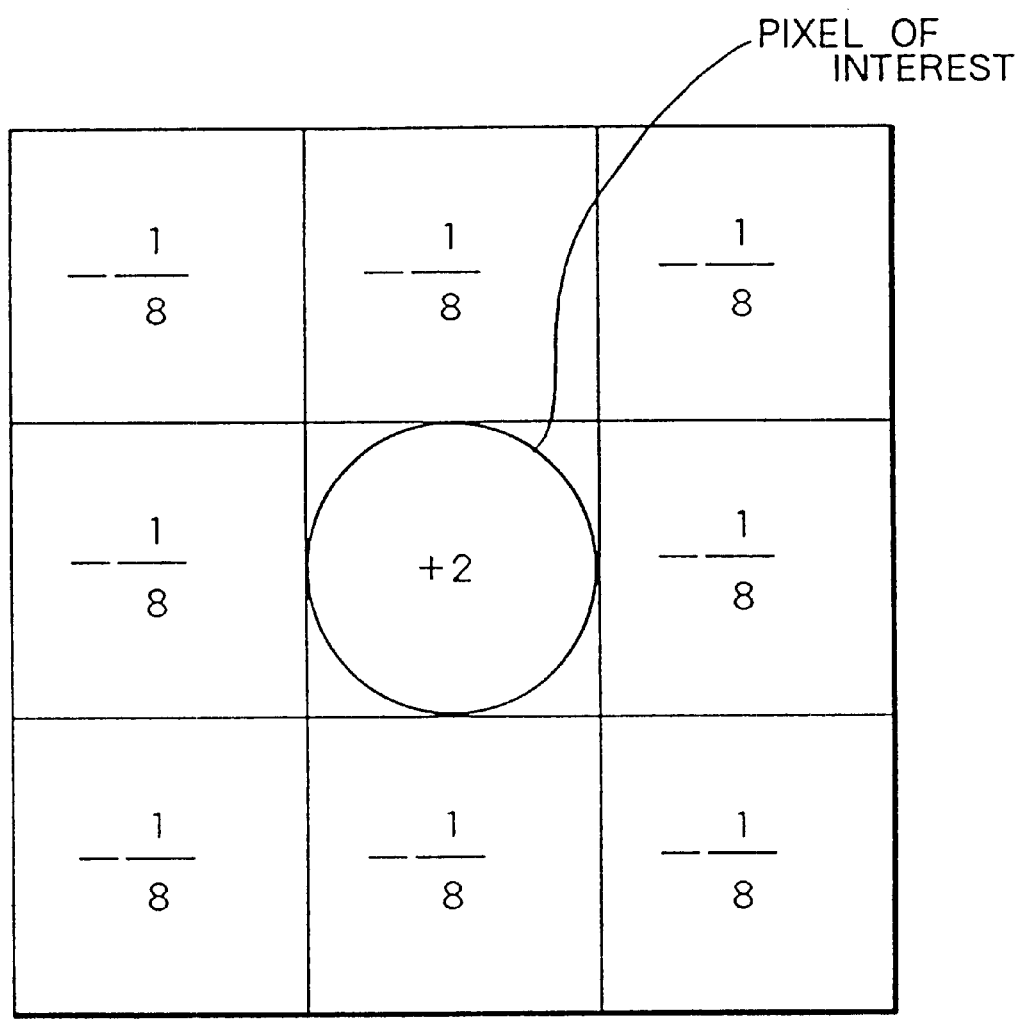
FIG. 44 is a view showing the coefficient matrix of a spatial filtering operation executed by the processor unit.

Spatial filtering processing refers to taking the product of coefficients for every corresponding pixel using a coefficient matrix of the kind shown in e.g. FIG. 44, and outputting the sum thereof to a memory corresponding to a center position. This will be described using FIG. 42. Specifically, 3×3 regions constituted by (1,1), (1,2), (1,3), (2,1), (2,2), (2,3), (3,1), (3,2) and (3,3) are subjected to an operation by (2,2). The data are accepted from the other PEs and spatial filtering processing is executed. Similarly, 3×3 regions constituted by (1,2), (1,3), (1,4), (2,2), (2,3), (2,4), (3,2), (3,3) and (3,4) are subjected to spatial filtering processing by (2,3), and 3×3 regions constituted by (2,1), (2,2), (2,3), (3,1), (3,2), (3,3), (4,1), (4,2) and (4,3) are subjected to spatial filtering processing by (3,2). Further, 3×3 regions constituted by (2,2), (2,3), (2,4), (3,2), (3,3), (3,4), (4,2), (4,3) and (4,4) are subjected to spatial filtering processing by (3,3).

Figure 45:
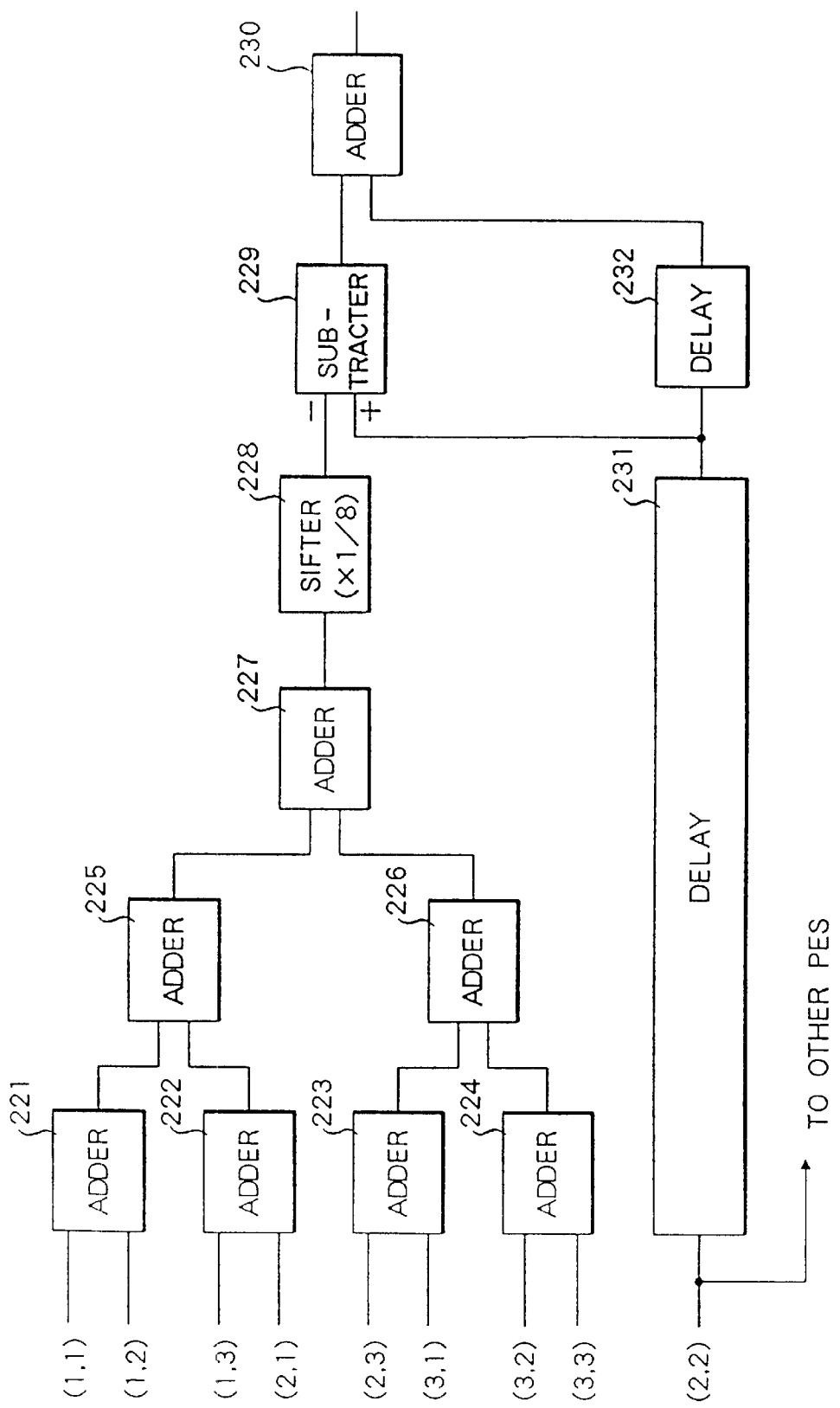
FIG. 45 is a block diagram illustrating a circuit which executes a spatial filtering operation.

The PEs (2,2), (2,3), (3,2), (3,3) which perform spatial filtering processing possess a circuit of the kind shown in FIG. 45 and implement spatial filtering processing thereby. In the circuit of FIG. 45, the data from the eight adjoining PEs are all added by adders 221–227 and multiplied by ⅛ by a shifter 228. A subtracter 229 calculates the difference between the output of the shifter 228 and a value, which is the pixel of interest, accepted by the PE per se having this circuit, the value first being delayed by a delay circuit 231. An adder 230 adds the difference outputted by the subtracter 229 and the value accepted by the PE per se after this value is delayed by a delay circuit 232. Thus, spatial filtering processing is executed. In this way a 4×4 pixel region is inputted and an output is delivered to a 2×2 pixel region.

According to this description, spatial filtering is discussed in the form of a 3×3 pixel region, with a 4×4 pixel region as the input and a 2×2 pixel region as the output. However, the invention is not limited to this arrangement. It is obvious that spatial filtering can be performed for a p×q pixel region (where m≧k+p, n≧l+q), with an input of an m×n pixel region and an output of a k×l pixel region. In addition, the coefficients of the spatial filter are not limited to those shown in FIG. 44. It will suffice to use a PE having a processing circuit corresponding to a coefficient matrix.

Whereas processing is repeated for every single output pixel in the prior art, the results of processing are outputted for plural output pixels in the same cycle in accordance with the present embodiment, so that processing speed can be made very high.

By inputting continuous, closely adjacent pixels on the input side at one time, spatial filtering processing can be executed in one cycle, and it is possible to output the results of spatial filtering processing to a plurality of output pixels simultaneously.

By accessing and processing a plurality of input data simultaneously, processing execution speed is raised in comparison with the accessing of data one item at a time. Moreover, processing (spatial filtering processing, color processing, etc.) that takes into account the correlation between data accessed simultaneously by performing an exchange of data between PEs can be executed by a single input data accessing operation.

Image Data Enlargement and Reduction

In other embodiments of the invention described below, image magnification processing is executed in the processor unit 2. However, there is no limitation with regard to the number k×l, K×L of memory elements constituting the image memories on the read side and write side. Though the enlargement is only described in this embodiment, the reduction is achieved in same manner. Also, there is no limitation with regard to the block sizes k'×l', K'×L' of pixels accessed on the read side and write side. However, it can be surmised that in a case where image magnification processing is performed by the processor unit 2, the size obtained by magnifying the access size k'×l' on the read side must satisfy the relations K≧αk',βL≧l', where the maximum longitudinal and transverse magnifications are α, β.

Magnification processing will be described next. As shown in FIG. 46, a processor unit 312 comprises a address generator 313 and an arithmetic circuit 315 and operates under the control of a control circuit 311. The address generator 313 generates a starting address of an input-side image memory 316 holding input image data necessary for calculating. The processor element in the arithmetic circuit 315 calculates the imput image data to output the output image data corresponds toi an output-side image memory 317. The arithmetic circuit 315 accepts all image data of a data region having the starting address as one end of the image region. Each processor element selects, from among the accepted data, input data corresponding to the position of the output-side image memory 317 which outputs the results of processing, executes two-dimensional interpolation processing and outputs the results.

This will be described in somewhat greater detail. For the sake of the description, it will be assumed that the processor unit 312 is composed of four columns in a main scanning direction and four rows in an auxiliary scanning direction, i.e., 16 processor elements. The image memory 316 on the input side simultaneously outputs to the processor unit data composed of five columns in the main scanning direction and five rows in the auxiliary scanning direction, i.e., a 25-pixel area. Which data of the 5×5 pixels area of data are outputted is designated by the address generator 313. The construction and operation of the address generator 313 will now be described in accordance with FIG. 47. The address generator 313 is constituted by a main scanning-direction circuit (hereinafter referred to as a "main circuit 1") which outputs an address indicating the main scanning direction among the addresses of a predetermined 5×5 pixels area, and an auxiliary scanning circuit (hereinafter referred to as an "auxiliary circuit 1" which outputs an address indicating the auxiliary scanning direction among the addresses of the predetermined 5×5 pixels area. A value which is four times the reciprocal of the magnification in the main scanning direction is preset in a register 321 by the control circuit 311. A value which is four times the reciprocal of the magnification in the auxiliary scanning direction is preset in a register 322 by the control circuit 311. A latch 325 is cleared to zero by an operation synchronizing signal in the auxiliary scanning direction, and accepts the output of an adder 323 in response to an operation synchronizing signal 327 in the main scanning direction. In response to the operation synchronizing signal 327 in the main scanning direction, the adder 323 adds a value held by a register 321 and a value held by the latch 325 and outputs the result. As a result, by virtue of the synchronization of operation in the main scanning direction, the value outputted by the latch 325 is increased incrementally by a value four times the reciprocal of the magnification in the main scanning direction, and the latch is cleared to zero whenever operation is synchronized in the auxiliary scanning direction. A register 322, adder 324 and latch 326 operate in exactly the same manner when main scanning operation synchronization is changed over to auxiliary scanning operation synchronization and auxiliary scanning operation synchronization is changed over to page synchronization. In the present embodiment, a signal designating a 5×5 pixel area of the image memory 316 on the input side is formed in dependence upon the integer portions latched in the latches 325, 326. In accordance with this designating signal, the image memory 316 on the image side outputs 25 pixels of data of a area of five pixels in the main scanning direction and five pixels in the auxiliary scanning direction starting from the above mentioned address. With relation to the addresses of the image memory 317 on the output side, the addresses of four pixels of the output-side image memory 317 are increased in the main scanning direction in accordance with main scanning operation synchronization and the addresses of four pixels of memory 317 are increased in the auxiliary scanning direction in accordance with auxiliary scanning operation synchronization.

An address correcting section 314 in the processor unit 312 selects an appropriate four pixels of data from among the inputted 25 pixels of data and generates an address correcting signal for applying an interpolation coefficient for interpolation processing to the 16 processor elements in the processing circuit 315.

Figure 48:
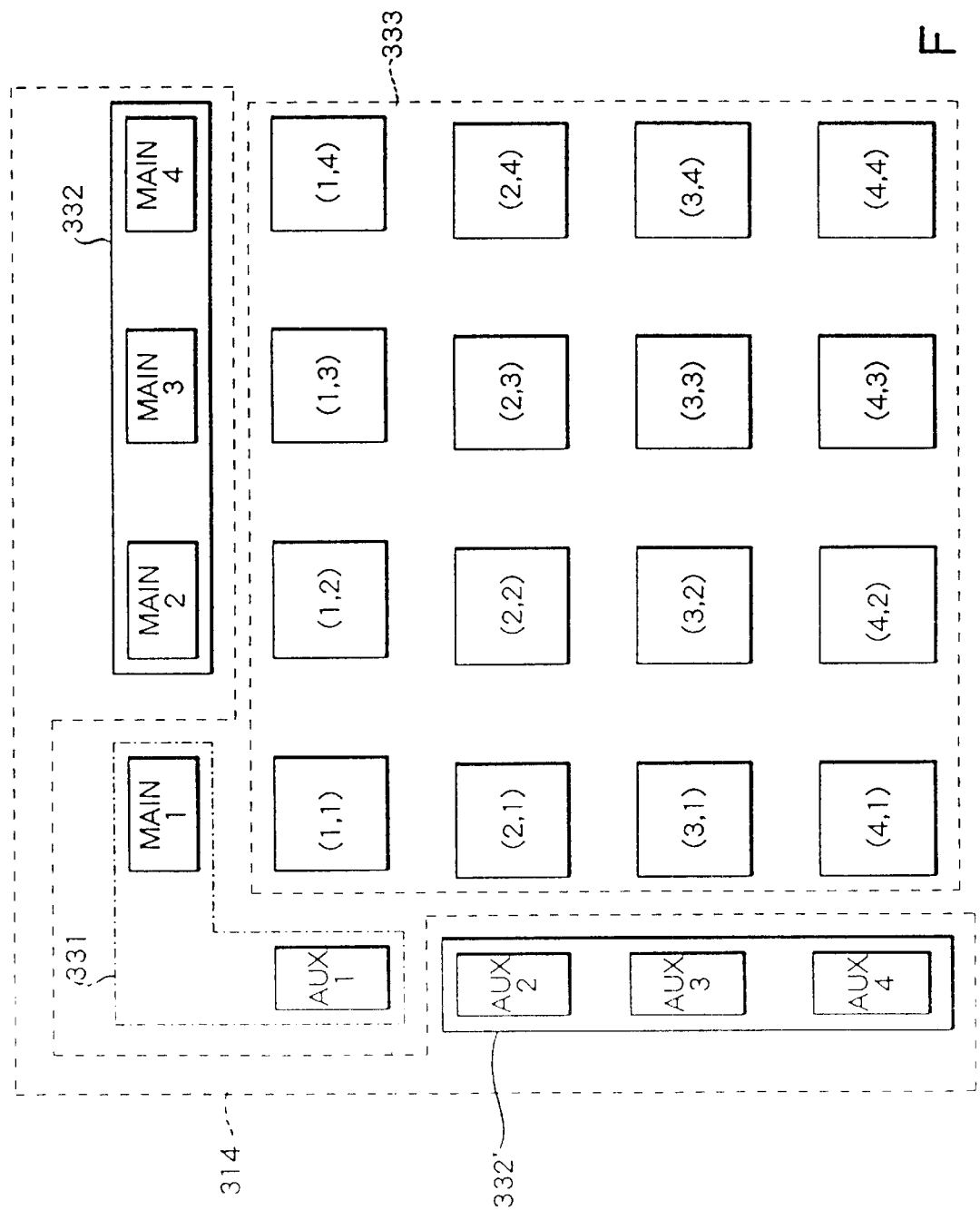
FIG. 48 is a conceptual block diagram of the interior of the processor unit.

FIG. 48 illustrates the construction of the processor unit 2, in which numeral 331 denotes the address generator 313 described in connection with FIG. 47. Numeral 314 includes portions 332, 332' composed of main circuits 2, 3, 4 and auxiliary circuits 2, 3, 4 similar to the main circuit 1 and auxiliary circuit 1 described in connection with FIG. 47. Among the main scanning direction registers 321 contained in the main circuits 2 through 4, the register 321 contained in the main circuit 2 has a value which is always larger, by the reciprocal of the magnification in the main scanning direction, than the value in the register 321 of the main circuit 1. Similarly, among the registers 321 contained in respective ones of the circuits, the value in the register of main circuit 3 is larger than that in the register of main circuit 2, and the value in the register of main circuit 4 is larger than that in the register of main circuit 3. On the other hand, the values held in the auxiliary scanning direction registers 322 contained in the auxiliary circuits 2 through 4 are larger by the reciprocal of the magnification in the auxiliary scanning direction, with the value in the auxiliary circuit 4 being larger than that in the auxiliary circuit 3, the value in the auxiliary circuit 3 being larger than that in the auxiliary circuit 2, and the value in the auxiliary circuit 2 being larger than that in the auxiliary circuit 1. In addition, the main circuits 2 through 4 and the auxiliary circuits 2 through 4 are used as signals indicating which of the four pixels of the 25 pixels of the input area are to be selected. For example, consider a case of magnification by 2.5 in the main scanning direction and 1.5 in the auxiliary scanning direction. The main circuit 1 will be counted up 1.600 (=4×1/2.5) at a time, the auxiliary circuit 1 will be counted up 2.666 (≈4×1/1.5) at a time and, by employing the integer portions of counts in the main circuit 1 and auxiliary circuit 1, these will be used as the starting addresses of the region of 25 pixels in the image memory 316 on the input side. Further, the decimal portion outputted by the main circuit 1 is used as main scanning direction auxiliary coefficient data for one column of the processor array, namely the four processor elements (1,1), (2,1), (3,1), (4,1) of FIG. 48. The decimal portion outputted by the auxiliary circuit 1 is used as auxiliary scanning direction auxiliary coefficient data for one row of the processor array, namely the four processor elements (1,1), (1,2), (1,3), (1,4) of FIG. 48. The quantities counted by the main circuits 2, 3, 4 differ from one another by 0.400 (=1/2.5), and the quantities counted by the auxiliary circuits 2, 3, 4 differ from one another by 0.666 (≈1/1.5).

The latches storing these counts are cleared of their integer portions each time but they accumulate the decimal portions. The main circuits 2 through 4 output the integer portions and decimal portions to the processor elements in the second through fourth columns of the processor arrays, and the auxiliary circuits 2 through 4 output the integer portions and decimal portions to the processor elements in the second through fourth rows of the processor arrays. Each of the processor arrays selects four pixels from the 25 pixel data from the input-side image memory 316 in dependence upon the integer portions of the data latched in the corresponding main scanning direction latches 325 and corresponding auxiliary scanning direction latches 326, performs two-dimensional interpolation as an interpolation coefficient in dependence upon the decimal portion, and outputs the results of the interpolation to the corresponding image memory 317 on the output side. The image memory 317 on the output side is always addressed using a 16-pixel region of 4×4 pixels as a unit, and each PE is correlated with one of the 16 pixels.

Figure 50:
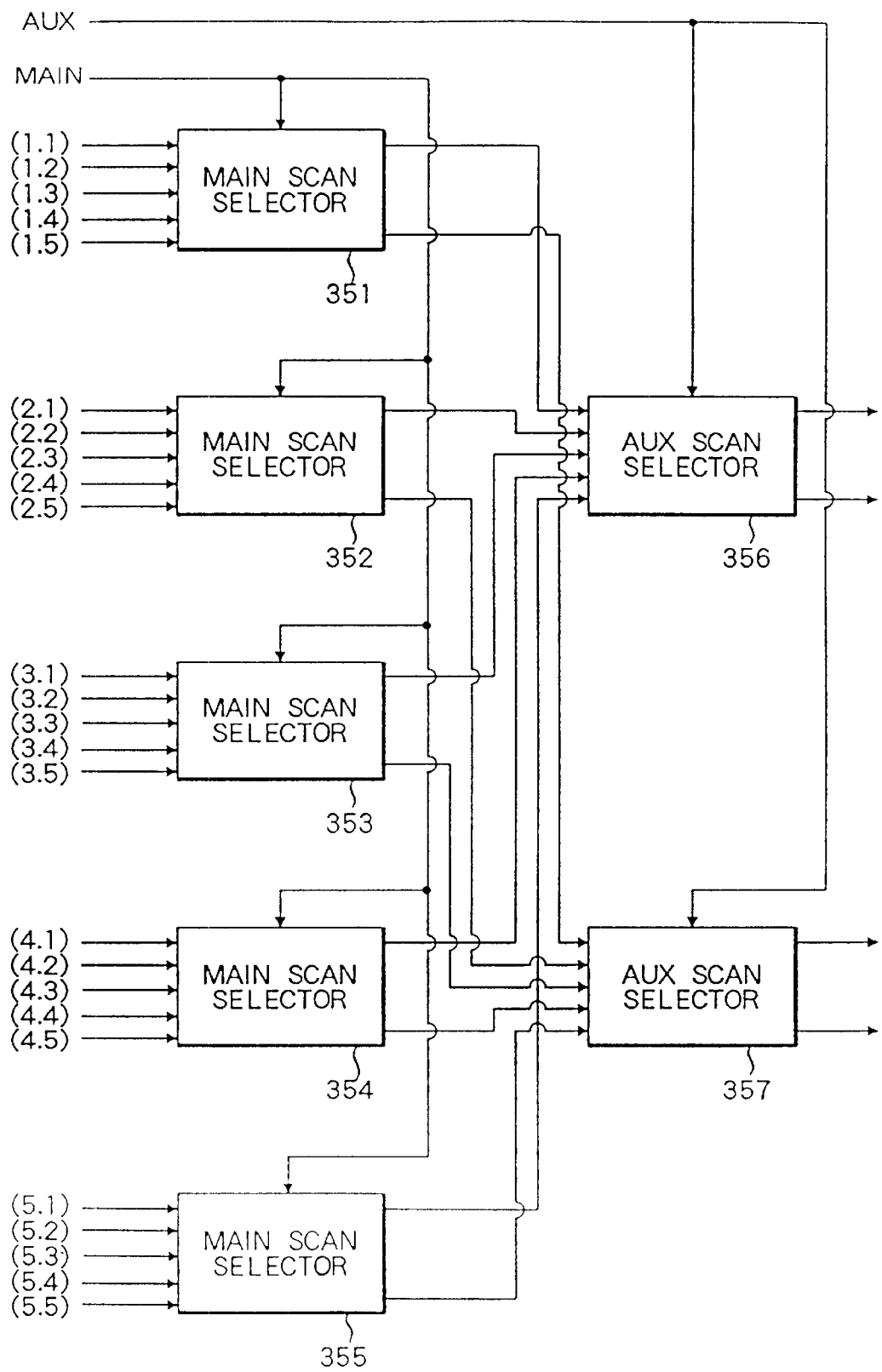
FIG. 50 is a block diagram of the data selecting circuit.

FIG. 49 illustrates a selection circuit one of which is possessed by each PE, namely a circuit for selecting four pixels from among 25 pixels. FIG. 50 illustrates an example of the construction of a selection circuit 720 shown in FIG. 49, the selection circuit 720 being shown to consist of main scanning selectors 351–355 and auxiliary scanning selectors 356, 357. FIG. 51 shows an example of the arrangement of each of the main scanning selectors and auxiliary scanning selectors. Each of the main scanning selectors and auxiliary scanning selectors can be constituted by two selectors 361, 362 each having four inputs and one output. As for the integer portions from the main circuit 1 and auxiliary circuit 1, values of 0 are always outputted to PEs of each single column and each single row. Accordingly, each PE (i,j) selects an I-th, I+1-th, J-th and J+1-th of four inputs with respect to the output (I,J) of the integer portions of a main circuit i and auxiliary circuit j. As a result, the PE (i,j) selects [I,J], [I+1,J], [I,J+1], [I+1,J+1] as the four pixels from among the 25 pixels.

Next, in a two-dimensional linear interpolator circuit 740 shown in FIG. 52, assume that the input values of the four pixels are $V_{[I,J]}$, $V_{[I,J+1]}$, $V_{[I+1,J]}$, $V_{[I+1,J+1]}$, and assume that the interpolation coefficients in the main and auxiliary scanning directions are $\alpha$, $\beta$. These will be applied as the decimal portion outputs corresponding to the main circuits 1 through 4 and auxiliary circuits 1 through 4. The calculation $(1-\beta)\{(1-\alpha)V_{[I,J]}+\alpha V_{[I+1,J]}\}+\beta\{(1-\alpha)V_{[I,J+1]}+\alpha V_{[I+1,J+1]}\}$ is performed, and the results of the interpolation are outputted (where $0 \leq \alpha, \beta < 1$).

The operation of the processor unit 312 is described above. The correspondence among the pixel areas of the image memory 316 on the input side, the processor unit 312 and the image memory 317 on the output side has the relationship shown in FIG. 53. Specifically, the number of processor elements in the processor 312 is equal to the number of pixels in the image memory 317 on the output side, and the number of pixels of the image area used in processing in the image memory on the input side is smaller than the number of processor elements in processor unit 312.

In accordance with the present embodiment as described above, whereas processing is repeated for every single output pixel in the prior art, the results of processing are outputted for plural output pixels in the same cycle, so that processing speed can be made very high.

Furthermore, it is possible to execute interpolation processing by inputting continuous, closely adjacent pixels on the input side at one time.

The construction and operation of the processor unit 2 shown in FIG. 46 will now be described supplementarily with reference to FIGS. 66 through 68.

FIG. 66 is a view illustrating the construction of the image memory 316 on the input side and of the processor unit 2. The processor unit is constituted by a DDA (digital differential analyzer) group of main circuits 1 through 4 in the main scanning direction, a DDA group of auxiliary circuits 1 through 4 in the auxiliary scanning direction, a 25 pixel→4 pixel selector group, and a PE group composed of PEs for respective selectors of the selector group, as illustrated in FIG. 66.

Figure 67:
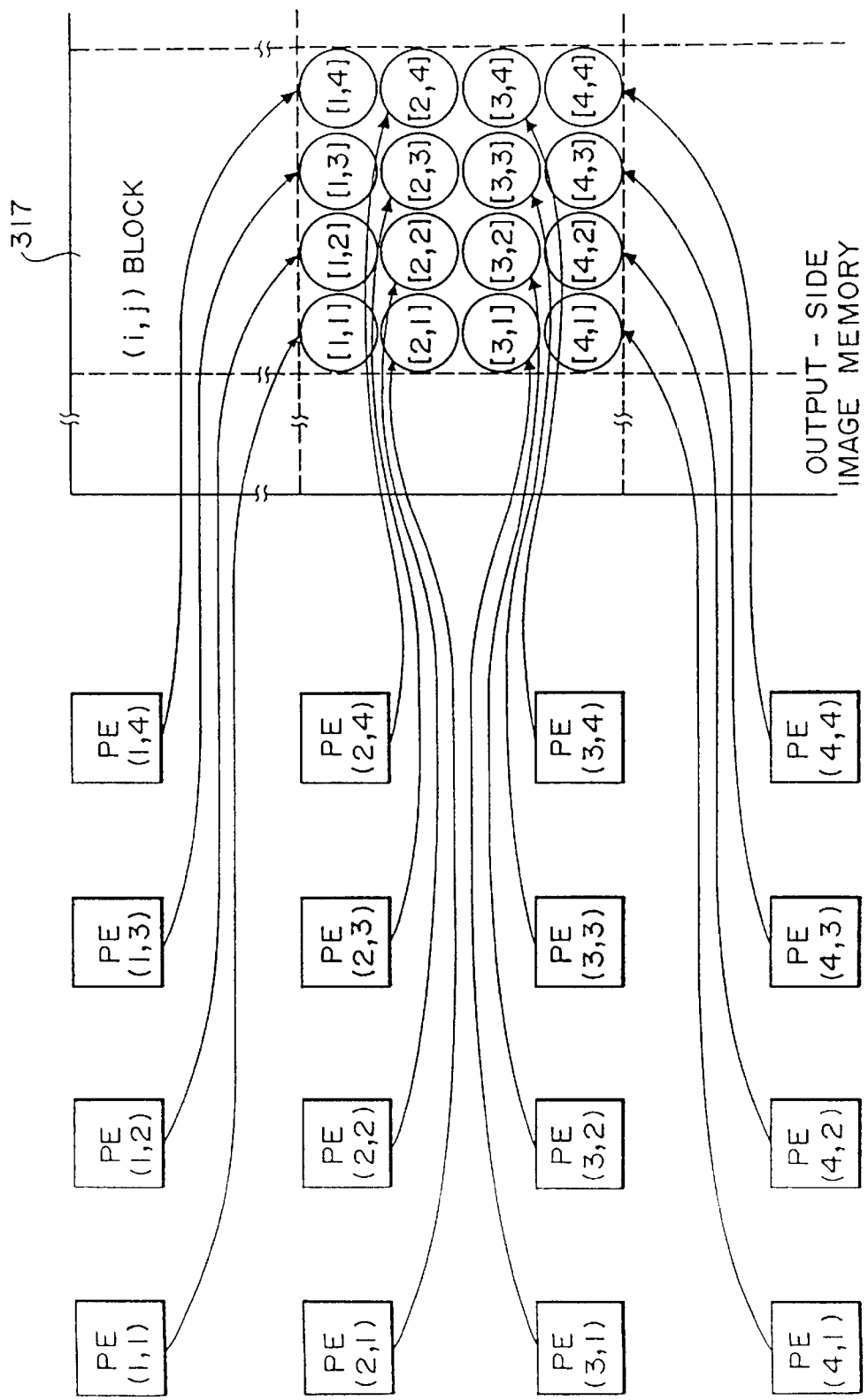
FIG. 67 is a view illustrating the relationship between each processor element PE in FIG. 65 and an image memory 317 for outputs.

FIG. 67 is a view illustrating the correspondence between the elements in the processor elements (PE) group and the pixels in a pixel block of the image memory 317 on the output side.

Figure 68:
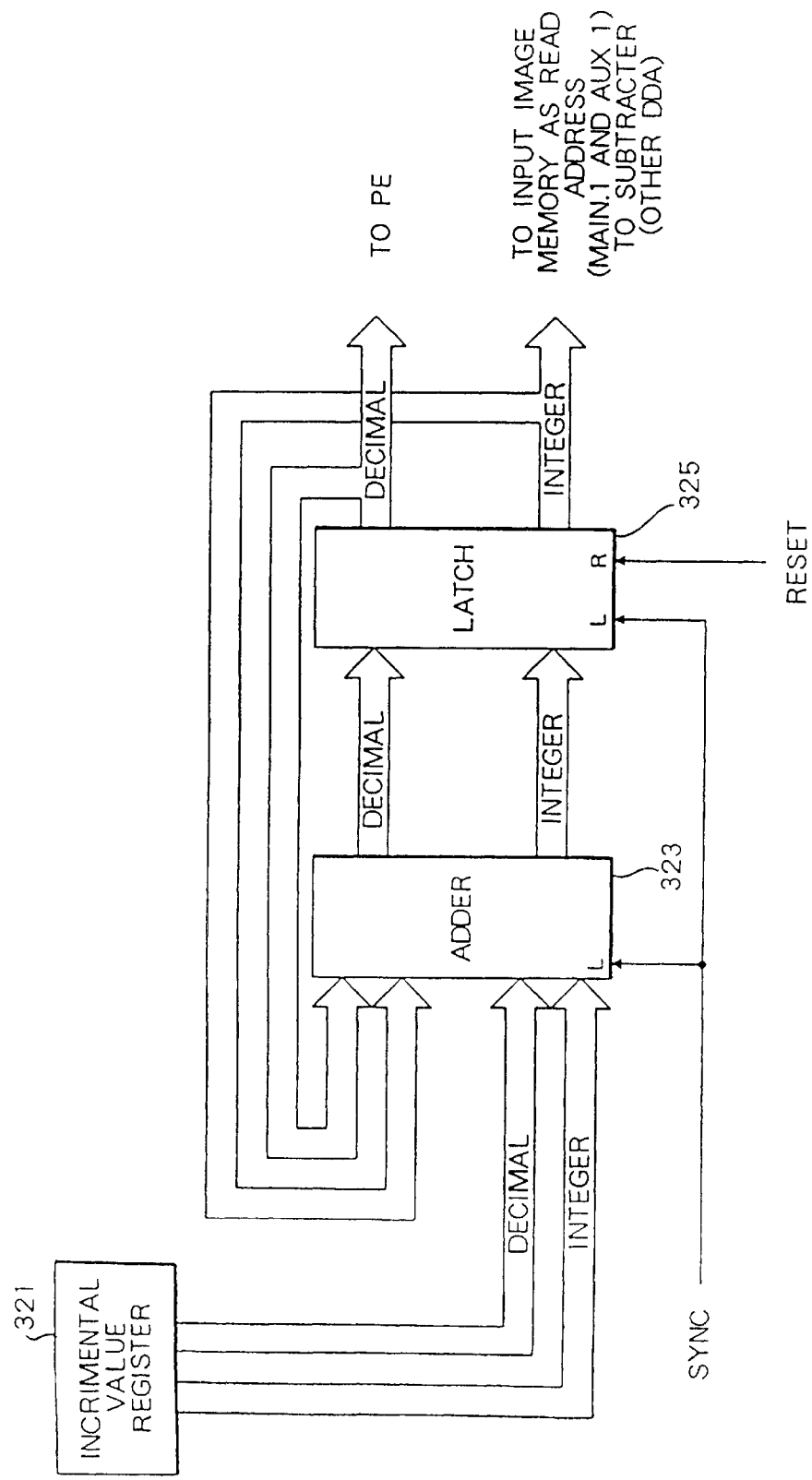
FIG. 68 is a view illustrating the construction of each DDA in FIG. 66.

FIG. 68 is a view supplementing FIG. 47 and is for describing the principal portion of a DDA illustrated as the main circuits 1 through 4 and auxiliary circuits 1 through 4 in FIG. 66.

As shown in FIG. 68, the DDA expressed as the main circuits 1 through 4 and auxiliary circuits 1 through 4 has, as an incremental value, a value which is four times the reciprocal of the magnification to be changed. Since the PE (processor element) group is composed of 4×4 or 16 PEs in the present embodiment, the main circuits 1 through 4 and the auxiliary circuits 1 through 4 all have values, which are four times the reciprocal of the magnification, as the incremental values. If the PE group is composed of m×n or mn PEs, then a DDA of main circuits 1 through m has an incremental value which is m times the reciprocal of the magnification, and a DDA of auxiliary circuits 1 through n has an incremental value which is n times the reciprocal of the magnification. For example, if the magnification is 8, the incremental value possessed is ⅛×4=½. Accordingly, in the DDA for the main scanning direction, namely in the main circuits 1 through 4, the adder and latch operate in sync with the main scanning direction synchronizing signal. In response to this synchronizing signal, each PE outputs a value corresponding to one pixel of the output image. These values are outputted at the timing of one synchronizing clock to the block of the memory 317 for the output image of 4×4 or 16 pixels. At the timing of the next synchronizing clock, pixel values for the adjacent block of 4×4 pixels of the memory 317 for the output image are outputted and written in the memory. Thereafter, pixel values are outputted sequentially in the main scanning direction with blocks of 4×4 pixels serving as the unit. These pixel values are outputted and written in the memory 317 for the output image up to the right end thereof, whereupon the main scanning direction returns to the starting point and the auxiliary scanning direction proceeds to a block advanced by one block (downward if expressed in terms of the image region). This is achieved by the latch output in the DDA of the auxiliary circuits 1 through 4 becoming larger by the incremental value in sync with the auxiliary scanning direction synchronizing signal and by resetting the latch of the DDA of the main circuits 1 through 4 by the auxiliary scanning direction synchronizing signal. The correspondence between the values outputted by the PEs and the pixels in the pixel block of the output image is shown in FIG. 67.

Figure 65:
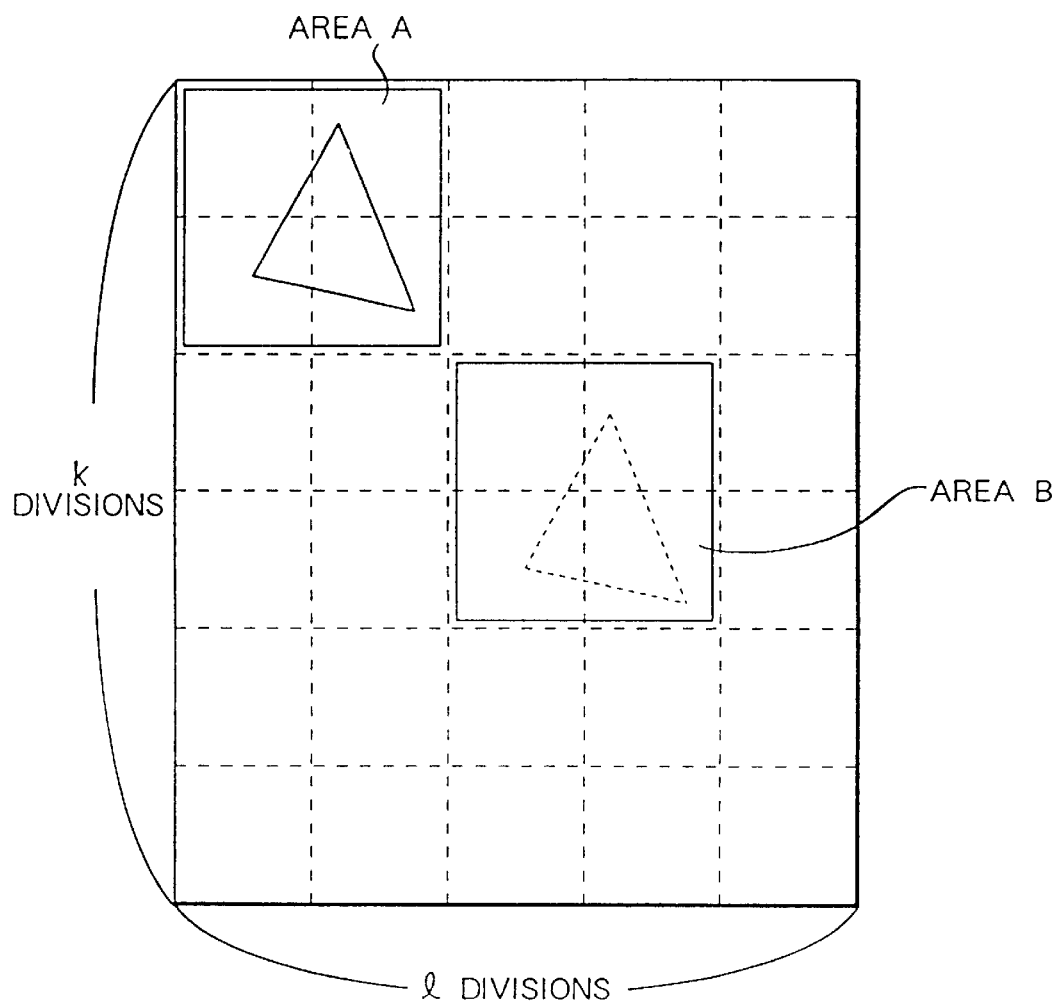
FIG. 65 is a view illustrating a state which prevails when an image is moved.

Each PE obtains an interpolation coefficient by using the decimal portions of the main scanning direction DDA and auxiliary scanning direction DDA to be correlated [if the PE position is (i,j), then the main scanning direction DDA corresponds to the main circuit i and the auxiliary scanning direction DDA corresponds to the auxiliary circuit j]. (The decimal portions themselves are used as interpolation coefficients.) The integer portion outputs of the main scanning direction DDA and auxiliary scanning direction DDA express the correspondence between the output image pixels to be written, which pixels are the values outputted by the PEs, and the addresses of pixels in the input image memory. "One-pixel adjacent" in the memory for the output image means a position adjacent by an amount equivalent to the reciprocal of the magnification in the input image memory (i.e. if the magnification is 8, the position is adjacent by ⅛). This position shall be referred to as an "imaginery position". Accordingly, interpolation processing is required in order to obtain data indicative of this imaginery position. As for the DDA output, the integer portion represents an address in the input image memory of an input pixel actually existing closest to the imaginery position, and the decimal portion represents displacement from the position of the actually existing input pixel to the imaginery position. Accordingly, the decimal portion is used in order to obtain the interpolation coefficient. The integer portion is used as an address in the input image memory of input image data used in order to perform the above mentioned interpolation processing. The integer portions of the main circuit 1 and auxiliary circuit 1 are addresses indicating the position of the upper left end of the 5×5 pixel region for which there is a possibility of being used in the 16 PEs. This is illustrated in FIG. 66. When the magnification is 1 (unity), all 5×5 pixels are used at least one time in any of the 16 PEs. As the magnification increases, only pixels in a small region from the upper left-hand portion of the 5×5 pixel region are used. Accordingly, if the magnification is greater than 1, 25 pixel data of 5×5 pixels located at the pixel positions at the upper left-hand end by the integer portions of the main circuit 1 and auxiliary circuit 1 are inputted to all 16 selectors. The selectors SEL correspond to respective ones of the PEs [PE(i,j) corresponds to selector SEL (i,j)]. In accordance with the differences (calculated by subtracters 710, 712) between the integer portions of the corresponding main DDA and auxiliary DDA and integer portions of the main circuit 1 and auxiliary circuit 1, the corresponding PE selects which four of the pixels among the 5×5 or 25 pixels are the required input pixel data. This correspondence is shown in FIG. 65. The PEs of the first column always use the pixels of the first and second columns of the 5×5 input pixel group. Similarly, the PEs of the first row always use the pixels of the first and second rows of the 5×5 input pixel group. Therefore, in FIG. 66, the drawing is such that a constant is inputted to the selectors of the first column instead of the integer values of the auxiliary scanning direction DDAs, and a constant is inputted to the selectors of the first row instead of the integer values of the auxiliary scanning direction DDAs.

The method of interpolation executed by each PE is similar to the processing performed by the two-dimensional interpolation circuit 740 shown in FIG. 52 and need not be described again.

<Image Data Compression>

In an embodiment of the invention described below, the processing executed in the processor unit 2 is for image compression. The numbers of memory elements k×l, K×L constituting the image memories on the read and write sides is not restrictive.

Further, the block sizes k'×l', K'×L of the pixels accessed in the memories on the read side and write side to not pose a restriction in the example that follows. However, the relations $1 \leq k' \leq k$, $1 \leq l' \leq l$, $1 \leq K' \leq K$, $1 \leq L' \leq L$ hold.

Scanning for memory accessing in the embodiment that follows will now be described. It can be readily surmised from the foregoing discussion (First Example) that if the pixel size accessed without being limited to the read side or write side is equal to the size of the memory elements constituting each of the image memories, scanning can be carried out in each of the image memories by the above-described first sequential scanning method. It goes without saying that if a pixel size smaller than the size of the memory elements constituting the image memories on the read and write sides is to be accessed in these memories, scanning can be carried out using the above-described blockwise sequentially scanning method (Fifth Example).

A process will be described in which image data in an image memory corresponding to rectangular regions of m×n pixels of an original image are accessed simultaneously, the image data are accepted simultaneously by a processor unit comprising a number of processor elements less than the block size m×n of the rectangular region in the original image memory, information such as image data is then processed by the respective processor elements while this information is communicated among the processor element, thereby subjecting the input image data to compression processing, and the results are outputted to a rectangular region in the output-side image memory smaller than the block size m×n of the rectangular region in the input original image memory, thereby compressing the original image data on the input side. In order to simplify the description, it will be assumed that the block size of the rectangular region of the image memory on the input side is m=n=4, that the number of processor elements is two, and that the block side of the rectangular region of the image memory on the output side is 1×1=1.

Figure 54:
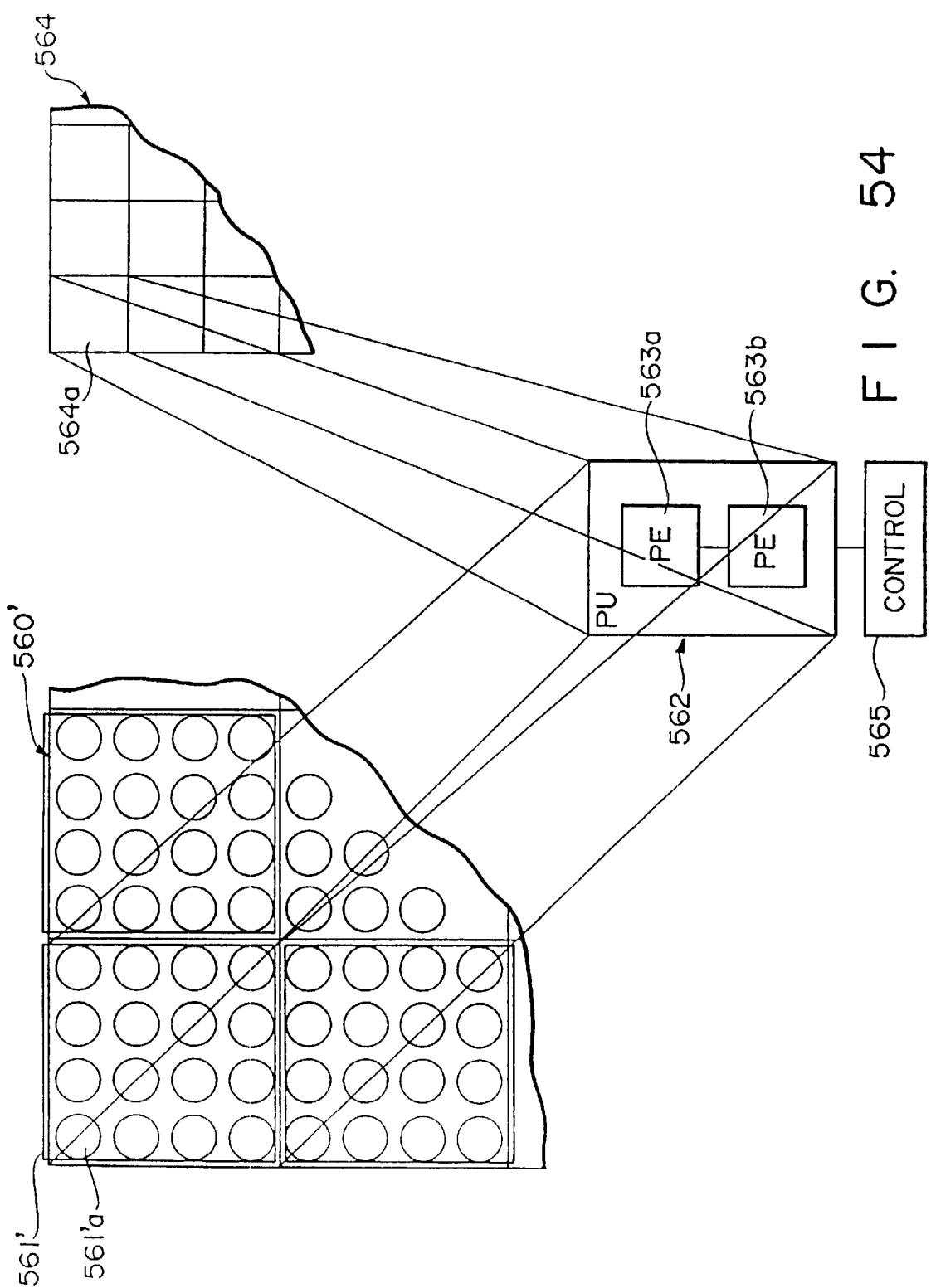
FIG. 54 is a view showing the relationship among an image memory on an input side, a processor unit and an image memory on an output side according to an embodiment of the invention.

FIG. 54 is a view showing the relationship among an input pixel block 561 corresponding to an original image memory 561' on the input side, pixels 561*a*, a processor unit 562, processor elements 563*a*, 563*b*, and output pixels 564*a* for an output-side image memory 564 for outputting data subjected to compression on the output side. A control signal from a controller 565 is inputted to the processor unit 562 and to the original image memory 560' on the input side, the image data block 561 of 16 pertinent pixel elements in the original image memory 560' on the input side are accessed simultaneously, and the required image data are accepted by respective ones of the processor elements 563*a*, 563*b* in the processor unit 562. The processor unit 562 computes typical density information 571 and detail information 572 such as shown in FIG. 55 from the 16 pixels of image data, and outputs compressed image data as output pixels 564*a* to corresponding positions in the output image memory 564 on the output side.

Of the two processor elements 563*a*, 563*b* in the processor unit 562, one, namely processor element 563*a*, is dedicated to computing the typical density information of the 16 pixel image data, and the other, namely processor element 563*b*, is dedicated to computing the detail information 572, which is calculated based on image information binary coded by a fixed threshold value conforming to the characteristics of the input image. Examples of the detail information are data obtained by vector quantization of the above-mentioned binary-coded image information, and a dispersion of the image information. The foregoing is a summary of the apparatus and processing flow for compressing inputted original image data. The details of processing performed by the processor elements 563*a*, 563*b* will now be described.

The processor element 563*a* exclusively for computing typical density information 571 comprises a buffer 581 for temporarily storing the 16 pixel image data, and an arithmetic unit 582, as shown in FIG. 56. The processor element 563a obtains an average density value of the 16 pixel image data and outputs this value as typical density information to the image memory 564 on the output side. The processor element 563b exclusively for computing the detail information 572 also comprises a 16 pixel buffer 581 and an arithmetic unit 582 shown in FIG. 56. In conformance with the characteristics of the inputted original image, the detail information 572, which comprises intra-block pattern information obtained by binary coding of 16 pixels of tone information by a threshold value predetermined by an apparatus, not shown, and dispersion information obtained from the threshold value and each pixel of image data in the block, is outputted together with the typical density information 571 to the image memory 564 on the output side.

At this time, the two processor elements 563a, 563b are capable of operating in parallel so that compression processing may be performed at high speed.

In the foregoing compression processing, the image memory on the input side is accessed sequentially in memory block units of 4×4 pixels. By repeating this until end of processing of the last 4×4 pixels memory block of the original image memory, one page of the original image can be compressed.

In this description, use is made of a fixed threshold value obtained by predetermining a threshold value for computing the detail information in the compression data. However, it can be surmised that this value can be a value which is the average density outputted by the processor element 563a. It can also be surmised that the number of processor elements in the processor unit 563 may be made one.

In accordance with the present embodiment as described above, the raw data of the inputted original image is compressed while being sequentially accessed every block of m×n pixels (e.g. 4×4 pixels). Therefore, rather than accessing each pixel in the image memory on the input side a plurality of times, m×n pixels of image data can be accessed simultaneously. This makes it possible to transfer the image data while it is being compressed at high speed.

When image data are coded in m×n pixel block units, a single coding processing can be carried out through a single memory access by making the size of the memory block on the input side the same m×n pixels. This makes it possible to execute processing at high speed and simplify the construction of the apparatus. Furthermore, by making the number of processor elements in the processor unit a number m'×n', which is less than the number m×n of pixels in the memory block on the input side, and causing each processor element to execute processing separately, the cost of the processing unit can be reduced and the compression processing speed can be raised by parallel processing.

Another embodiment of compression operation will now be described.

In the following, a process will be described in which image data in an image memory corresponding to rectangular regions of m×n pixels of an original image are accessed simultaneously, the image data are accepted by a processor unit comprising m×n processor elements, each of which is made to correspond to a respective one of memory elements corresponding to pixels, compression processing of the image data is executed by the respective processor elements, and the results are outputted to the image memory. In the present description, it will be assumed that m=n=4 holds for reasons of simplicity.

Figure 57:
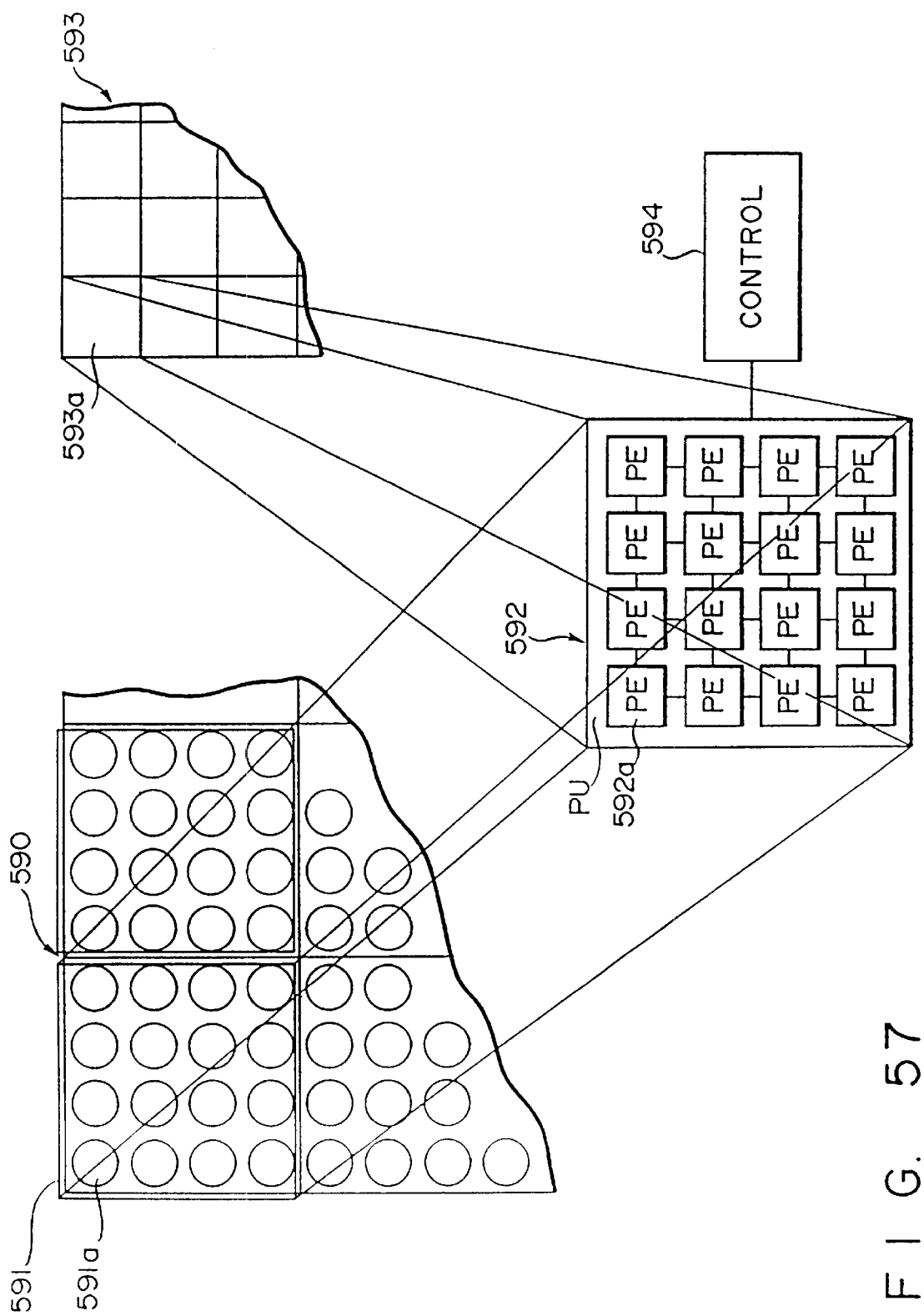
FIG. 57 is a view showing the relationship among an image memory on an input side, a processor unit and an image memory on an output side according to an embodiment of the invention.

FIG. 57 is a view showing the relationship among an input pixel block 591 corresponding to an original image 590, pixels 591a, a processor unit 592, processor elements 592a, and output image data 593a in an output image memory 593. In accordance with a control signal from a controller 594, the image data block 591 of 16 pertinent pixel elements in the original image memory 590 on the input side are accessed simultaneously, and the image data are accepted by respective ones of the processor elements 592a in the processor unit 562. The processor unit 592 computes typical density information 571 and detail information 572 such as shown in FIG. 55 from the 16 pixels of image data 591, and outputs the results to the image memory 593 on the output side.

The processor elements 592a in the processor unit 592 have one-to-one correspondence with the 4×4 pixels and are arranged in grid fashion in a 4×4 array of 16 elements.

The foregoing is a summary of image data compression processing. The details of processing performed by the processor elements 592a will now be described.

The processor elements 592a in the processor unit 592 are numbered in the row and column directions and the processor elements 592a are distinguished from one another by the combination of these numbers, as shown in FIGS. 58 and 59.

The processor for forming typical density information from the 16 pixels of image data will now be described. It will be assumed that the 16 processor elements 592a shown in FIG. 58 have accepted the corresponding image data. Each of the processor elements (1,1), . . . , (4,4), operating in parallel, computes $\frac{1}{16}$ of the density data of each pixel, all of the results of the computations are added simultaneously by the processor element (1,1), an average value of the 16 pixels of density information is obtained, and this value is outputted to the output image memory as a value of typical density information 571 in the compression data shown in FIG. 55.

The processor for obtaining the detail information 572 in the compression data shown in FIG. 55 will now be described. The processor elements shown in FIG. 59 are the same as those shown in FIG. 58.

In order to determine, at high speed, the pattern information of each pixel, which is obtained by binary coding of the tone information of each pixel in the 16 processor elements 592a by the average density information output of the processor element (1,1) in FIG. 58, the average density information and the dispersion information obtained from each item of pixel data in the block, the 4×4 processor elements are divided into four blocks, composed of 2×2 processor elements each, indicated by the solid lines in FIG. 59, the pattern information and dispersion information are operated on in parallel within the four blocks of 2×2 processor elements, the results are stored as intermediate results in four central processor elements (2,2), (2,3), (3,2), (3,3), the above mentioned operation is then executed in the central block of 2×2 processor elements, the final results are obtained in the processor element (2,2), and the value is outputted to the output image memory as the pertinent 16 pixels of detail information 572.

By repeating the above-described processing through sequentially accessing the original image memory on the input side in 4×4 pixels block units until the compression processing for the final 4×4 pixels block of the original image memory is concluded, compression data equivalent to one page of the original image can be obtained.

In accordance with the present embodiment as described above, the raw data of the inputted original image is sequentially accessed every memory block of m×n pixels (e.g. 4×4 pixels). Therefore, rather than accessing each pixel in the image memory on the input side a plurality of times, m×n pixels of image data can be accessed simultaneously. This makes it possible to transfer the image data while it is being compressed at high speed.

When image data are coded in m×n pixel block units, a single coding processing can be carried out through a single memory access by making the size of the memory block on the input side the same m×n pixels. This makes it possible to execute processing at high speed and simplify the construction of the apparatus. Furthermore, since the m×n processor elements the size whereof is the same as that of the memory block on the input side in the processor unit are capable of performing coding processing in parallel, the processing speed of the processor unit can be raised.

<Image Data Compression and Extenstion>

Another embodiment will now be described.

Plural items of image data in an input-side original image memory corresponding to rectangular regions of m×n pixels are accessed simultaneously, the image data are accepted by the processor elements of a processor unit, compression processing of the image data is executed, and the results are subsequently outputted to corresponding positions in the image memory on the output side in a size m'×n' (m>m', n>n') smaller than the block size at the time of input. Conversely, pixels of a block size m'×n' in the image memory on the input side are accessed simultaneously, the image data are accepted by the processor unit, expansion processing is executed, and all pixels of image data of a size m×n (m>m', n>n') larger than the block size at the time of input are outputted simultaneously to the image memory on the output side. The memory block sizes m×n, m'×n' at this time are fixed. Depending upon the contents of such processing as compression processing and expansion processing, the input side is made m×n and the output side is made m'×n', or conversely, the input side is changed over to m'×n' and the output side is changed over to m×n (where m>m', n>n'). The course of compression and expansion processing will be described hereinbelow. For the sake of simplicity, it will be assumed that m=n=4, m'=n'=1 hold, and that the number of processor elements in the processor unit is two.

First, as shown in FIG. 54, when compression is carried out, a control signal from control unit 544 is inputted to processor unit 541, it is determined that the block size on the input side is 4×4 pixels and that the block size on the output side is 1 pixel, the pertinent 16 pixels of image data in the original image memory 540 on the input side are accessed simultaneously, and the required image data are accepted by the respective processor elements 541a and 541b in the processor unit 541. The processor unit 541 computes typical density information 571 and detail information 572 such as shown in FIG. 55 from the 16 pixels of image data, and outputs compressed image data to corresponding positions in the output image memory 542 on the output side.

Processing when the compressed, coded data are extended will now be described.

Figure 60:
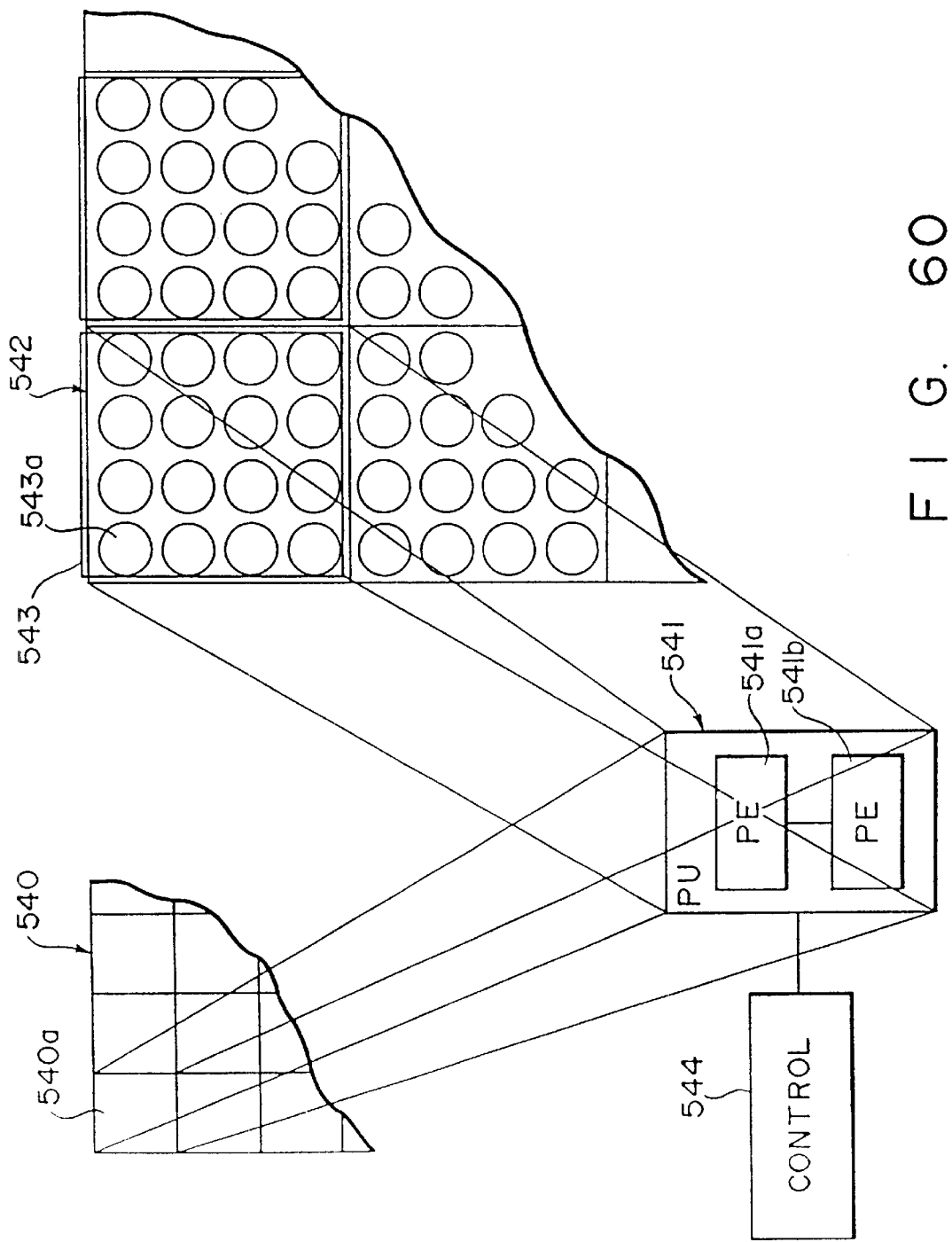
FIG. 60 is a view showing the relationship among an input image memory, a processor unit and an output image memory on an output side when elongation processing is performed according to an embodiment of the invention.

FIG. 60 shows the relationship among coded data 540a in the image memory 540 on the input side, the processor unit 541 comprising processor elements 541a and 541b, the output pixel block 543 for a reproduction image memory 542 on the output side, and output pixels 543a. A control signal from control unit 544 is inputted to the processor unit 541, it is determined that the block size on the input side is 4×4 pixels, coded data such as shown in FIG. 55 from the image memory on the input side are inputted to the one processor unit 541, each of the processor elements 541a and 541b executes processing, and the reproduced 16 pixels of image data are outputted simultaneously to the corresponding 4×4 rectangular area in the image memory 542 on the output side. Each of the processor elements 541a 541b in the processor unit 541 executes processing which is the reverse of that executed at compression. For example, density information of 16 pixels of image data is obtained from typical density information 571 in the coded data and dispersion information in the detail information 572. The 16 pixels of image data are reproduced simultaneously. At this time the plurality of processor elements 541a and 541b are capable of operating in parallel so that the expansion processing can be performed at high speed.

In the aforementioned extension processing, the coded data on the input side are accessed sequentially and the operation of sequentially data in 4×4 pixels block units with regard to the image data on the output side is carried out until there are no longer coded data on the input side. Thus, reproduced image data can be formed from image data consisting of one page of coded data.

In this description, use is made of a fixed threshold value obtained by predetermining a threshold value for computing the detail information in the compression data. However, it can be surmised that this value can be a value which is the average density outputted by one more processor element. It can also be surmised that the number of processor elements in the processor unit may be made one.

It can also be surmised that in the case of the present embodiment where the block size on the input or output side is large, the number of processor elements may be arranged in a 4×4, grid-shaped array. Though the block sizes are 4×4 pixels and 1 pixel in the present embodiment, it can be surmised that these sizes may be as desired.

In accordance with the present embodiment as described above, the raw data of the inputted original image or the reproduced image data on the output side is sequentially accessed every memory block of m×n pixels (e.g. 4×4 pixels). Therefore, rather than accessing each pixel in the image memory on the input side a plurality of times, m×n pixels of image data can be accessed simultaneously. This makes it possible to transfer the image data while it is being compressed at high speed.

In addition, since the block sizes of the image memory on the input and output sides can be changed over, as in the manner of (4×4 pixels and 1 pixel), (1 pixel and 4×4 pixels), a compressor and expander need not be separately provided; only one device will suffice. This makes it possible to minimize the required components of the apparatus.

Furthermore, since block sizes on the input side can be made separate sizes, it is possible to dispense with masking processing that is for the purpose of not reading or not rewriting the required image data.

Also, since the processor elements in the processor unit can execute processing in parallel, the processing speed of the processor unit can be raised.

In the foregoing embodiment, processing for image compression and expansion can be executed in parallel at high speed.

When compression and expansion of an image are performed, it will suffice to assign addresses as described above in connection with FIGS. 16 and 17.

<Color Image Processing>

Image processing of a digital color image will now be described. Color information in a digital color image is expressed as a combination of, for example R, G and B. Therefore, the aforementioned image memory is provided for R, for G and for B, and each memory is capable of holding data having a depth of eight bits for each color. In order to achieve high-speed processing of the color information held as indicated above, the arrangement is such that corresponding processor elements are made to correspond, one by one, to the corresponding image memory cells for R, G and B, the processing for R, the processing for G and the processing for B are executed in parallel, and information is capable of being communicated between respective processor elements. The arrangement of an image memory 402 of one page and n×n (e.g. 4×4) processor units 401 is shown in FIG. 61.

FIG. 61 illustrates the theoretical arrangement of basic components only and shows that a processor unit for R, G and B is connected to an image memory 402 for R, G and B. In FIG. 60, n×n items of image data for each of corresponding R, G and B at any of the pixel locations in the image memory 402 are transferred to the processor unit 401, which is composed of of n×n processor elements for each color, where the data are processed at high speed and then returned to the image memory 402. The detailed construction of the processor unit 401 for each color is illustrated in FIG. 62. Each processor unit is constituted by n×n (e.g. 4×4) processor elements, adjacent processor elements are capable of communicating with one another, and processor elements at identical positions in respective processor units are also capable of communicating with one another. The principle of operation will now be described.

EXAMPLE 1
Color Conversion

Let us consider color conversion processing. Color conversion processing refers to processing in which, when image data possesses color information, the color information is converted into other specific color information which is predetermined. In accordance with the flowchart shown in FIG. 23 and already described, the processor elements in the processor unit execute color conversion processing in parallel with respect to 16 pixels while processor elements for R, G and B, respectively, at the same positions communicate information with one another.

Processing among each memory and processor unit will now be described in detail with reference to FIGS. 61 and 62.

First, color information before and after alteration is designated, and the information is registered at a location such as a register capable of storing a value. Thereafter, in accordance with control signals 411 outputted by a controller 410 shown in FIG. 62, pertinent image data are read out of 4×4 memory elements of the image memory for the three colors R, G, B simultaneously, and image data are transferred to the corresponding processor elements 417, 416 and 415 of the processor units 412R, 412G and 412B for R, G and B. Thereafter, in accordance with the flowchart of FIG. 23, the 4×4 processor elements execute processing in parallel while the processor elements for R, G and B at the same positions, e.g. processor elements 415, 416, 417, communicate with one another. When processing by the processor units ends, the image data are returned to the image memory. Image data from the next 4×4 memory elements are then read out. If will suffice to carry out the above mentioned processing with regard to one page of image data. The designated color or colors may be one or three color values among the colors R, B, B, and the color information before alteration may of course be designated over a range or in plural.

EXAMPLE 2
Color Correction

Let us consider color correction processing. A color correction involves processing in which, when image data possesses certain color information, the color information is corrected in conformance with the characteristics of the image input unit or image outut unit.

This processing can be expressed by the following general equations:

$$R'=\alpha \cdot R+\beta \cdot G+\gamma \cdot B$$

$$G'=\alpha' \cdot R+\beta' \cdot G+\gamma' \cdot B$$

$$B''=\alpha'' \cdot R+\beta'' \cdot G+\gamma'' \cdot B \qquad (20)$$

(where R, G and B represent input image data, R', G' and B' denote output image data, and α, β, . . . , β", γ" are coefficients)

Numerical values conforming to the characteristics of the image input unit or image output unit are substituted into the coefficients α, β, . . . , β", γ" of Eq. (20). In accordance with the flowchart shown in FIG. 63, the processor elements in the processor units execute processing in parallel with respect to 16 pixels while the processor elements for R, G and B corresponding to the same pixels communicate information with one another.

This processing will now be described in detail. First, numerical values conforming to the image input and output units, e.g. α=0.8, β=0.3, α=0.2 are decided for the coefficients α, β, . . . of Eq. (20), and these coefficients are registered at locations such as registers capable of holding the values. Thereafter, the 4×4 processor elements execute the processing, described below, in accordance with the control signals 411 outputted by the controller 410 shown in FIG. 62.

Figure 64:
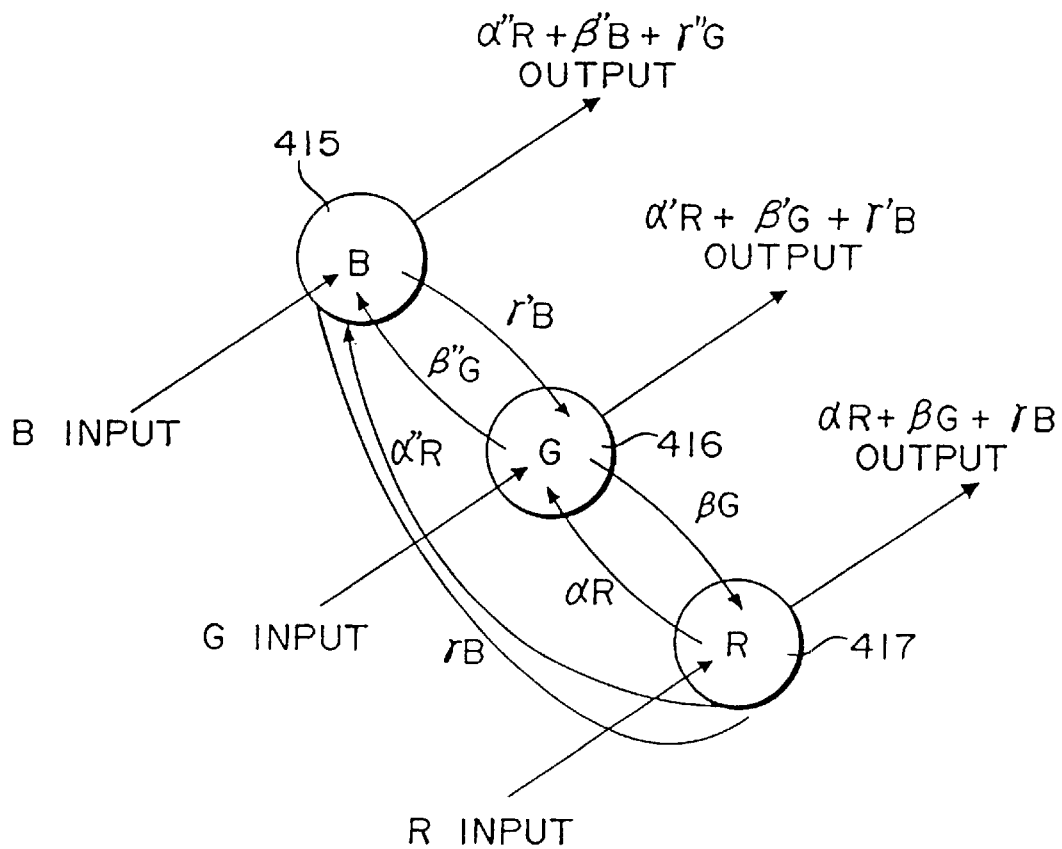
FIG. 64 is a view showing an exchange of data when a color correction is performed.

In response to addressing performed by the control signal 411, reference is made to the 4×4 memory elements, the pertinent image data for the three colors R, G and B are read out of the image memory by a device (not shown) simultaneously, and the image data are transferred to the corresponding processor elements of each of the processor units simultaneously. Thereafter, in accordance with the flowchart of FIG. 63, the 4×4 processor elements execute processing in parallel while the processor elements for R, G and B at the same positions, e.g. the processor elements 415, 416, 417, communicate data with one another. When this processing performed by the processor units ends, the processed image data are returned to the image memory. FIG. 64 illustrates the data exchange. It will suffice to execute the foregoing processing with regard to one page of image data.

Whereas processing is repeated for every single output pixel in the prior art, the results of processing are outputted for plural output pixels in the same cycle in accordance with the present embodiment, so that color image processing speed can be made very high.

By inputting continuous, closely adjacent pixels on the input side at one time, spatial filtering processing can be executed in one cycle, and it is possible to output the results of spatial filtering processing to a plurality of output pixels simultaneously.

By accessing and processing a plurality of input data simultaneously, processing execution speed is raised in comparison with the accessing of data one item at a time. Moreover, processing (spatial filtering processing, color processing, etc.) that takes into account the correlation between data accessed simultaneously by performing an exchange of data between PEs can be executed by a single input data accessing operation.

The raw data of the original image expressed by the inputted color information (e.g. R, G, B) are accessed sequentially and simultaneously for the three colors R, G, B every m×n (e.g. 4×4) memory block. Therefore, rather than accessing each pixel in the image memory on the input side a plurality of times, m×n pixels of image data can be accessed simultaneously for the three colors. This makes it possible to transfer the image data at high speed.

Furthermore, as for the processor elements in the processor units, there is communication of information not only among elements for the same color but also among element for different colors. As a result, the color information for the three colors R, G and B can be processed simultaneously and processing for color conversion, color correction and the like can be executed at high speed. In addition, since the processor units are composed of processor elements the number whereof is the same as the pixel number m×n in the memory blocks on the input and output sides, m×n items of the image data can be inputted and outputted simultaneously in block units. Also, the m×n processor elements are capable of operating in parallel for computations as well, so that a sufficiently high processing speed can be obtained.

<Move Operation in Second Embodiment>

A case will now be described in which a translation of the kind depicted in FIG. 65 is made when addresses are assigned as shown in FIGS. 16 and 17.

In k×l memory elements 1b, data of corresponding positions are read, one item at a time, out of each of the k×1 divided areas when one address is applied. When all of the k×l data are rearranged by the processor unit and written into the same address, one transfer processing step is concluded among the k×l areas. Processing of the entire image is ended by the processor unit executing this with regard to all addresses of the memory elements 1b.

However, the processor unit must return data to the k×l memory elements 1b. In actuality, however, if the processor unit accepts only the number of areas in area A and outputs only the number of areas in area B, the load on the processor unit will be lightened. The number of areas in area A and in area B are not necessarily equal. For example, it is possible for the area A to consist of 3×3 areas, in which the processor unit may effect reduction processing to ⅔ and transfer the results to area B, which is composed of 2×2 areas.

Thus, it will suffice to control the chip enable of all memory elements 1b using an arrangement the same as that of FIG. 15 in a case where the read and write data of all memory elements 1b are not always necessary, namely in order to mask memory elements in which data are not desired to be written. In such case, as for the input-side data in two look-up tables, information relating to the longitudinal and transverse sizes of the areas A and B and to the positions of the areas would be inputted.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
    input means for inputting a plurality of adjoining pixel data as a block;
    a plurality of processor elements generating, respectively, a plurality of different characteristic data of an image in each block including typical density information of each block by utilizing the plurality of adjoining pixel data inputted by said input means, one of said plurality of processor elements generating said typical density information as one of the plurality of different characteristics and transmitting processed data related to said typical density information to another of said plurality of processor elements, and the another of said plurality of processor elements generating another of the plurality of different characteristic data by utilizing the received processed data and the plurality of adjoining pixel data; and
    output means for outputting, as compressed data of the plurality of adjoining pixel data, data obtained by combining the one and another of the plurality of characteristic data generated by said plurality of processor elements.

2. An image processing apparatus according to claim 1, wherein said typical density information is an average density of the block.

3. An image processing apparatus according to claim 1, wherein said another of the plurality of different characteristic data includes detail information in the block.

4. An image processing apparatus according to claim 3, wherein said detailed information is obtained by binarizing each of the plurality of adjoining pixel data based on said typical density information.

5. An image processing apparatus according to claim 3, wherein said detail information comprises pattern information and dispersion information of pixels in the block.

6. An image processing method comprising the steps of:
    inputting a plurality of adjoining pixel data as a block;
    generating typical density information as one of a plurality of different characteristic data of an image in the block by utilizing the plurality of adjoining pixel data by one of a plurality of processor elements;
    transmitting processed data related to said typical density information from the one to another of said plurality of processor elements;
    generating another of the plurality of different characteristic data by utilizing the received processed data and the plurality of adjoining pixel data by the another of said plurality of processor elements; and
    outputting, as compressed data of the plurality of adjoining pixel data, data obtained by combining the one and another of the plurality of characteristic data generated by said plurality of processor elements.

7. An image processing method according to claim 6, wherein said typical density information is an average density of the block.

8. An image processing apparatus according to claim 6, wherein said another of the plurality of different characteristic data includes detail information in the block.

9. An image processing method according to claim 8, wherein said detail information is obtained by binarizing each of the plurality of adjoining pixel data based on said typical density information.

10. An image processing method according to claim 8, wherein said detail information comprises pattern information and dispersion information of pixels in the block.

* * * * *

UNITED STATES PATENT AND TRADEMARK OFFICE
CERTIFICATE OF CORRECTION

PATENT NO. : 6,477,281 B2
DATED : November 5, 2002
INVENTOR(S) : Yoshinobu Mita et al.

It is certified that error appears in the above-identified patent and that said Letters Patent is hereby corrected as shown below:

Title page,
Item [62], Related U.S. Application Data,
"07/670,460, filed on Mar. 12, 1992," should read
-- 07/670,460, filed on Mar. 12, 1991, --.
Item [56], References Cited, FOREIGN PATENT DOCUMENTS,
"JP 52043326   4/1977" should read -- JP 52-43326    4/1977 --;
"JP 60185987   9/1985" should read -- JP 60-185987   9/1985 --;
"JP 60262253  12/1985" should read -- JP 60-262253  12/1985 --;
"JP 61016369   1/1986" should read  -- JP 61-16369    1/1986 --;
"JP 61052074   3/1986" should be deleted;
"JP 61055783   3/1986" should read   -- JP 61-55783    3/1986 --;
"JP 61107475   5/1986" should read   -- JP 61-107475   5/1986 --;
"JP 61199170   9/1986" should read   -- JP 61-199170   9/1986 --;
"JP 61294970  12/1986" should read  -- JP 61-294970  12/1986 --;
"JP 62000988 1/1987" should read   -- JP 62-988       1/1987 --;
"JP 62008664 1/1987" should read -- JP 62-8664      1/1987 --;
"JP 62013165 1/1987" should read -- JP 62-13165     1/1987 --;
"JP 63201757 8/1988" should read -- JP 63-201757   8/1988 --; and
OTHER PUBLICATIONS, "" Image Processing on the Massively Parallel Processor",
by J. L. Potter, Computer, Jan. 1983, pp. 62-67." (second occurrence) should be
deleted.

Drawings,
Sheet 56, FIG. 62, "CONTORL" should read -- CONTROL --; and
Sheet 62, FIG. 68, "INCRIMENTAL" should read -- INCREMENTAL --.

Column 2,
Line 44, "a" (first occurrence) should be deleted.

Column 3,
Line 8, "handle" should read -- to handle --.

Column 4,
Line 13, "of of" should read -- of --.

Column 7,
Line 22, "aritmetic" should read -- arithmetic --.

Column 13,
Line 56, "masked," should read -- be masked, --.

UNITED STATES PATENT AND TRADEMARK OFFICE
CERTIFICATE OF CORRECTION

PATENT NO.    : 6,477,281 B2
DATED         : November 5, 2002
INVENTOR(S)   : Yoshinobu Mita et al.

It is certified that error appears in the above-identified patent and that said Letters Patent is hereby corrected as shown below:

<u>Column 14,</u>
Line 67, "is" should read -- in --.

<u>Column 20,</u>
Line 38, "way,of" should read -- way of --.

<u>Column 21,</u>
Line 8, "kthe" should read -- the --.

<u>Column 25,</u>
Line 18, "corresponds toi" should read -- corresponding to --.

<u>Column 30,</u>
Line 21, "element," should read -- elements, --.

<u>Column 34,</u>
Line 14, "sequentially" should read -- sequentially accessing --.

Signed and Sealed this

Twenty-seventh Day of January, 2004

JON W. DUDAS
*Acting Director of the United States Patent and Trademark Office*